United States Patent
Takahara et al.

(10) Patent No.: US 6,177,965 B1
(45) Date of Patent: Jan. 23, 2001

(54) DISPLAY DEVICE AND PROJECTION-TYPE DISPLAY APPARATUS USING THE DEVICE

(75) Inventors: Hiroshi Takahara, Neyagawa; Hideki Omae, Suita, both of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/789,492

(22) Filed: Jan. 27, 1997

Related U.S. Application Data

(63) Continuation of application No. 08/231,121, filed on Apr. 22, 1994, now abandoned.

(30) Foreign Application Priority Data

| Apr. 22, 1993 | (JP) | ................................................... | 05-095837 |
| Apr. 22, 1993 | (JP) | ................................................... | 05-095838 |
| Dec. 23, 1993 | (JP) | ................................................... | 05-329113 |

(51) Int. Cl.$^7$ ..................................................... G02F 1/335

(52) U.S. Cl. .................................................. 349/5; 349/10

(58) Field of Search ................................. 359/40, 51, 41, 359/72; 345/95; 349/5, 6, 7, 8, 9, 10, 11, 38, 39, 49, 50, 51, 61, 104, 105, 116, 86, 148, 149, 151, 152, 143, 145, 137, 158

(56) References Cited

U.S. PATENT DOCUMENTS

| 3,824,002 | * | 7/1974 | Beard ...................................... | 359/72 |
| 4,032,954 | * | 6/1977 | Grinberg et al. ........................ | 359/72 |
| 4,435,047 | | 3/1984 | Fergason ................................ | 350/334 |
| 4,613,207 | | 9/1986 | Fergason ................................ | 350/331 R |
| 4,639,087 | * | 1/1987 | Cannella ................................. | 359/79 |
| 4,708,439 | * | 11/1987 | Ishii et al. .............................. | 359/40 |
| 4,728,176 | * | 3/1988 | Tsuboyama et al. .................. | 359/79 |
| 4,772,101 | * | 9/1988 | Liu ......................................... | 359/41 |

(List continued on next page.)

FOREIGN PATENT DOCUMENTS

| 0224388 | 6/1987 | (EP) . |
| 0336570 | 10/1989 | (EP) . |

(List continued on next page.)

OTHER PUBLICATIONS

Proceedings of the SPIE—The International Society for Optical Enginering, vol. 1456,1991 USA, pp. 6–14, P. Jones et al., "Performane of NCAP Ptojection Displays".

1988 SID International Symposium, Digest of Technical Papers, First Edition, Anaheim CA, USA., 24–26 May 1988, 1988, Playa Del Rey, CA, USA, SID, USA, pp. 227–230, J. Pirs et al; "Low Cost High Intensity Color Projection".

(List continued on next page.)

*Primary Examiner*—Kenneth Parker
(74) *Attorney, Agent, or Firm*—Wenderoth, Lind & Ponack, L.L.P.

(57) ABSTRACT

In a display device, counter electrodes are formed in stripes at a position facing pixel electrodes, with a polymer dispersion liquid crystal held between the counter electrodes and pixel electrodes. When a positive-polarity signal is to be impressed to a pixel electrode, a negative-polarity voltage is fed to the counter electrode. On the other hand, when a negative-polarity signal is to be impressed to a pixel electrode, a positive-polarity voltage is added to the counter electrode. In this manner of impression voltages, a high voltage can be applied to the polymer dispersion liquid crystal layer on the pixel electrodes, so that the liquid crystal layer is turned into the transmitting state even if it is thick. Accordingly, the scattering efficiency is improved and images are displayed with high contrast as the liquid crystal layer can be made thick. If the thick transparent substrate is bonded to the counter substrate having the counter electrodes thereon, the light scattered at the liquid crystal layer is reflected by the counter substrate and returned back to the liquid crystal layer, thus eliminating the light to be scattered again.

11 Claims, 38 Drawing Sheets

U.S. PATENT DOCUMENTS

| | | | |
|---|---|---|---|
| 4,906,984 | * | 3/1990 | Takeda et al. .......................... 349/95 |
| 4,917,466 | * | 4/1990 | Nakamura et al. .................. 349/151 |
| 4,964,702 | | 10/1990 | Sugimoto et al. . |
| 4,973,135 | * | 11/1990 | Okada et al. .......................... 359/56 |
| 5,013,137 | * | 5/1991 | Tsuboyama et al. .................. 359/56 |
| 5,107,355 | * | 4/1992 | Satoh et al. .......................... 349/148 |
| 5,130,832 | * | 7/1992 | Kawaguchi et al. ................. 349/151 |
| 5,247,376 | * | 9/1993 | Wakai .................................... 345/95 |
| 5,283,675 | * | 2/1994 | Ooi et al. ................................ 359/51 |
| 5,353,133 | * | 10/1994 | Bernkopf ................................ 349/10 |
| 5,631,750 | * | 5/1997 | Minoura et al. .......................... 349/5 |
| 5,659,409 | * | 8/1997 | Ooi et al. ................................. 349/10 |

FOREIGN PATENT DOCUMENTS

| | | | |
|---|---|---|---|
| 0373565 | | 6/1990 | (EP) . |
| 0362776 | * | 11/1990 | (EP) . |
| 0508592 | | 1/1992 | (EP) . |
| 0558059 | | 9/1993 | (EP) . |
| 0572996 | | 12/1993 | (EP) . |
| 61-69031 | * | 4/1986 | (JP) ........................................ 359/40 |
| 61-110121 | * | 5/1986 | (JP) ........................................ 359/40 |
| 1-243020 | | 9/1989 | (JP) . |
| 5-27218 | | 2/1993 | (JP) . |

OTHER PUBLICATIONS

Patent Abstract of Japan. vol. 018, No. 126 (P–1702), Mar. 2, 1994.

Electronic and Communication Engineering Journal, vol. 4, No. 2, Apr. 1992, London, GB, pp. 91–100, Spruce G. et al. "Polymer dispersed liquid Crystal (PDLC) Films".

* cited by examiner

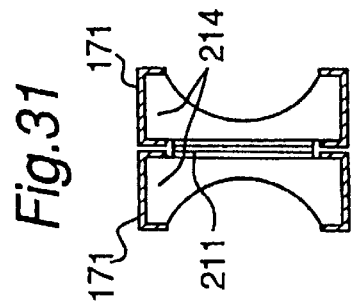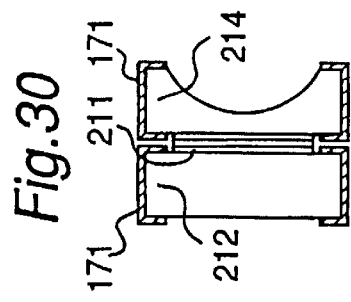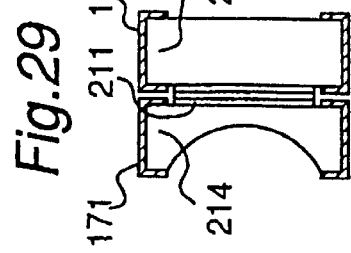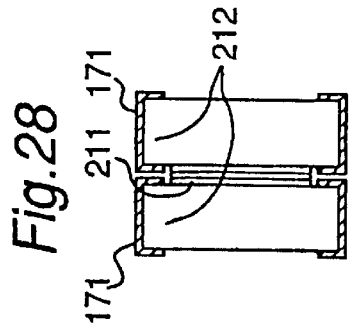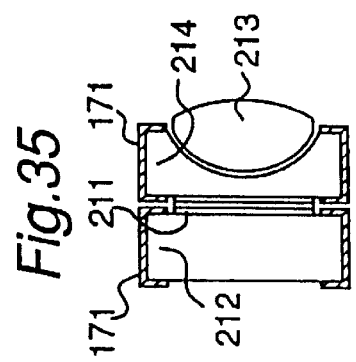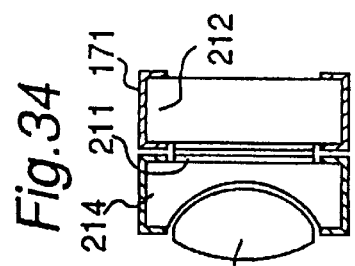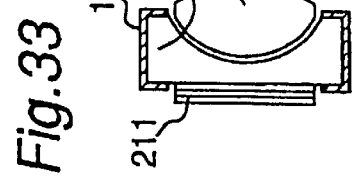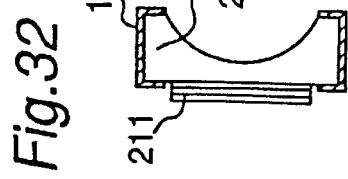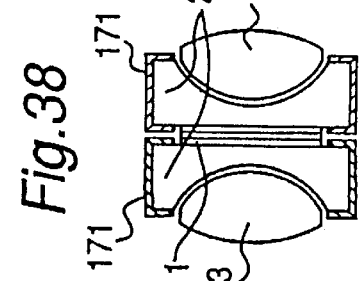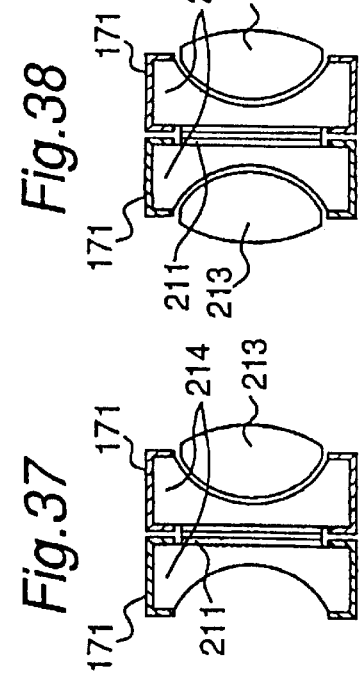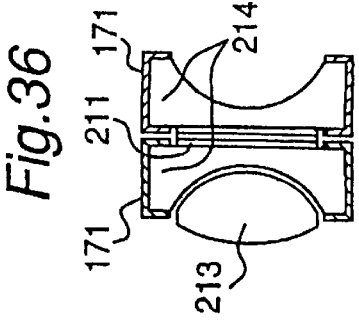

DISPLAY DEVICE AND PROJECTION-TYPE DISPLAY APPARATUS USING THE DEVICE

This application is a continuation of now abandoned application, Ser. No. 08/231,121, filed Apr. 22, 1994.

BACKGROUND OF THE INVENTION

1. Field of the Invention

The present invention relates to a display device designed to form optical images by modulating the incident light, and also a projection-type display apparatus realizing a large-screen display by magnifying and projecting images formed by the display device onto a screen.

2. Description of the Prior Art

Because of the light-weight and thin-size of display devices using a liquid crystal (referred to as a liquid crystal display device hereinafter), enthusiastic researches and developments have been directed to this field lately. For instance, a pocket-size TV using a twist nematic (TN) liquid crystal which applies the optical rotatory power of the liquid crystal has been brought on the market and moreover, a projection-type display apparatus utilizing the aforementioned TN panel as a light valve has also been in practical use The above TN liquid crystal panel requires the incident light to be linearly polarized through a polarizing plate for modulation. However, the polarizing plate absorbs or reflects 50% or more of the incident light, and therefore, the using efficiency of light becomes poor in the liquid crystal display device using the TN liquid crystal panel. The display luminance is disadvantageously low as well.

A proposal to solve the above problem is a liquid crystal display panel using a polymer dispersion liquid crystal in place of the TN liquid crystal. The polymer dispersion liquid crystal panel can modulate the light without using a polarizing plate. The polymer dispersion liquid crystal will be briefly depicted hereinbelow.

The polymer dispersion liquid crystal is roughly separated into two types as follows based on the dispersed state of a liquid crystal and a polymer material. Drops of a liquid crystal are dispersed in a polymer material in one type, that is, the liquid crystal is present in the polymer material in the discontinuous state (which will be represented as PDLC hereinafter, and a liquid crystal panel using PDLC will be denoted as a PD liquid crystal panel). The other type of the polymer dispersion liquid crystal has a network of polymers spread in a liquid crystal layer, most similar to the state of a liquid crystal contained in a sponge. The liquid crystal in the structure of a network is continuous, not appearing in the form of drops (referred to as PNLC hereinafter). The display of images in the above two kinds of liquid crystal panels is achieved by controlling scattering and transmission of light.

PDLC utilizes the fact that the index of refraction is different depending on the direction of orientation of the liquid crystal. Without a voltage impressed, drops of the liquid crystal are orientated in irregular directions. Since the index of refraction of polymers becomes different from that of the liquid crystal at this time, the incident light is scattered. On the other hand, when a voltage is impressed to PDLC, the direction of orientation of all the liquid crystal molecules is rendered uniform. Therefore, if the index of refraction when the liquid crystal is orientated in one direction is preliminarily matched with the index of refraction of polymers, the incident light is allowed to pass through the liquid crystal layer without being scattered.

In contrast, PNLC makes use of the irregularity itself in the orientation of liquid crystal molecules. In the irregularly orientated state, namely, when a voltage is not added to PNLC, the incoming light is scattered. When a voltage is supplied to both PDLC and PNLC so that the liquid crystal is orientated regularly, the liquid crystal layer becomes transparent, so that the light is transmitted.

The above PDLC and PNLC are generally termed as polymer dispersion liquid crystals, and PD liquid crystal panels and PN liquid crystal panels are called as polymer dispersion liquid crystal panels. Resin components in the liquid crystal layer are called as polymers.

The operation of the polymer dispersion liquid crystal panel will be described briefly by an example of the PD liquid crystal panel.

FIGS. 56 and 57 are explanatory diagrams of the operation of the PD liquid crystal panel. A pixel electrode 51 is connected to a thin film transistor (not shown, and designated as TFT hereinafter). A voltage is fed to the pixel electrode 51 by turning ON/OFF of the TFT. Upon receipt of the voltage, the direction of orientation of liquid crystal molecules 382 in the form of drops on the pixel electrode 51 is changed.

As indicated in FIG. 56, while a voltage is not supplied (in the OFF state), drops of liquid crystal 382 are orientated irregularly in direction. In this state, the index of refraction differs between a polymer 381 and the liquid crystal molecules 382, whereby the entering light is scattered. When a voltage is added to the pixel electrode 51, the liquid crystal molecules are orientated uniformly as is clearly shown in FIG. 57. If the index of refraction of the liquid crystal molecules when orientated in one direction is set equal to the index of refraction of the polymer 381 beforehand, the incident light is not scattered, but is projected from an array substrate 11.

U.S. Pat. No. 4,435,047 discloses an example of the above-described polymer dispersion liquid crystal or a similar display device. A nematic liquid crystal is sealed in a capsule held between two electrodes according to the U.S. patent liquid crystal device. The display device scatters the light when an electric field does not act to the liquid crystal layer, and passes the light when an electric field is applied to the liquid crystal layer.

Further, another U.S. Pat No. 4,613,207 describes an example of a projection-type display apparatus which projects images obtained by the above U.S. patent liquid crystal display device after magnifying the same. A reflecting-type or a transmitting-type liquid crystal display device is used as a light valve in the apparatus of U.S. Pat. No. 4,613,207. Images displayed by the light valve are projected onto a screen on an enlarged scale.

In a display device using PDLC (referred to as PDLCD), the light is modulated by switching the same to be scattered or transmitted, thereby to form images. More specifically, when the light is scattered, a black display is obtained. On the other hand, when the light is transmitted, a white display is gained. The display contrast represents the ratio of the transmission light of the white indication (referred to as an ON light hereinafter) and the transmission light of the black indication (referred to as an OFF light). Since the amount of the ON light of PDLCD is considerably large because of the transmissible state of the liquid crystal layer, it is necessary to reduce the amount of the OFF light in order to obtain a large display contrast, and eventually it is required to improve the scattering efficiency of light. Although the scattering efficiency may be improved if the thickness of the liquid crystal layer is increased, it brings about another requirement to raise a voltage to make the liquid crystal layer transmissible. The required voltage is limited to be within ±6–±7 up to the standard, partly depending on the driving performance of a source drive IC which outputs image signals to the pixel electrode. It is to be noted here that it is a perfectly scattering state when the light is scattered best, that is, the image display surface of the liquid crystal device shows the same luminance in any direction.

Recently, the number of pixels in the liquid crystal panel has been increased more and more. Even such a liquid crystal panel that includes not smaller than a million pixels has been produced experimentally for use in a superfine display panel. The more the number of pixels is increased, the higher the operating clock of the drive IC becomes. And, the output of the drive IC is necessary to be changed in synchronization with the operating clock. ±6V is nearly the upper limit when the operating clock is 20 MHZ in the semiconductor technology at present.

From the above reason, the thickness of the liquid crystal layer should be set so that the liquid crystal layer is transmissible at ±6V. However, the scattering efficiency of the liquid crystal layer which becomes transparent at ±6V is far from the perfectly scattering state described above.

If the source drive IC is greatly enlarged in size or by the like arrangement, ±8V or higher driving voltage may be realized. In this case, however, the size of a chip of the source drive IC is undesirably increased, causing the cost rise of the chip. At the same time, since the amplitude of output signals of a gate drive IC for scanning signal lines should be widened as well, the voltage stress of TFT controlling signals impressed to the pixels is increased, which leads to a shorter life of PDLCD.

As described hereinabove, the conventional PDLCD is considerably difficult to fulfill the high contrast of displays although it achieves high luminance displays. Therefore, high contrast displays naturally cannot be expected in a projection-type display apparatus using the conventional PDLCD as a light valve.

SUMMARY OF THE INVENTION

The object of the present invention is therefore to provide a display device achieving high luminance and high contrast displays, a driving method of the display device whereby a high voltage is easily impressed to a light modulation layer thereby to allow the light modulation layer to be thick, and consequently realize high contrast displays, and a projection-type display apparatus realizing large-screen displays of high quality by using the above display device as a light valve.

A display device in a first aspect of the invention is provided with a first substrate having pixel electrodes in matrix, a second substrate having a plurality of striped electrodes, and a light modulation layer held between the first and second substrates.

The striped electrodes are arranged to correspond to rows of pixel electrodes (pixel electrodes connected to one gate signal line via TFT). In other words, the number of striped electrodes is equal to the number of rows of the pixel electrodes, and more preferably, the striped electrodes are formed of ITO, having metallic thin films formed in the periphery of the ITO.

One end of the striped electrode is electrically connected to a drive circuit, so that each striped electrode receives a predetermined voltage from the drive circuit. The drive circuit is disposed or formed on the second substrate. In the case where the drive circuit is formed or disposed on the first substrate, a signal output terminal of the drive circuit is electrically connected to the striped electrode on the second substrate via conductive beads or the like. It is better to use a polymer dispersion liquid crystal as the light modulation layer.

A display device of a second aspect of the present invention is provided with a first substrate on which pixel electrodes are arranged in matrix and striped electrodes corresponding to rows of the pixel electrodes are formed, and a second substrate with counter electrodes. It is so constituted that a different voltage can be impressed to any optional striped electrode from that of a striped electrode adjacent to the optional electrode. A light modulation layer is held between the first and second substrates. The striped electrode and pixel electrode constitute a capacitor. A polymer dispersion liquid crystal is suitable for the light modulation layer.

According to a third aspect of the invention, a display device comprises a first and a second substrates at least either of which is light-permeable, a light modulation layer held between the first and second substrates, and a transparent member optically coupled to the first and second substrates.

Supposing that when the light is cast to the light modulation layer, the illuminance of the plane of incidence to the light modulation layer is L, the luminance of the light modulation layer measured at the plane of projection from the direction of a normal of the light modulation layer is B, and the ratio of circumference of a circle to its diameter is $\pi$, the relationship $\pi B/L \leq 1.5$ is held in the display device. More preferably, a polymer dispersion liquid crystal is used as the light modulation layer, and a concave lens or a transparent plate is the transparent member.

A fourth aspect of the present invention provides a display device which consists of a first substrate having pixel electrodes arranged in matrix thereon, a second substrate with a plurality of striped electrodes, a light modulation layer held between the first and second substrates which forms optical images as the change of the scattering state of light, and a transparent member. The transparent member is optically bonded to at least either of the first and second substrates by an adhesive.

The stripe electrodes are disposed to confront corresponding rows of pixel electrodes. Similar to the above third aspect, the light modulation layer satisfies the relationship $\pi B/L \leq 1.5$. A polymer dispersion liquid crystal is desired as the light modulation layer. At the same time, a concave lens or a transparent substrate with some thickness is preferable for the transparent member.

A driving method of a display device according to a first aspect of the invention is a method to drive the display device of the above-described first or fourth aspect of the invention.

The description hereinafter is based on the assumption that an optional striped electrode of the display device is designated as a first striped electrode, and a pixel electrode formed at a position facing the first striped electrode is a first pixel electrode, and moreover a striped electrode at a position adjacent to the first striped electrode is a second striped electrode, a pixel electrode at a position counter the second striped electrode is a second pixel electrode.

In the display device in the first aspect of the present invention, a voltage to be impressed to the striped electrodes can be set differently from that to the pixel electrodes. Therefore, if the voltages impressed to the striped electrodes and pixel electrodes are made opposite in polarity, the voltage difference which is a voltage impressed to the light modulation layer becomes large, and a sufficient electric field can be accordingly added to the light modulation layer even if the light modulation layer is thick. That is, in the case where the light modulation layer is composed of a polymer dispersion liquid crystal, the display device approaches the perfectly scattering state even when the light modulation layer is formed thick. The display contrast is improved. Moreover, the amplitude of signals fed to the pixel electrodes can be relatively small. The generation of heat at the drive circuit can be suppressed. High-speed signals can be handled. Further, if metallic thin films are formed partly on the striped electrodes, the metallic thin films work as a black matrix, shutting the unnecessary light. Since the metallic thin films have lower resistances than ITO, the resistance of the striped electrodes can be reduced, thus preventing the deterioration of the frequency characteristic of signal waveforms impressed to the striped electrodes.

Even in the case where striped electrodes are formed below pixel electrodes, not on the second substrate, as in the display device of the second aspect, a high voltage can be fed to the light modulation layer by controlling a voltage to the striped electrodes. Displays are obtained with high contrast.

When the light modulation layer is of a polymer dispersion liquid crystal, the light is scattered at or passed through the light modulation layer to modulate the incident light. The scattered light is reflected at the first or second substrate, again entering the light modulation layer, and further scattered there to be a secondary scattering light. Since part of the secondary scattering light is projected out from the substrate to reach the screen, the secondary scattering light is a cause for the deterioration of the display contrast. Moreover, the secondary scattering light raises the screen illuminance of the black display, thereby lowering the display contrast.

If a transparent substrate is attached to at least one of the first and second substrates as in the display device of the third aspect, the above-described secondary scattering light is prevented, and the display contrast is improved. If $\pi B/L \leq 1.5$ is satisfied, the improving effect is large enough to achieve the practically sufficient display contrast. The thickness at the center of the substrate can be made smaller if a concave lens is installed instead of the transparent substrate, which makes the device light in weight and compact in size.

According to the fourth aspect of the invention, the display device features the arrangement of both the striped electrodes and the transparent substrate, thereby realizing better display contrast.

Since the display device of the present invention requires no polarizing means such as a polarizing plate or the like, it is needless to say that displays made by the device are with high luminance.

In the first field of TV video signals, a positive-polarity video signal is written in the first pixel electrode, and a first voltage lower than the above signal voltage is added to the first striped electrode. At the same time, a negative-polarity video signal is written in the second pixel electrode, while a second voltage higher than the negative-polarity signal voltage is supplied to the second striped electrode.

In the second field succeeding the first field, on the other hand, a negative-polarity video signal is written in the first pixel electrode, and the first striped electrode receives a second voltage higher than the voltage of the video signal written in the first pixel electrode. A positive-polarity video signal is written in the second pixel electrode and, a lower voltage than the above video signal voltage is written in the second striped electrode. The absolute values of the first and second voltages are desirably equal to each other.

A driving method of a display device according to a second embodiment of the present invention is a method to drive the display device of the first or fourth display device, similar to the driving method of the first embodiment.

In the first field, the first striped electrode is turned to an earth potential, with a positive-polarity video signal written in the first pixel electrode. Thereafter, the first striped electrode is set to a negative-polarity potential. The second striped electrode alike is set at the earth potential and a negative-polarity video signal is written in the second pixel electrode. Then, the second striped electrode is set at a positive-polarity potential.

In the second field, while the first striped electrode is at the earth potential, a positive-polarity video signal is written in the second pixel electrode. Then, the first striped electrode is changed to a positive-polarity potential. The second striped electrode is also set at the earth potential, to which a positive-polarity video signal is written. Subsequently, the second striped electrode is turned to a negative-polarity potential.

A driving method of a display device in a third embodiment of the present invention is to drive the display device of the third aspect. The striped electrodes are formed on the substrate where the pixel electrodes are formed in the display device of the third aspect of the invention. The driving procedure of the display device is quite the same as in the driving method of the second embodiment.

According to the driving method for driving the display device of the invention, voltages impressed to the striped electrodes and pixel electrodes are controlled separately. That is, voltages of opposite polarities can be fed to the striped electrodes and pixel electrodes, and therefore the potential difference is enlarged between the striped electrodes and pixel electrodes. Accordingly, a high voltage is easily supplied to the light modulation layers A projection-type display apparatus according to a first invention uses the display device of the first aspect as a light valve. Similarly, a projection-type display apparatus of a second invention uses the display device of the second aspect, a projection-type display apparatus of a third invention using the display device of the third aspect and a projection-type display apparatus of a fourth invention using the display device of the fourth aspect for respective light valves.

Each projection-type display apparatus is provided with a discharge lamp such as a metal halide lamp or the like, an optical system for guiding the light projected from the discharge lamp to the display device, and a projecting means such as a projecting lens, etc. for magnifying and projecting the light modulated by the display device to a screen, etc. The spreading angle of the light entering the display device is made approximately coincident with the converging angle. of the light condensed by the projecting means. Preferably, the F-number of the projecting means is not smaller than 5 and not larger than 9, and the arc length of the discharge lamp is not smaller than 3 mm and not larger than 6 mm.

The projection-type display apparatus of the present invention uses the light valve having the good display contrast, and therefore, the display contrast of images magnified/projected onto the screen is naturally good.

Since no polarizing plate is used in the display apparatus of the present invention, the screen luminance is high. At the same time, since the F-number, arc length, etc. are set to be optimum, the using efficiency of light is high, without unnecessary heat generated.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 16 and 17 are explanatory plan views for showing the driving method according to the present invention;

FIGS. 28 to 38 are schematical cross-sectional views of the display device for showing a variety of embodiments according to the present invention, respectively;

DETAILED DESCRIPTION OF THE PREFERRED EMBODIMENTS

Preferred embodiments of a display device of the present invention will be depicted hereinbelow with reference to the accompanying drawings.

Figure 1:
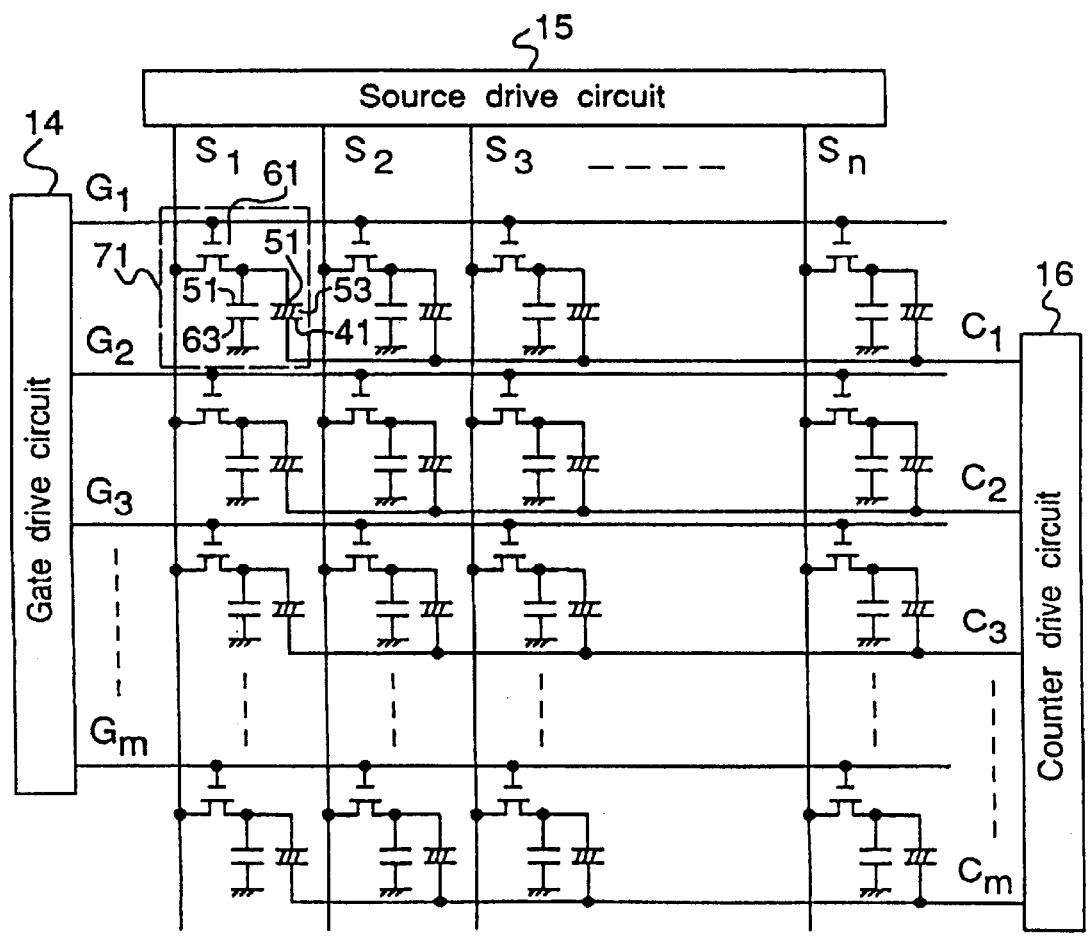
FIG. 1 is an equivalent circuit diagram of the display device according to the present invention.
Figure 10:
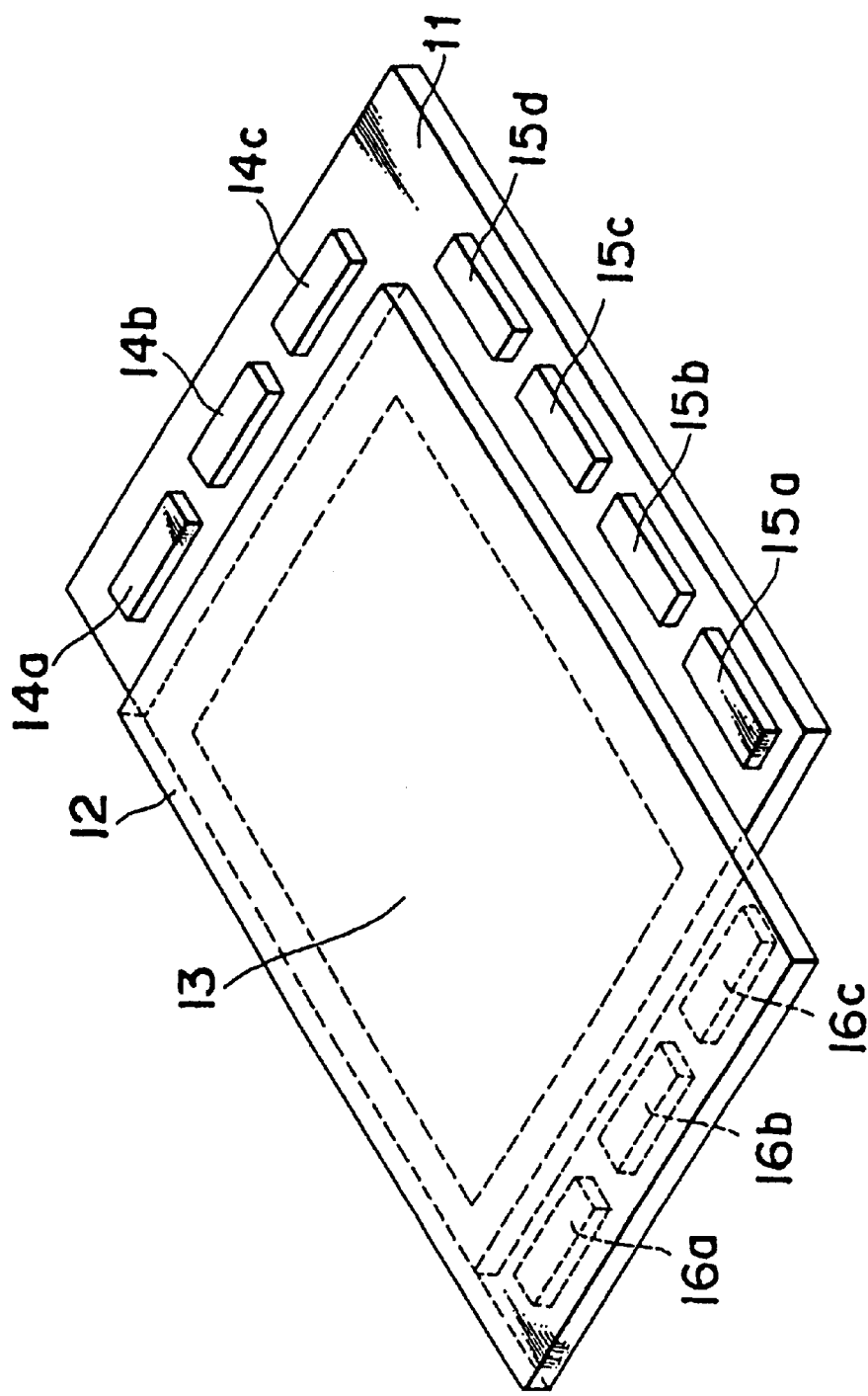
FIG. 10 is a perspective view of the display device according to the present invention.

FIG. 10 is a perspective view of a display device in one embodiment of the present invention, and FIG. 1 illustrates an equivalent circuit diagram of the display device of FIG. 10. In FIGS. 1 and 10 as well as the other drawings, those parts unnecessary for the description are omitted and some are exaggerated or reduced, etc. for the convenience of explanation.

On a substrate 11 (referred to as an array substrate) are formed pixel electrodes 51 in matrix. The pixel electrodes 51 are connected to the corresponding TFTs 61 as switching elements. TFT 61 is connected to a capacitor 64 and the pixel electrode 51. A liquid crystal layer 53 is held between the pixel electrodes 51 and striped electrodes 41. The other end of the capacitor 64 is a common electrode 63. The common electrode 63 is shared among all the one electrodes of the capacitors 64 of the whole pixels. TFT 61 is driven by signals impressed to a gate signal line G1-Gm and a source signal line S1-Sn. A gate drive circuit 14 is connected to one ends of the gate signal lines Gi (i is 1–m), outputting signals to turn TFTs 61 into an operating state (ON state) and into a non-operating state (OFF state). On the other hand, a source drive circuit 15 samples video signals and outputs the signals to source signal lines S1-Sn.

C1-Cm are striped electrodes 41 formed at the surface of a counter substrate 12 in touch with the liquid crystal layer 53. The electrodes 41 are shown in a plan view in FIG. 4. The striped electrode 41 generally formed of ITO extends at least from one end to the other end of an effective display area 13. The electrodes 41 are formed with the same pitch as the pixel electrodes 51.

Figure 5:
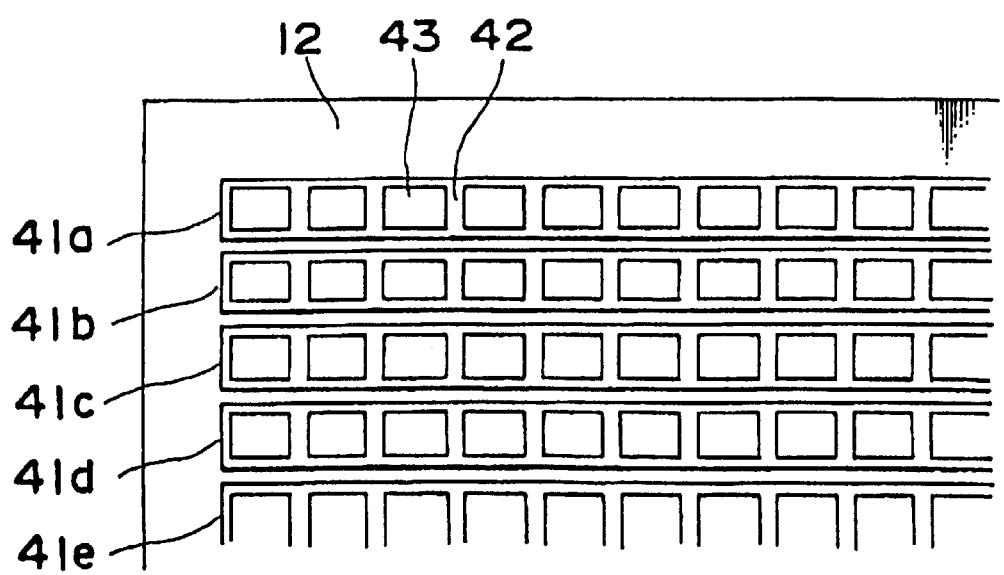
FIG. 5 is a partial plan view of another example of the substrate with the striped electrodes shown in FIG. 4.

One end of each striped electrode 41 is connected to a counter drive circuit 16. The striped electrode 41 may be considered as a signal line for the counter drive circuit 16, and in such case, the striped electrode 41 will be referred to as a counter signal line C1-Cm. Since ITO has a relatively low resistance, the voltage may be decreased from a contact point of the counter drive circuit 16 to a non-contact terminal, which can be solved by a metallic thin film 42 formed as shown in FIG. 5. The metallic thin film 42 is made of chromium or the like, with openings 43 at a position facing the pixel electrodes 51. The metallic thin film 42 is disposed over the TFTs, gate signal lines and source signal lines to shut light. That is, the metallic thin film 42 is effective to shut light as the black matrix and lower the resistance of the striped electrodes.

Figure 8:
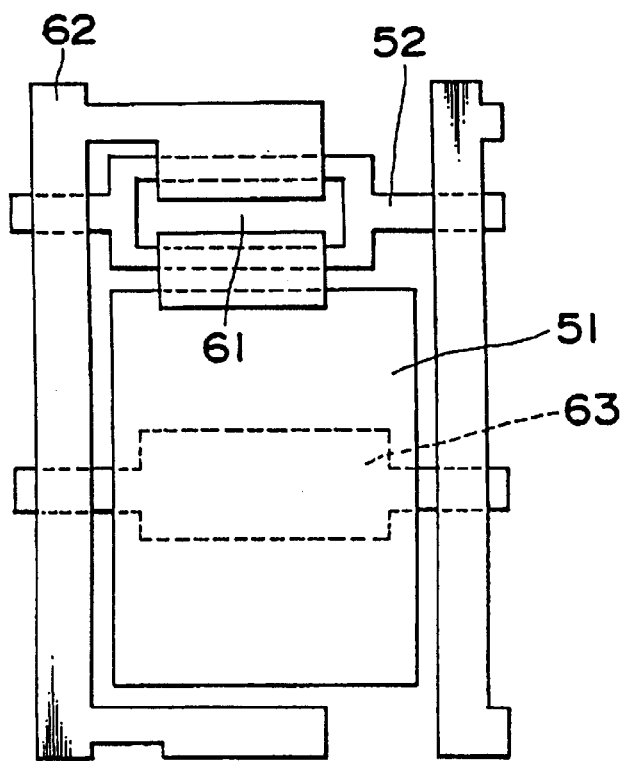
FIGS. 8 and 9 are plan views each showing a composition of a pixel in the display of the present invention.

FIG. 8 is a plan view of the pixel, in which the pixel electrode 51 is connected to TFT 61. The common electrode 63 is formed below the pixel electrode 51, and insulated from the pixel electrode 51 via an insulating film.

Specifically, drive circuits 14, 15, 16 are ICs having projecting electrodes (not shown) of Au formed several to 100 $\mu$m high at the signal terminal electrode parts thereof by plating or nail head bonding technology. The projecting electrodes are electrically connected to signal lines via a conductive bonding layer (not shown) using a mixture of, for example, epoxy series or phenol series chief material with flakes of Ag, Au, Ni, C, SnO2 or the like, or an ultraviolet curing resin, etc. as an adhesive. The conductive bonding layer is formed on the projecting electrodes by transfer printing or the like method.

Although the drive ICs are mounted on the substrate in FIG. 10, the invention is not restricted to this arrangement. For instance, if the array substrate 11 is formed by the high or low temperature polymerization of silicon, needless to say, the drive ICs may be formed directly on the substrate through the semiconductor technique. Moreover, the substrate 11 may be connected with signal lines in a film carrier process by using a polyimide film or the like with ICs loaded thereon, instead of mounting the ICs on the substrate 11.

Figure 6:
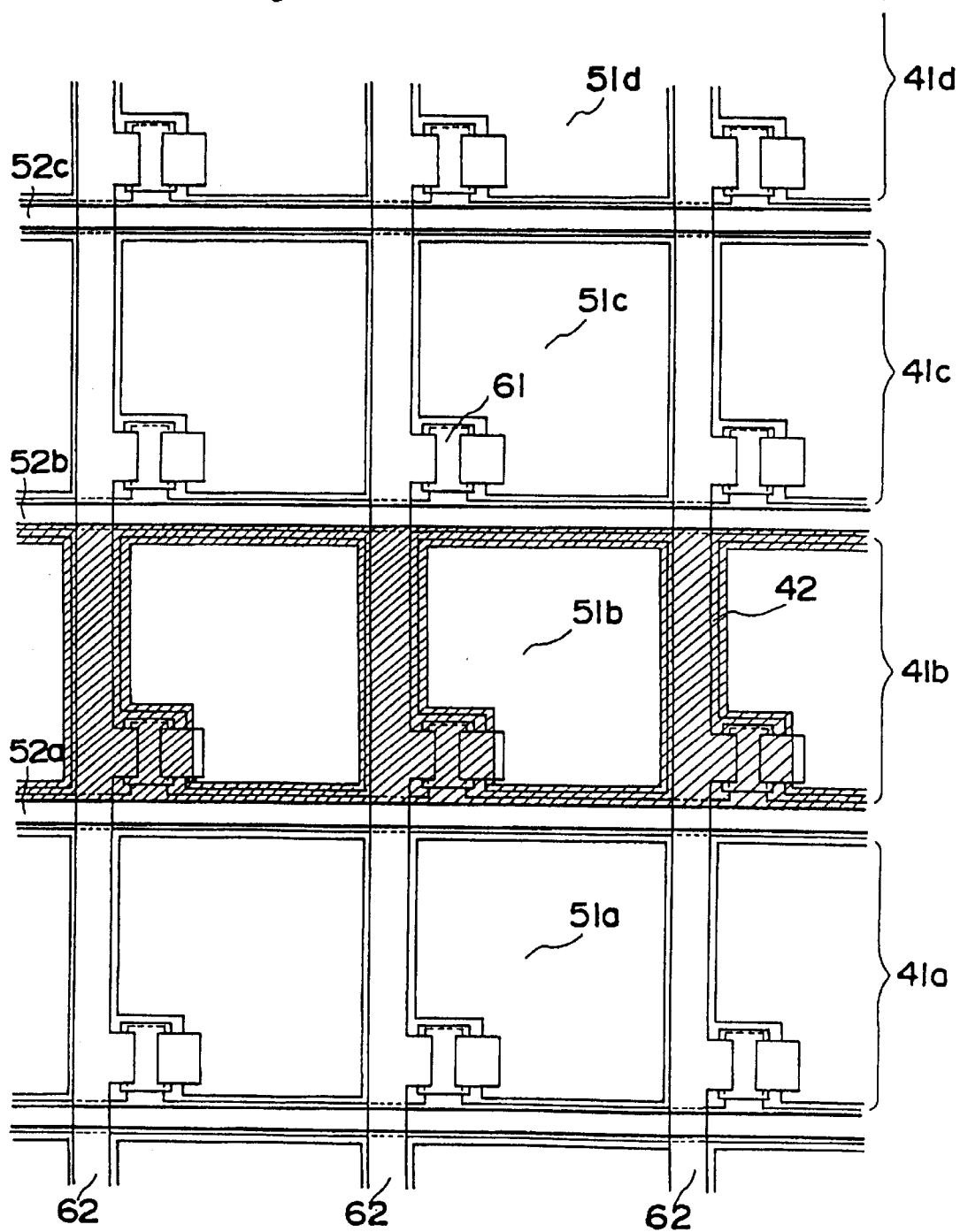
FIG. 6 is an enlarged partial plan view of a display part in the display device of the present invention.
Figure 7:
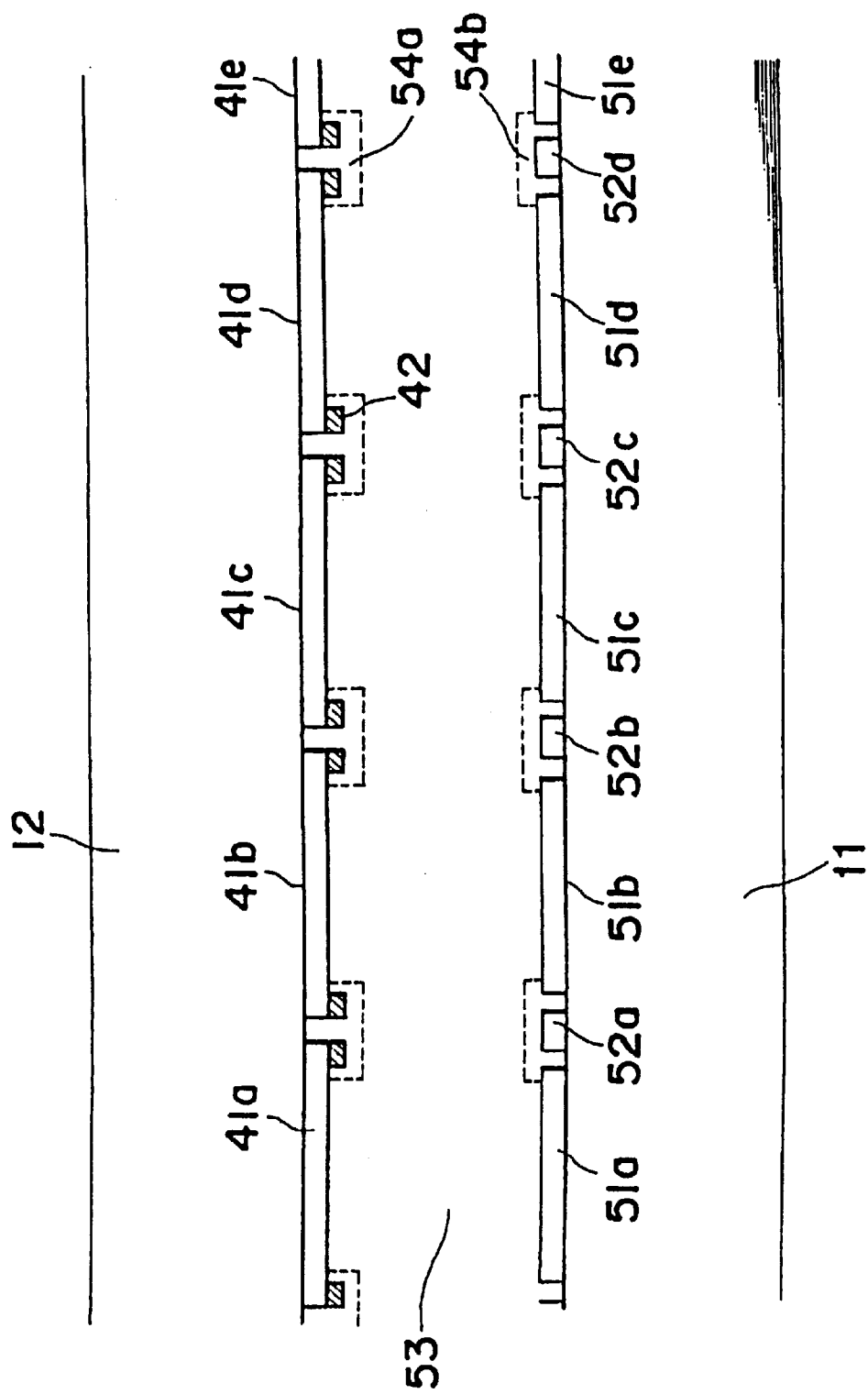
FIG. 7 is a partial cross-sectional view of the display part shown in FIG. 6.

FIGS. 6 and 7 are plan view and sectional view of a display part of the display device of FIG. 1. Striped electrodes 41 are disposed to face the pixel electrodes 51. The metallic thin film 42 is attached, if required, at a position indicated by slantwise lines in FIG. 6. The striped electrodes 41 are preferably set as close as possible to the adjacent ones. If the distance of the striped electrodes is too large, the numerical aperture of pixels is decreased. In the case where the striped electrodes are formed on a TN liquid crystal panel, a transversal electric field is generated between the adjacent striped electrodes 41, causing the abnormal orientation of liquid crystal molecules and shading of images. If the striped electrodes are formed on a PD liquid crystal panel, the resulting transversal electric field orientates the liquid crystal molecules and therefore the incident light is scattered more. The PD liquid crystal does not require an orientating treatment, not alike the TN liquid crystal. The PD liquid crystal never accompanies the disturbance of orientation of striped electrodes at all.

When a transversal electric field is generated between adjacent striped electrodes 41, liquid crystal molecules in the light modulation layer are oriented along electric force lines of the transversal electric field. In a PD liquid crystal light modulation layer, the oriented liquid crystal scatters one of P and S polarization lights and transmits the other. Namely, the light incident on a portion where the transversal electric field is generated has a dependence of polarization upon emitting from the panel. The display contrast is reduced due to the transparency to P or S polarization light.

In order to prevent this, it is very effective to form a low dielectric film 54a as indicated by dotted lines in FIG. 7. The term "low dielectric film" means a thin or thick film made of a dielectric material having a dielectric constant smaller than that of the light modulation layer 53. This low dielectric film 54a is formed to cover the metallic thin film 42 using $SiO_2$ or polymer 381 as PD liquid crystal. The dielectric constant of $SiO_2$ or polymer 381 is 4 or 5 for smaller that of the liquid crystal having a value of 15 to 30. When the low dielectric film 54a is formed, electric force lines pass through the liquid crystal layer 53 preventing occurrence of the transversal electric filed and, thereby, enhancing the display contrast.

A transversal electric field may be generated between a pixel electrode 51 and a signal line 52. Accordingly, it is also effective to form a low dielectric film 54b to cover the signal line 52.

It is also to be noted that the striped electrode may be formed so as to correspond to two or more rows of pixel electrodes.

The counter substrate 12 is registered and attached to the array substrate 11 so that a gate signal line 52 is positioned to face the gap of the striped electrodes 41. The polymer dispersion liquid crystal layer 53 is held between the pixel electrodes 51 and striped electrodes 41.

For the liquid crystal layer 53 of the display device of the present invention, a nematic liquid crystal, a smectic liquid crystal or a cholesteric liquid crystal is preferably used, and also a mixture including one, or two or more kinds of liquid crystal compounds or the other substance than the liquid crystal compounds may be employed. Among the above kinds of material, a cyanobiphenyl group nematic liquid crystal or chloro group nematic liquid crystal is more preferable. Particularly, the chloro group nematic liquid crystal is less decomposed by the light and is stable with good heat-proof properties, and moreover the retention, of electric charges in the chloro series nematic liquid crystal layer is made as high as not smaller than 90%. Therefore, the present invention employs the chloro series liquid crystal.

Transparent polymers are fit for the resin components. Although any of thermoplastic resins, thermosetting resins and photosetting resins may be used, ultraviolet curing resins are most desired from the viewpoint of manufacturing easiness and ready-to-separate characteristic to the liquid crystal. An ultraviolet-setting group resin is specifically cited as an example of the invention, preferably containing acrylic monomers and acrylic oligomers which are polymerized and hardened when ultraviolet rays are cast thereto. Only the resin components of this material are polymerized to be polymers when illuminated by the ultraviolet rays, and the liquid crystal alone shows the phase separation. The present invention uses an ultraviolet curing resin, whereas the prior art display device disclosed in U.S. Pat. No. 4,435,047 uses a thermosetting resin.

Monomers to form polymers through polymerization are 2-ethyl hexyl acrylate, 2-hydroxy ethyl acrylate, neopentyl glycol diacrylate, hexanediol diacrylate, diethylene glycol diacrylate, tripropylene glycol diacrylate, polyethylene glycol diacrylate, trimethylol propane triacrylate, pentaerythritol acrylate, etc.

Oligomers or propolymers for the polymer are, for example, polyester acrylate, epoxy acrylate, polyurethane acrylate, etc.

An initiator may be added to quickly perform the polymerization, for instance, 2-hydroxy-2-methyl-1-phenylpropane-1-on-("DAROCURE 1173" produced by Merck & Corp. Inc.), 1-(4-isopropylphenyl)-2-hydroxy-2-methylpropane-1-on ("DAROCURE 1116" by Merck & Corp. Inc.), 1-hydroxy cyclohexyl phenylketone ("IRGACURE 651" by Ciba-Geigy). Additionally, chain transfer agents, photosensitizer, dye agent, cross-linking agents or the like may be suitably optionally employed.

In this case, if the amount of the liquid crystal is small in comparison with that of polymer, the liquid crystal is formed separately in drops. Meanwhile, if the amount of the liquid crystal is large, resin components are found in the form of particles or a network in the liquid crystal, so that the liquid crystal becomes a continuous layer. Unless the particle size of drops of the liquid crystal, or the diameter of the polymer network is uniform to some extent in the range of 0.5–several $\mu$m, the scattering efficiency of the incident light is inferior to miss the contrast of displays. Therefore, the average particle size of drops of the liquid crystal or the average diameter of the polymer network is suitably 0.8–3.0 cm. For this reason, the material should be such that is completely set in a short time like ultraviolet curing resins. The favorable blending ratio of the liquid crystal and polymer is 90:10–30:70, especially, 50:50–90:10.

In the present invention, although the polymer dispersion liquid crystal is used for the light modulation layer 53, the material is not restricted to the polymer dispersion liquid crystal, and a twist nematic liquid crystal, a superwist nematic liquid crystal, etc. may be used, for instance. It is to be noted here, however, that the light modulation layer in the display device of the invention intended to prevent the secondary scattering light which will be described later and to improve the display contrast should be so defined in the claims as "forms optical images as the change of the scattering state of light". For forming the optical images as the change of the scattering state of light, a thermal addressed mode, a dynamic scattering mode (DSM), and a ferroelectric liquid crystal are exemplified. PLZT is also discussed by way of example. All of the aforementioned examples are included in the technical concept of the present invention. At the same time, the invention is not restricted to a liquid crystal display device or a projection type display device which writes signals to the pixel electrodes by TFTS, and implicates a display device of an optically addressed type such as ILA® offered by JVC-HUGES.

Figure 2:
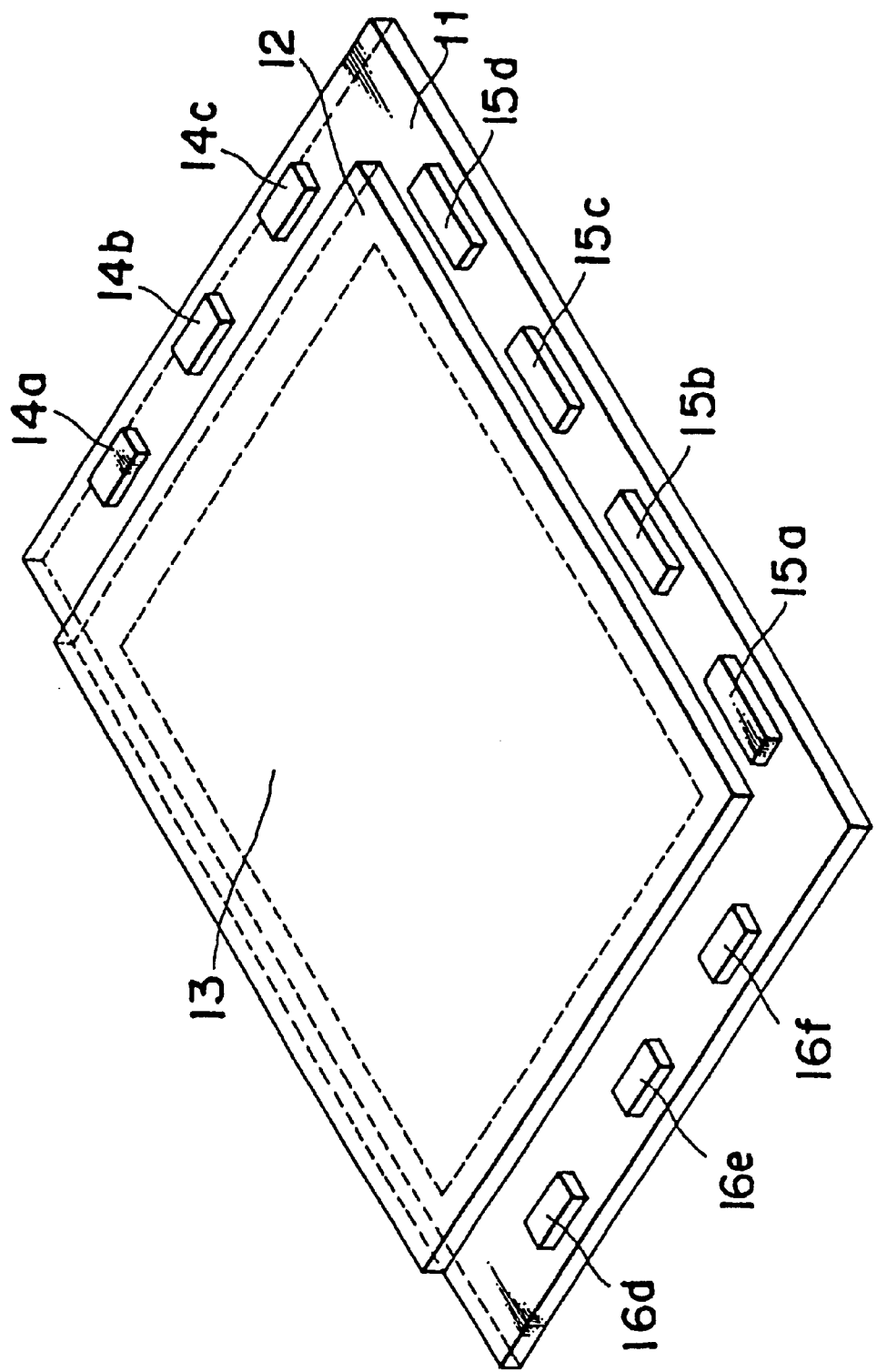
FIG. 2 is a perspective view of a display device in a different embodiment of the present invention.

In the constitution of the display device shown in FIG. 10, the counter drive circuit 16 is mounted onto the counter substrate 12. However, since it is necessary to provide both substrates 12, 13 with drive ICs 14, 15, 16, it is more or less difficult to manufacture the display device of FIG. 1 in a panel. FIG. 2 indicates a display device having ICs 14, 15, 16 mounted on the array substrate 11.

When the counter drive circuit 16 is set on the array substrate 11 as in FIG. 2, it becomes necessary to transmit output signals from the circuit 16 to the striped electrodes 41 on the substrate 11. The method and constitution for this transmission of signals will be discussed below.

Figure 3:
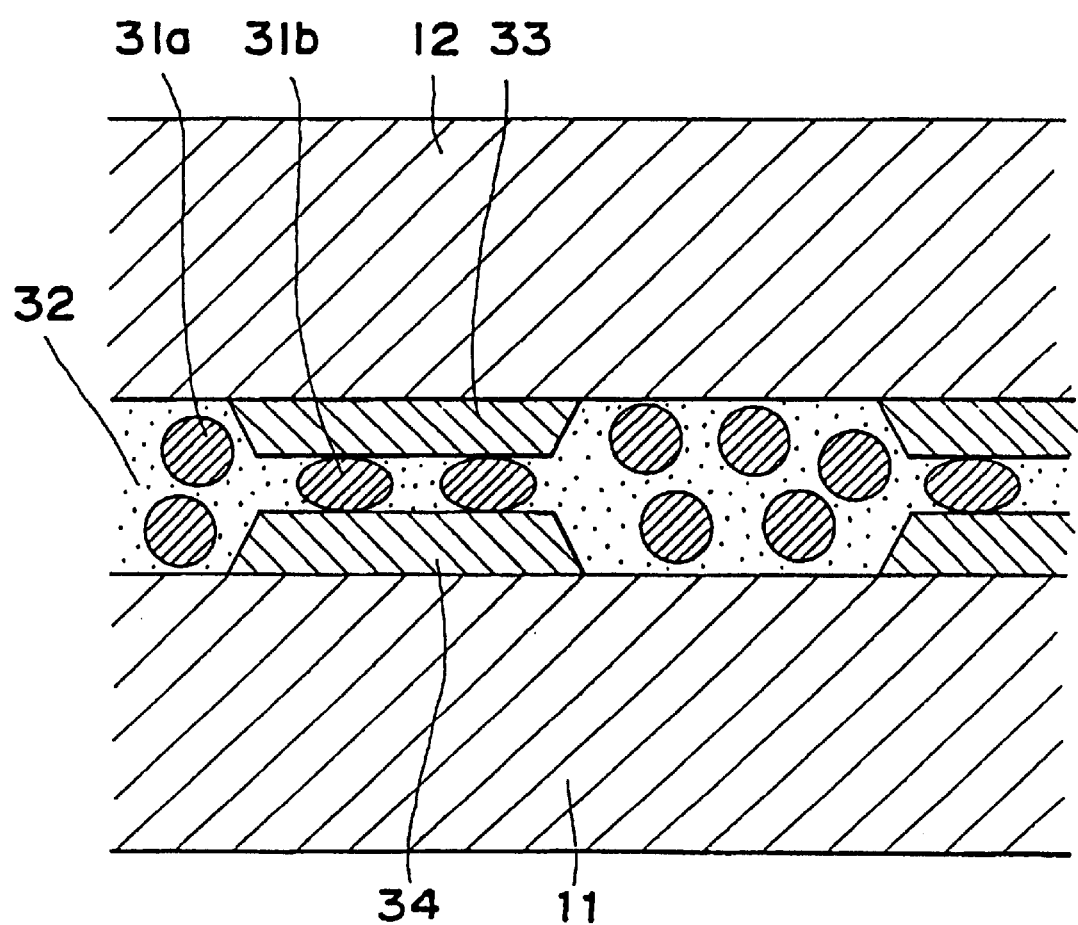
FIG. 3 is a partial sectional view of the perspective view of the display device of the present invention.

In FIG. 2, each drive circuit is placed on the array substrate 11. Naturally, each circuit may be formed directly on the array substrate 11 by the polymerizing technique of silicon. A contact part between a signal output terminal 34 of the counter drive circuit 16 and one terminal 33 of the striped electrode 41 is shown in cross section in FIG. 3. The output terminal 34 is one end of the signal line of the counter drive circuit 16. The terminals 33, 34 are formed of relatively thick metallic thin films by plating or the like manner. The liquid crystal layer 53 is 10 $\mu$m or more thick, and therefore the terminals 33, 34 of metallic thin films are set, for instance, not smaller than 1 $\mu$m and not larger than 4 $\mu$m thick.

A conductive bead 31 is obtained by plating a resin core with Ni, and further processing the Ni-coated core by Au plating. The diameter of the conductive bead 31 is not larger than the thickness of the liquid crystal layer 53. It is desirable that the conductive bead 31 has such diameter as is crushed to not larger than 70% when held between the terminals 33 and 34. Therefore, 5 to 10 $\mu$m or smaller diameter is appropriate. The conductive beads 31 are dispersed in the insulating adhesive 32. When the beads 31 are held between the terminals 33 and 34, the beads electrically connect the terminals 33 with 34 as denoted by a conductive bead 31$b$. In the other cases than the above as represented by a conductive bead 31$a$, the terminals 33 and 34 are insulated by the adhesive. The bead 31 may be replaced with a fiber.

The drive circuits 14, 15, 16 can be formed on the array substrate 11 with the use of the polymerizing technique of silicon. Since it becomes unnecessary to mount the drive circuits on the counter substrate, the manufacturing cost is reduced.

Figure 9:
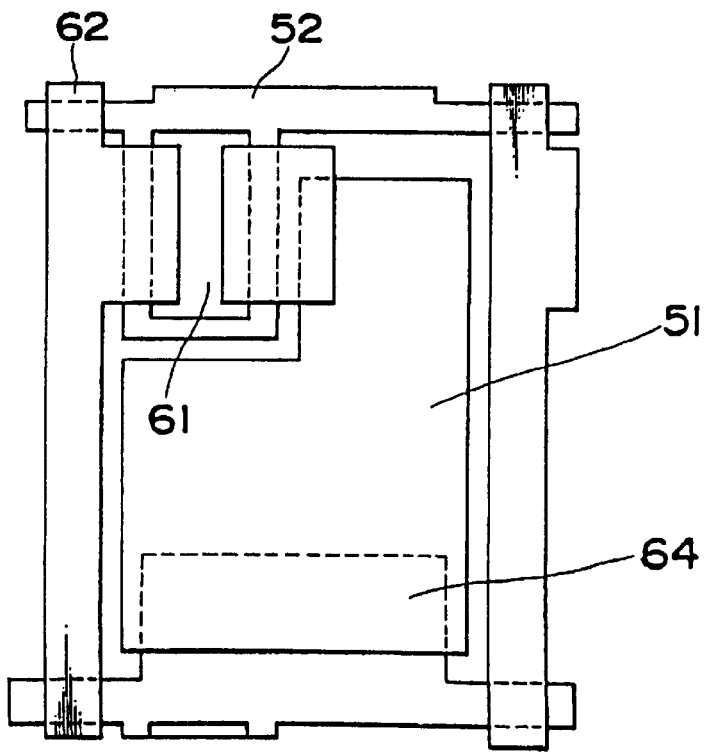

In FIG. 1, the pixels are constructed in a so-called common electrode arrangement shown in FIG. 8. The arrangement of the striped electrodes 41 may be employed in a prestage gate system of FIG. 11. The capacitors are formed between the gate signal lines Gi (i is 1–m) and pixel electrodes 51 in the arrangement of FIG. 11. The constitution of the pixel in this case is indicated in FIG. 9. TFT 61 is connected to the pixel electrode 51. An insulating film (not shown) is formed on the pixel electrode and the gate signal line 52, over which the pixel electrode 51 is superposed to constitute the capacitor 64.

Figure 13:
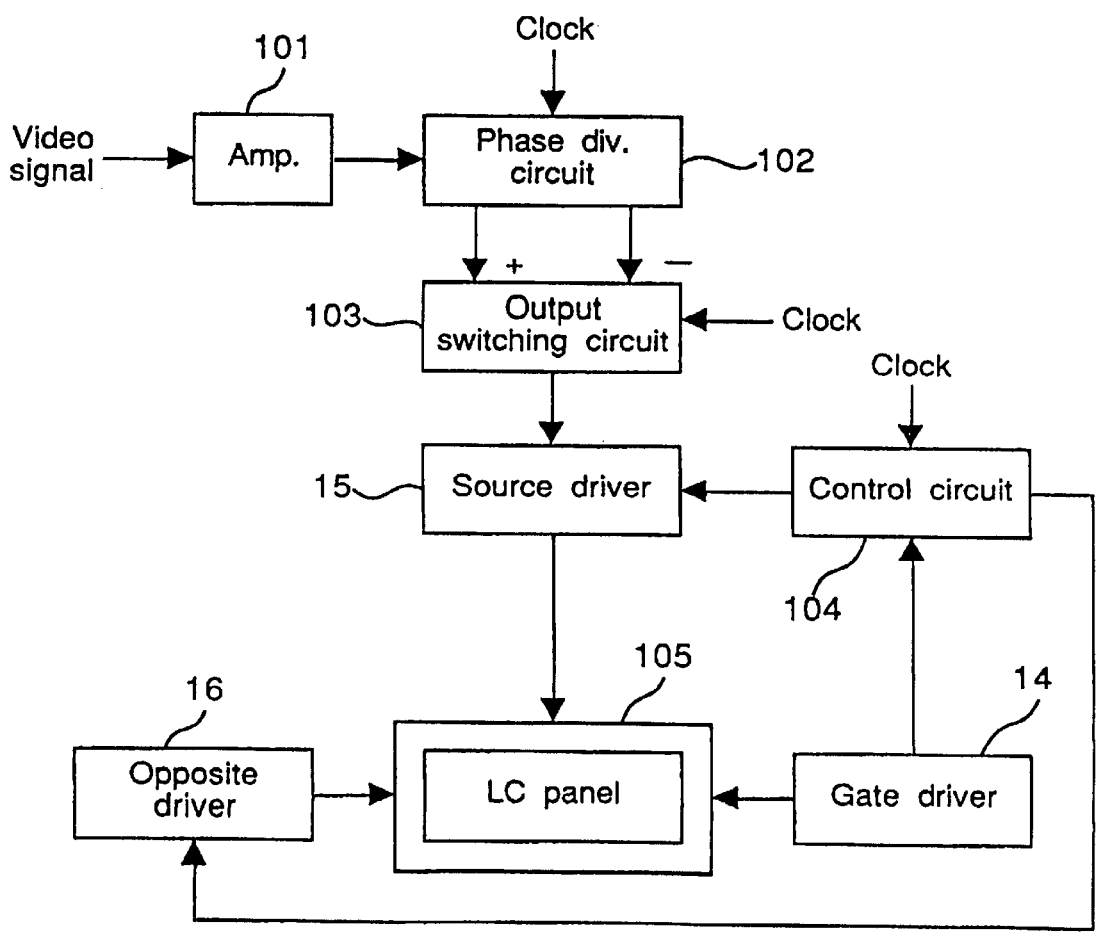
FIG. 13 is a block diagram of the display device according to the present invention.

FIG. 13 is a block diagram of a driving circuit in one embodiment in the display device of the invention. In FIG. 13, 101 is an amplifier for amplifying video signals to a predetermined level, and 102 is a phase splitting circuit for forming video signals of positive- and negative-polarities. The positive-polarity means a higher potential to the potential of the counter electrode (referred to as a common voltage hereinafter) and the negative-polarity indicates a lower potential to the common voltage. It is to be noted that the counter electrode is the striped electrode 41 in the display device of the present invention. The potential of the striped electrode 41 is changed to a first and a second potentials by the counter drive circuit 16. The description below is based on the assumption that the common voltage is an average of the first and second potentials.

The other references in FIG. 13 are: 103 an output switching circuit for outputting alternating video signals with polarities inverted every field or every horizontal scanning period (1H); 105 a liquid crystal panel; and 104 a control circuit for synchronously controlling the source drive circuit 15, gate drive circuit 16 and counter drive circuit 16.

The operation of the above driving circuit of the display device will be depicted now.

The amplifier 101 adjusts the gain to make the amplitude of video signals correspond to electro-optic characteristics of the liquid crystal layer 53. Then, the adjusted video signals are guided into the phase splitting circuit 102, and divided into two video signals of positive- and negative-polarities with respect to the common voltage. The two video signals are input to the output switching circuit 103. The output switching circuit 103 generates video signals having polarities inverted every one field or every 1H. The polarities of the signals are inverted so as to impress an alternating current voltage to the liquid crystal layer 53. If a direct current voltage is added to the liquid crystal layer 53, the liquid crystal layer is decomposed and deteriorated.

Subsequently, the video signals are sent out from the output switching circuit 103 to the source drive circuit 15. The control circuit 104 synchronizes the source drive circuit 15, gate drive circuit 14 and counter drive circuit 16.

Figure 14:
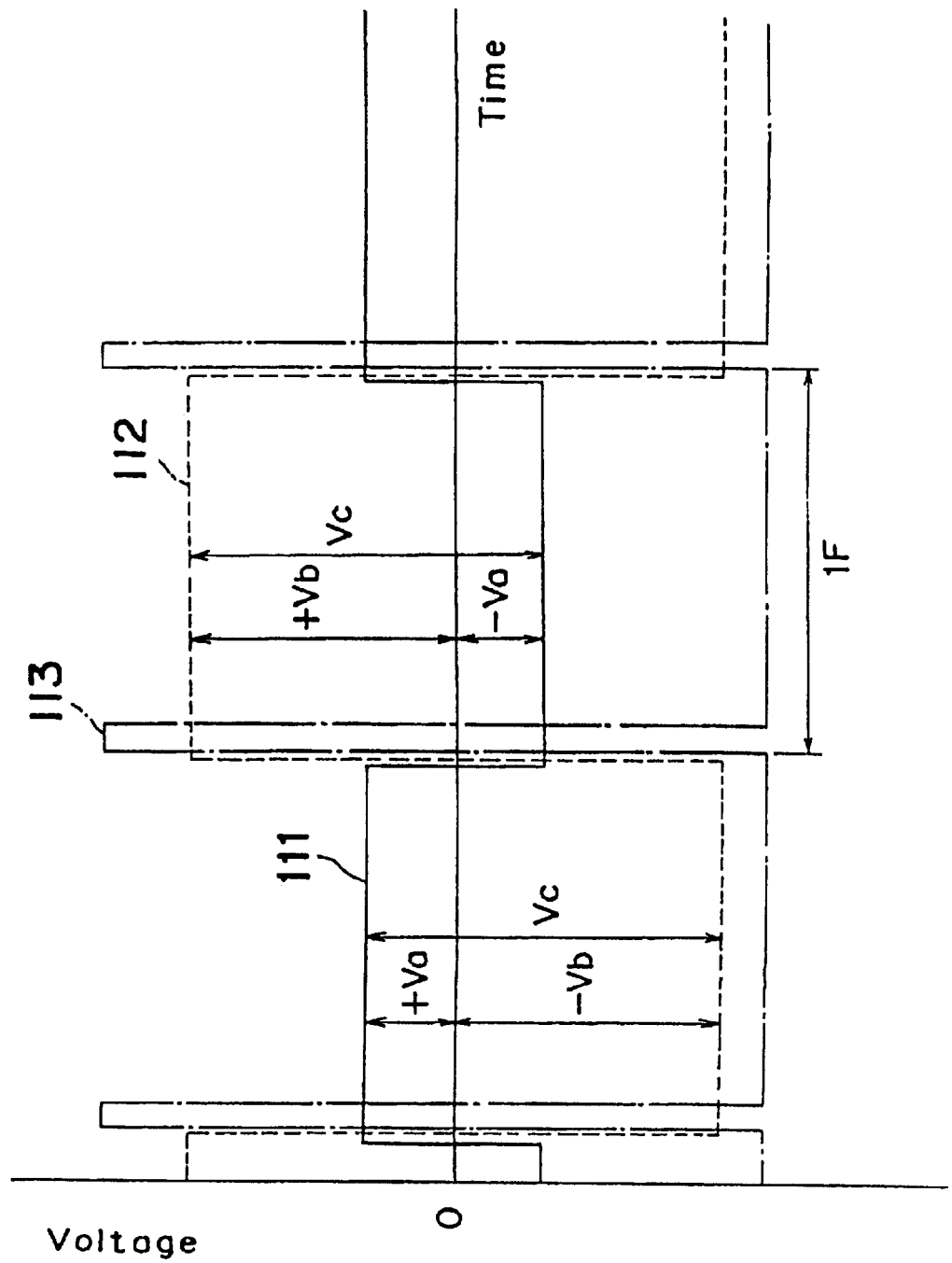
FIG. 14 is a diagram of a driving signal for one pixel.

FIG. 14 diagrammatically shows the signal waveform seen from one pixel. The waveform during the actual driving of the display device is slightly different from FIG. 14 because of the parasitic capacity of TFTS, etc. An impressing voltage and the like will be described conceptually by way of example.

Waveforms 111, 112 and 113 in FIG. 14 indicate those of signals impressed to a striped electrode, a source signal lines and a gate signal line, respectively. For the brevity of explanation, the following description will be made based on that the pixel is the pixel 71, striped electrode 41 is C1, gate signal line is G1 and source signal line is S1 of FIG. 1.

The counter drive circuit 16 outputs +Va or −Va potential. The output in the first field (1F) of TV signals is such that the counter signal lines C2i and C2i+1 (i is an integer) become +Va and −Va potentials. In the second field (2F), such a voltage is generated that the counter signal lines C2i+1 and C2i are turned to +Va and −Va potentials. The voltage impressed to the counter signal lines is alternately switched every 1H to drive as above. In other words, for example, when the counter signal line C2i shows +Va and the counter signal line C2i+1 is −Va, the counter signal line C1 is changed to +Va, and 1H later, the counter signal line C2 is changed to −Va. Another 1H later, the counter signal line C3 is turned to +Va. When the voltage is changed in the above manner, the potential of all the counter signal lines is inverted. In the next field, again, the counter signal line C1 is inverted to −Va.

The above voltage Va is not higher than a rise voltage of the liquid crystal. The rise voltage of the liquid crystal is a voltage when the orientation of the TN liquid crystal starts to change and when a polymer liquid crystal starts to transmit the light. The incident light is not modulated even when a voltage not higher than the rise voltage is added to the liquid crystal layer. In other words, so long as Va is not larger than the rise voltage of the polymer liquid crystal, the liquid crystal is never changed into the light permeable state if the pixel electrode shows 0V.

In the meantime, the source drive circuit 15 also changes the polarity of signals every 1H. In FIG. 14, the source signal line generates −Vb or +Vb voltage at the time of the raster display. When moving pictures are to be displayed on the liquid crystal panel, naturally, the outpost of the source signal line is not a constant voltage, unlike ±Vb as shown in FIG. 14. The driving method to change the polarity of output signals from the source drive IC every 1H is called as a "1H inversion drive".

Figures 16, 17:
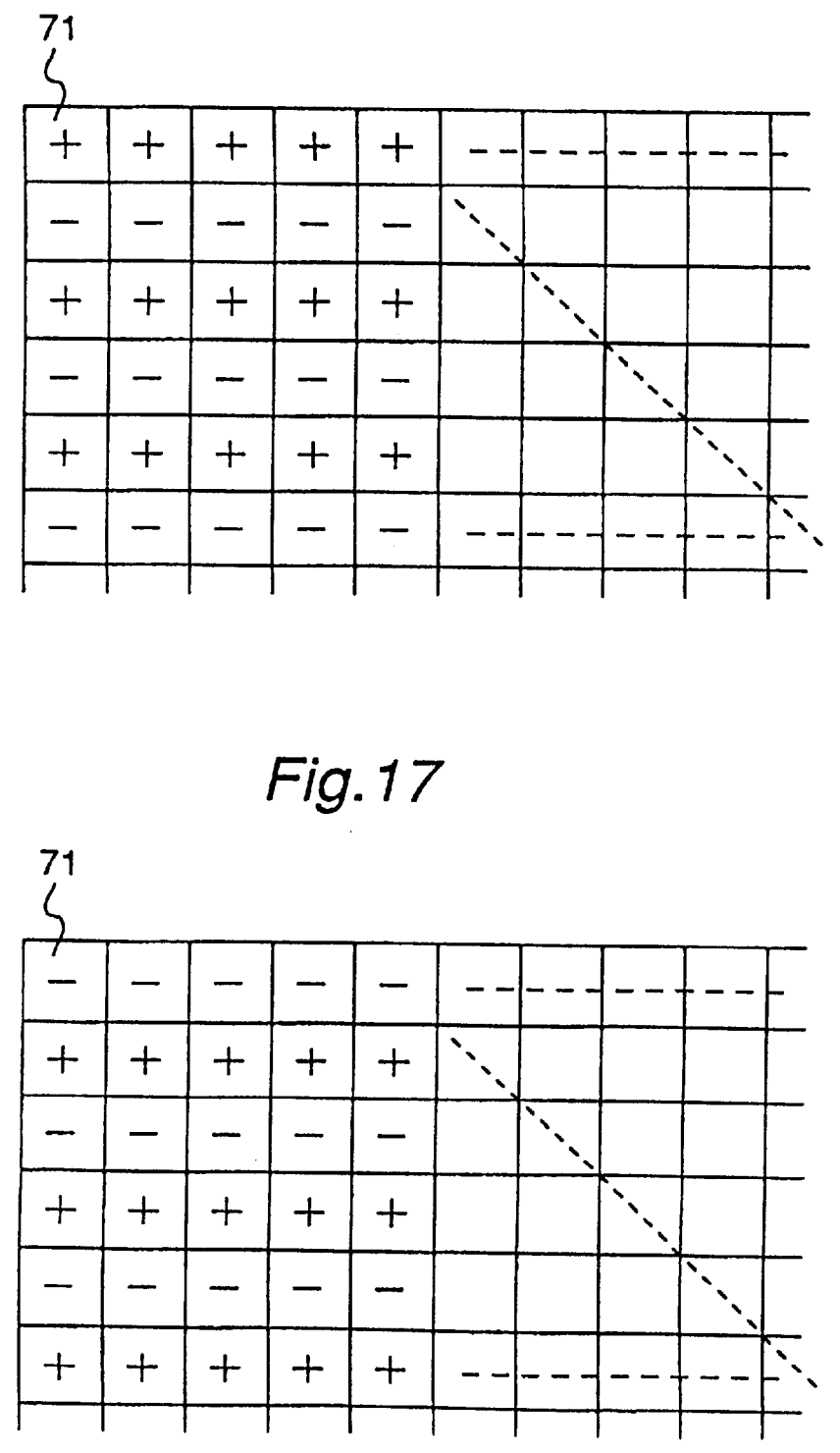

The aforementioned "1H inversion drive" is diagrammatically represented in FIGS. 16 and 17 in which the pixel 71 is drawn by a square. When the positive-polarity voltage is written in the pixel 71, the state is indicated by +, whereas, when the negative-polarity voltage is written in the pixel 71, it is marked by −. FIG. 17 shows the write state one field later from FIG. 16 showing a write state to a field.

The gate drive circuit 14 outputs a higher voltage than the maximum output voltage (referred to as an ON voltage) so as to surely write the voltage from the source signal lines to the pixel electrodes, and a lower voltage than the minimum output voltage (referred to as an OFF voltage) so as not to switch on the TFTs upon receipt of the minimum output voltage.

Referring to FIG. 1, when TFT 61 is turned on, −Vb voltage is written in the pixel 71. At this time, the counter signal line C1 is held at +Va voltage. +Vb voltage is written in the pixel 71 in the next field, while the counter signal line C1 is kept at −Va voltage. As the above change is repeated every one field, the pixel 71 eventually receives a voltage Vc=Va+Vb. The counter signal line C1 is alternatively at +Va or −Va voltage. The voltage written in the pixel 71 by TFT 61 is changed by a display image (video signals).

Accordingly, in the present invention, it becomes possible to impress a high voltage to pixels as the counter electrodes are striped electrodes. However, seen from the operation of TFTs, this is not different from the conventional 1H inversion drive. Therefore, the conventional source drive IC and gate drive IC are utilizable in the present invention and moreover, the dielectric properties of TFTs 61 are not necessary to be improved.

For example, if Va=4V and the maximum-output voltage Vm of the source drive IC is 6V, it is possible to drive the display device with Vc=Va+Vm=4+6=10V. In the conventional polymer dispersion liquid crystal, if the thickness is 10 μm, the light comes to be transmitted at 6V. However, the scattering efficiency of light is low when the film thickness is 10 μm, and therefore the good display contrast cannot be expected. To the contrary, since it is possible to impress 10V to the liquid crystal layer 53 according to the present invention and consequently, the film thickness of the liquid crystal layer 53 may be close to 15 μm, the scattering efficiency is remarkably improved, so that the good display contrast is achieved. The display device of the present invention easily realizes the output voltage Vm of 10V. Moreover, since the conventional members such as TFTs, drive circuits, etc. at the array substrate 12 can be used as they are, the manufacturing cost is not increased, and TFTs 61 are not deteriorated by the voltage stress owing to the output voltage Vm kept at the same 6V as in the conventional arrangement.

In FIG. 14, the counter drive circuit 16 outputs +Va and −Va potentials and, the source drive circuit 15 generates +Vb and −Vb potentials. The driving method of the invention is not limited to the above. Another embodiment of the driving method will be discussed now with reference to FIGS. 20 and 21.

Figure 18:
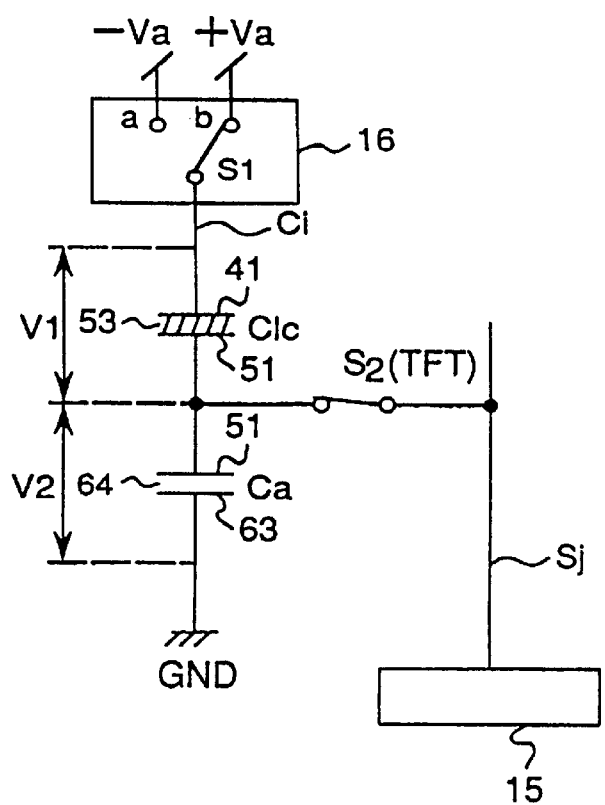
FIG. 18 is an explanatory circuit diagram for showing the driving method according to the present invention.

For facilitation of understanding, the foregoing driving method will be more fully explained with reference to FIG. 18. Since TFT 61 of the pixel is a switching element, it can be regarded as a switch and denoted by S2. The liquid crystal layer 53 is considered as a capacitor C1c. Ca is a capacitor 64. +Va or −Va potential is impressed to the counter signal line C1, that is, the two potentials are switched by a switch S1. A voltage added to the liquid crystal layer 53 is V1 and a voltage input to the capacitor 64 is V2.

When the ON voltage is fed to the gate signal line, TFT 61 is turned into the operating state, with impressing a signal from the source drive circuit 15 to the pixel electrode 51. If the signal is negative-polarity −Vb and the counter signal line 41 has +Va potential, the voltage V1 to the liquid crystal layer 53 becomes Va+Vb. If the signal is positive-polarity +Va, the switch S1 is changed over to a terminal, a to turn the counter signal line 41 to −Va potential, whereby the voltage impressed to the liquid crystal layer 53 becomes Va+Vb. Therefore, even when the output signal from the source drive circuit 15 is Vb, the voltage V1 impressed to the liquid crystal layer 53 is a high voltage (Va+Vm) including the added potential Va of the counter signal line. If the potential impressed to the counter signal line 41 is +Va, a positive-polarity signal may be added to the pixel electrode 51 so long as the signal is not larger than +Va voltage. When the voltage supplied to the pixel electrode 51 is +Va and the potential impressed to the counter signal line 41 is +Va, Va−Va=0V is fed to the liquid crystal layer 53, that is, the liquid crystal layer 53 is turned into the state with no voltage impressed. Accordingly, the voltage impressed to the pixel electrode 51 is set to be not larger than +Va when the counter signal line 41 is +Va, and −Va or larger when the counter signal line 41 is −Va.

Now, the driving method of the present invention in the modified embodiment will be described. The counter drive circuit 16 in FIGS. 20 and 21 is able to output signals of three potentials, i.e., common voltage (0V=GND for easy understanding), +Va and −Va.

Figure 20:
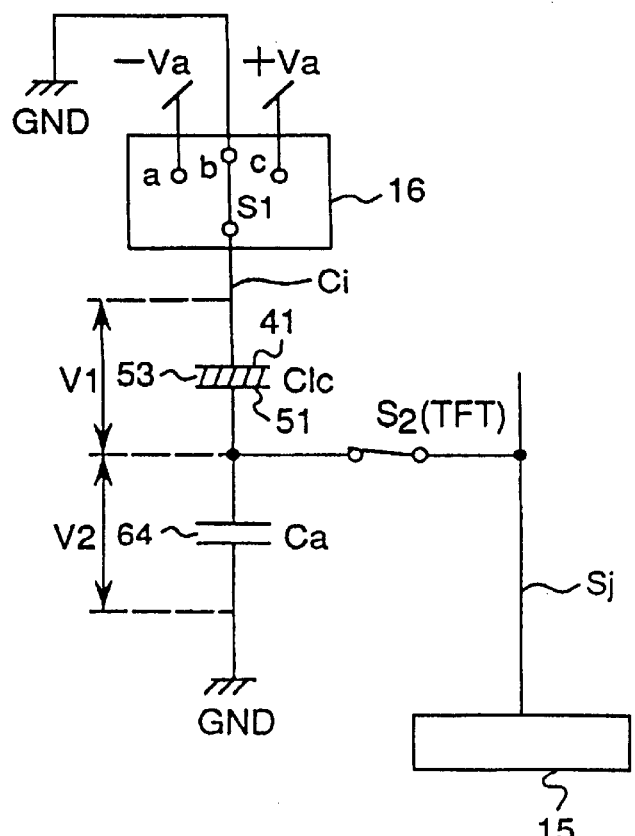
FIGS. 20 and 21 are explanatory circuit diagrams for showing a further example of the driving method according to the present invention.
Figure 21:
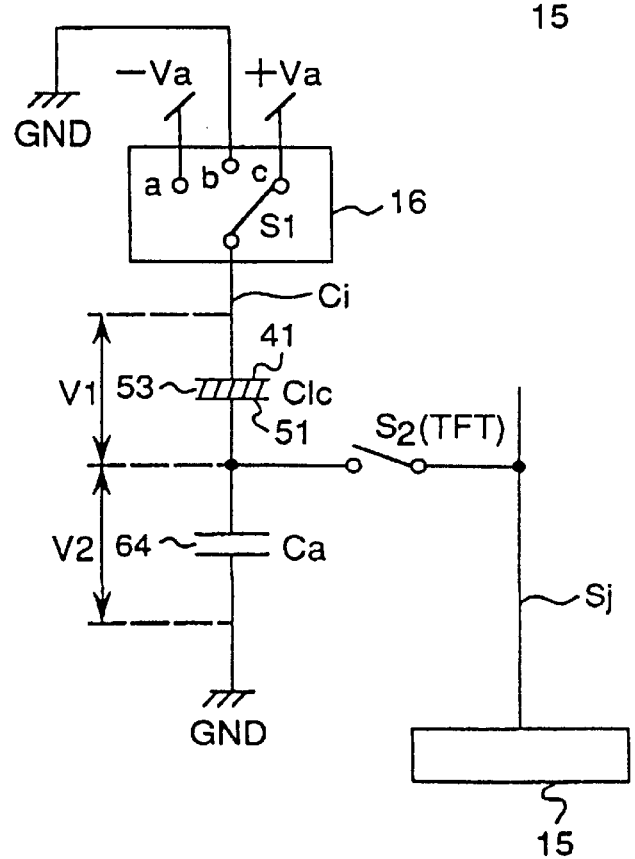

Referring first to FIG. 20, a voltage Vx is written in the pixel electrode 51 while the counter signal line 41 is held at the potential GND. The voltage applied to the liquid crystal layer 53 becomes V1=Vx. After one horizontal scanning period (1H), the ON voltage is added to a next gate signal line and the precedent TFT in the ON state is turned into the OFF state (S2 is opened). FIG. 21 shows an equivalent circuit diagram at this time. Simultaneously when TFT 61 is turned OFF, the switch S1 is changed to the terminal a or c. That is, if the potential of the signal impressed to the pixel electrode 51 is positive, the switch S1 is changed to the terminal c (+Va). on the other hand, if the signal is of the negative polarity, the switch S1 is switched to the terminal a (−Va). Since the voltage to the counter signal line 41 is changed to +Va or −Va, the voltage is divided to capacitors C1c and Ca. The ratio r that the divided voltage is impressed to the capacitor C1c is:

$$r = Ca/(C1c + Ca) \quad (1)$$

The thickness of the liquid crystal layer of the polymer dispersion liquid crystal display device is as thick as 10 μm in comparison with that of the TN liquid crystal display device of 5 μm, and moreover, the dielectric constant e of the liquid crystal is low. The capacitor C1c of the liquid crystal has consequently a small capacity. Accordingly, the capacitor Ca is necessary to be large, for example, satisfying C1c:Ca=1:9.

Substituting the values of C1c and Ca into the above expression (1), r=0.9 is obtained. In other words, 90% the change of the voltage of the counter signal line 41 is added to the liquid crystal layer 53. Therefore, the ratio of the voltage impressed to the liquid crystal layer 53 to the change of the voltage (referred to as the voltage efficiency) is considerably high, which is characteristic of the polymer dispersion liquid crystal display device, different from the TN liquid crystal display device.

In the case where the positive-polarity voltage is added to the pixel electrode 51 after TFT is turned OFF as above, a positive voltage is given to the counter signal line 41. When the negative-polarity voltage is impressed to the pixel electrode 51, a negative voltage is fed to the counter signal line 41. The driving method according to the second embodiment of the present invention is executed as above.

It is not necessary to switch the potential of the counter signal line 41 immediately 1H later, and a little time delay is permitted. However, the effective voltage impressed to the liquid crystal layer is decreased as the time delay is larger.

The above-described driving method is to drive the display device which has striped electrodes 41 formed on the counter substrate 12. Hereinbelow are described a driving method and the constitution thereof according to a further embodiment of the present invention.

Figure 12:
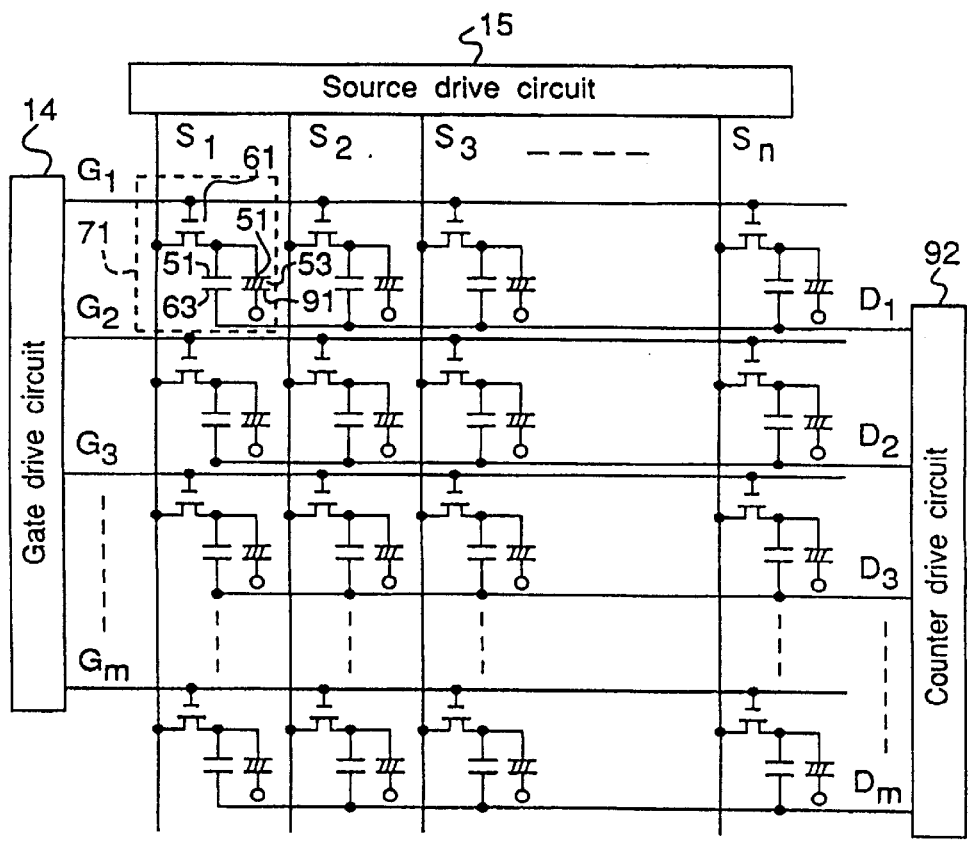
FIG. 12 is an equivalent circuit diagram of the display device according to another embodiment of the present invention.

FIG. 12 is an equivalent circuit diagram of the display device in the second aspect of the invention. A pixel is in the configuration shown in FIG. 9. The liquid crystal layer 53 is held by the pixel electrode 51 and a counter electrode 91. The counter electrode 91 is common for all the pixels 71 in the effective display area. The capacitor 64 consists of the pixel electrode 51 and common electrode 63. The common electrodes 63 are formed along rows of pixels. One end of the common electrode 63 is connected to a capacitor drive circuit 92. The common electrode 63 is regarded as a signal line of the capacitor drive circuit 92, and designated as a capacitor signal line Di (i is 1−m). The other points of the constitution are the same as in FIG. 10, and the driving circuit in the third embodiment is achieved by replacing the counter drive circuit 16 of FIG. 13 with the capacitor driving circuit 92, the description of which will be omitted here. The operation of the capacitor driving circuit 92 is substantially the same as that of the counter drive circuit 16.

Figure 19:
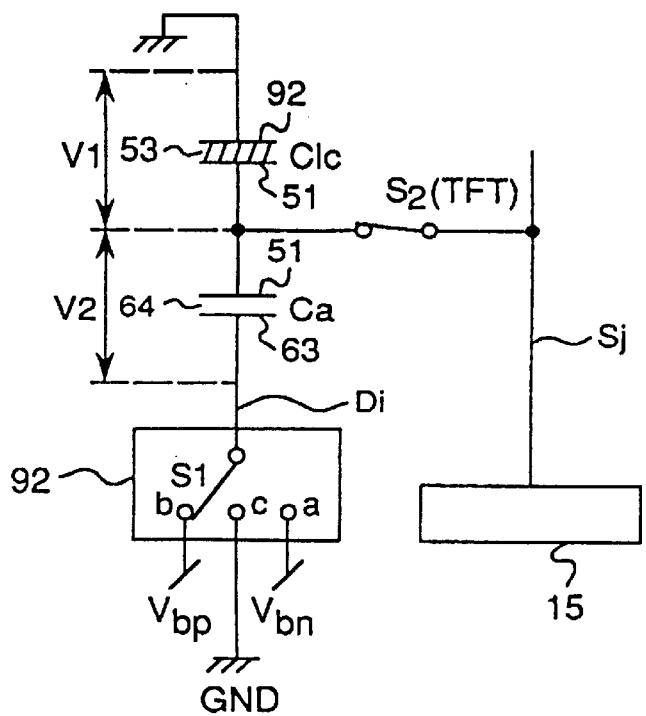
FIG. 19 is an explanatory circuit diagram for showing another example of the driving method according to the present invention.

The driving method of the display device in FIG. 12 will be discussed now with reference to FIG. 19. The capacitor driving circuit 92 is supposed to output Vbp, Vbn and GND voltages to the Di signal line, for the purpose of simplification of the description. Although GND voltage is naturally lower than the common voltage, it is easier to understand the invention if GND voltage is 0V, and therefore, GND voltage is set to be 0V here. Vbn is a negative-polarity voltage and Vbp is a positive-polarity voltage.

The capacitor drive circuit 92 turns the potential of the capacitor signal line Di to GND. The source drive circuit 15 writes a positive-polarity voltage Vp to the pixel electrode 51. As a result, the voltage impressed to the liquid crystal layer 53 becomes V1=Vp. One horizontal scanning period (1H) later, the capacitor drive circuit 92 outputs the negative-polarity voltage Vbn to the capacitor Di. As described in the foregoing embodiment, C1c is smaller than Ca, e.g., to satisfy C1c:Ca=1:9. Although the negative-polarity voltage Vbn is divided and supplied to the capacitors C1c and C1 according to the expression (1), most of the voltage is impressed to C1c. Therefore, the voltage impressed to C1c is approximately Vp+Vbn.

In writing the negative-polarity voltage Vn to the pixel electrode 51, the capacitor driving circuit 92 generates GND voltage to the capacitor signal line Di. One horizontal scanning period (1H) later, then, the capacitor driving circuit 92 outputs the positive-polarity voltage Vbp to the capacitor signal line Di. In other words, the voltage of approximately Vn+Vbp is impressed to the pixel electrode 51.

Vn+Vbp or Vp+Vbn voltage is alternately impressed to the pixel electrode 51 per field, that is, the pixel electrode 51 is driven by an alternating current voltage.

In the above description, the capacitor drive circuit 92 generates GND voltage and thereafter generates Vpn or Vbp voltage one horizontal scanning period (1H) later. However, the time is not restricted to one horizontal scanning period, and may be, for instance, two horizontal scanning periods (2H). In that case, however, the effective voltage impressed to the pixel electrode 51 is slightly lowered. Although GND voltage is first output to the capacitor signal line Di followed by Vbn or Vbp voltage in the above embodiment, the driving method is not restricted to this. For example, when the positive-polarity voltage Vp is to be written in the pixel electrode 51, the positive-polarity voltage Vbp is impressed to the capacitor signal line Di and, the negative-polarity voltage Vbn may be subsequently added to the capacitor signal line Di one horizontal scanning period later. Outputting of GND voltage becomes unnecessary, but the control of voltages becomes difficult.

In the foregoing embodiments, the display contrast is improved by increasing the film thickness of the liquid crystal layer 53. That is, the invention in the foregoing embodiments is based on the idea that the thickness of the crystal liquid layer 53 is increased→a relatively high voltage is required to pass the light through the thick liquid crystal layer 53→the striped electrodes, etc. are employed→a high voltage is impressed to the liquid crystal layer 53→accordingly the display contrast is improved.

In the meantime, as the present invention aims also to prevent the secondary scattering light to solve the demerit that the display contrast of the polymer dispersion liquid crystal display device is low, a method for preventing the secondary scattering light will be described together with the constitution thereof.

Figure 22:
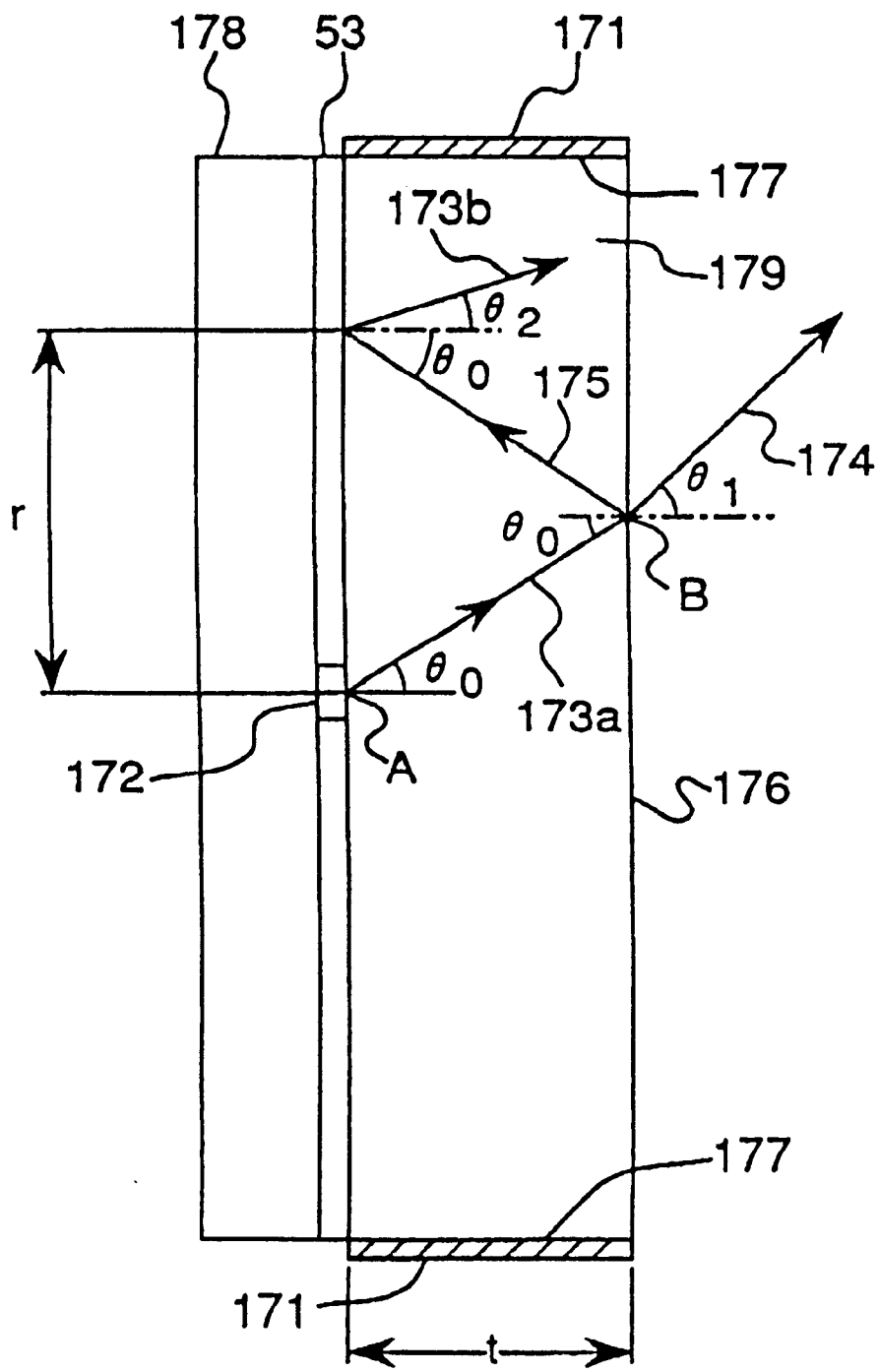
FIG. 22 is an explanatory cross-sectional view of the display device according to the present invention.

An example of a display device to achieve the above aim is shown in FIG. 22. The light modulation layer 53 is held between a substrate 178 at the entering side and a substrate 179 at the projecting side of light. The projecting substrate 179 is obtained by optically coupling a transparent plate (glass plate or the like) with the array substrate 11, more specifically, bonding the plates via a transparent material having approximately the same refraction of index as that of the array substrate.

Supposing that slim parallel lights are cast only to a minute area 172 centering a point A within the display area without a voltage impressed to the light modulation layer 53, the light incident upon the minute area 172 is scattered as a scattering light 173a. The scattering light reaches to a plane of projection 176. When the angle θ0 between the plane of projection 176 and the scattering light 173a is not larger than the critical angle, the light becomes a penetrating light 174. If the angle θ0 is not smaller than the critical angle, the light is reflected as a reflecting light 175. The reflecting light 175 enters the light modulation layer 53 again, and in consequence, a scattering light 173b is projected forward. In other words, a secondary light source is produced for the light modulation layer 53. When the reflecting light 175 enters the light modulation layer 53 and is scattered as above, this phenomenon is called as a "secondary scattering" and the resultant light is the secondary scattering light.

Figure 23:
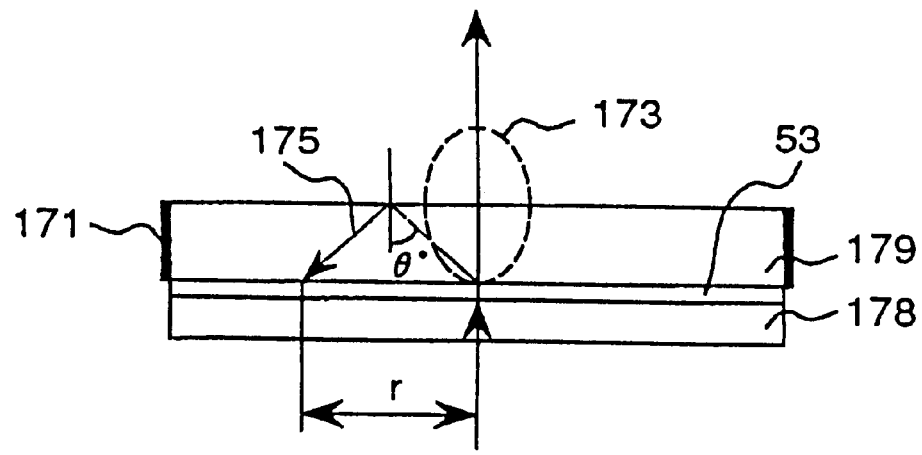
FIG. 23 is an explanatory cross-sectional view of a display device having a relatively thin substrate.
Figure 24:
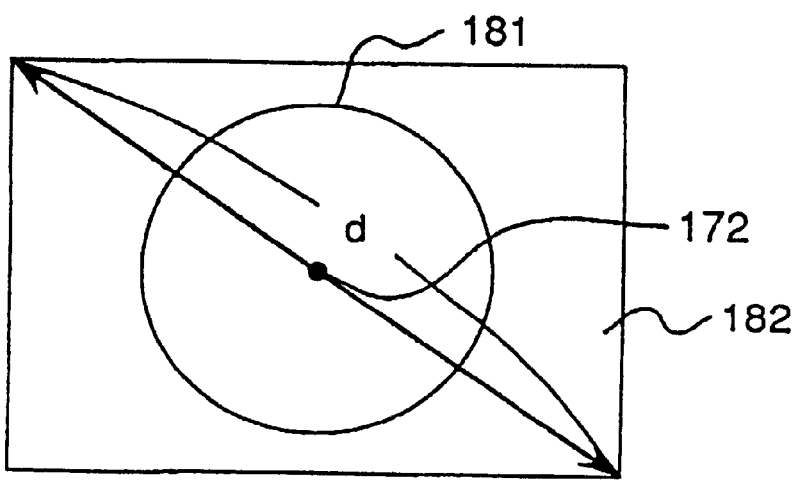
FIG. 24 is a plan view of FIG. 23.

The luminance distribution of the light re-projected from the light modulation layer 53 is symmetric to the center of rotation of the minute area 172, representing a light ring 181 as shown in FIGS. 23 and 24.

The light ring 181 appears in the vicinity where the light is projected from the minute area 172, reflected at the plane of projection 176 with the critical angle θ and again returned to the light modulation layer 53. This is understandable from the fact that when the reflecting angle is not larger than the critical angle, the light becomes the penetrating light 174, whereby the amount of the reflecting light of a sufficiently larger angle than the critical angle is reduced. Assuming that the index of refraction n of the substrate 179 is 1.52, since the index of refraction of the air is 1.0, the critical angle θ holds $$\theta = \sin^{-1}(1/n) = \sin^{-1}(1/1.52).$$

Figure 25:
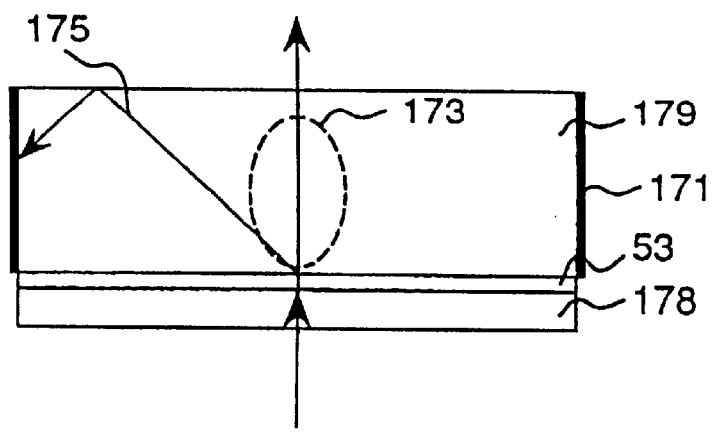
FIG. 25 is an explanatory cross-sectional view of a display device having a relatively thick substrate.
Figure 26:
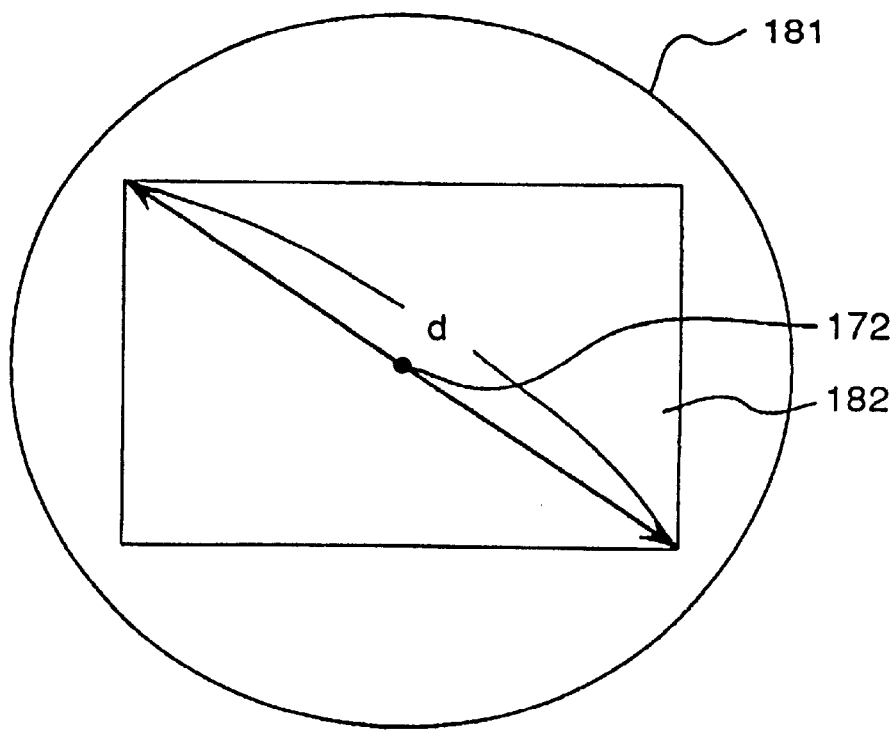
FIG. 26 is a plan view of FIG. 25.

As shown in FIGS. 23 and 24, when the substrate 179 is relatively thin, the diameter 2r of the light ring 181 is smaller than the length of a diagonal d of the effective display area 182. As a result, the light ring 181 is formed within the effective display area 182, lowering the display contrast. When the substrate 179 is thick as shown in FIGS. 25 and 26, the diameter 2r of the light ring 181 is larger than the diagonal length d of the effective display area, that is, the reflecting light 175 enters a light absorbing film 171 formed in an area other than the effective display area (referred to as an ineffective area) and is absorbed by the film 171. The light absorbing film 171 is formed of, e.g., a black paint or the like.

When the thickness of the substrate 179 is t, the diameter of the light ring 181 becomes larger than the diagonal length d of the effective display area on the condition:

$$(t/d) \geq (1/4)\sqrt{(n^2-1)} \qquad (2)$$

When n=1.52 is substituted in the expression (2), t/d is approximately 0.3.

Figure 45:
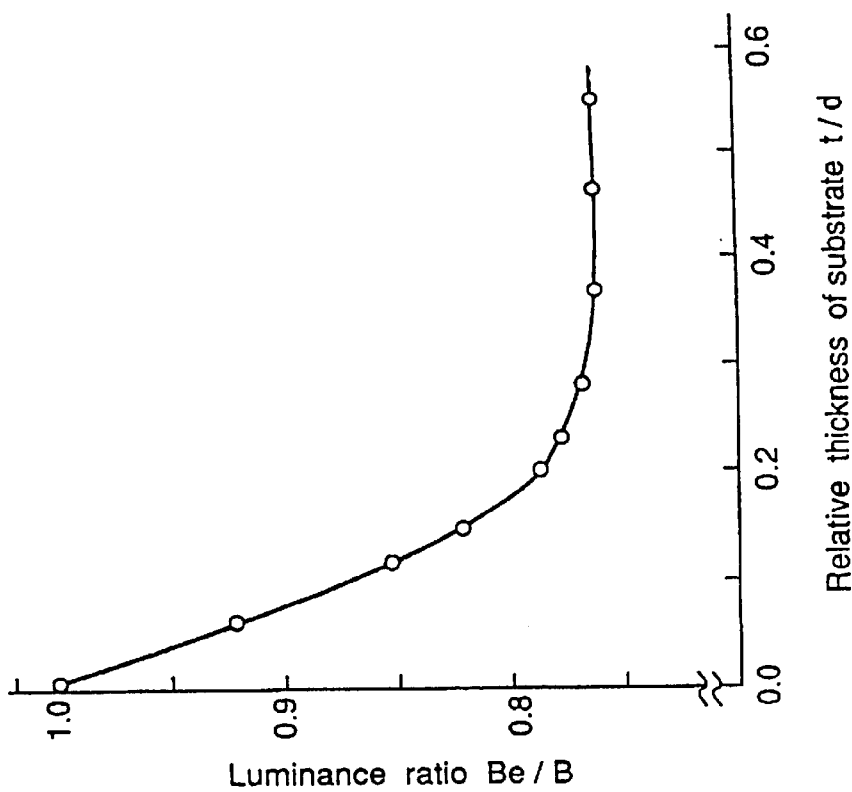
FIG. 45 is a graph showing a variation of luminance ration Be/B with respect to the relative thickness t/d of a substrate.
Figure 44:
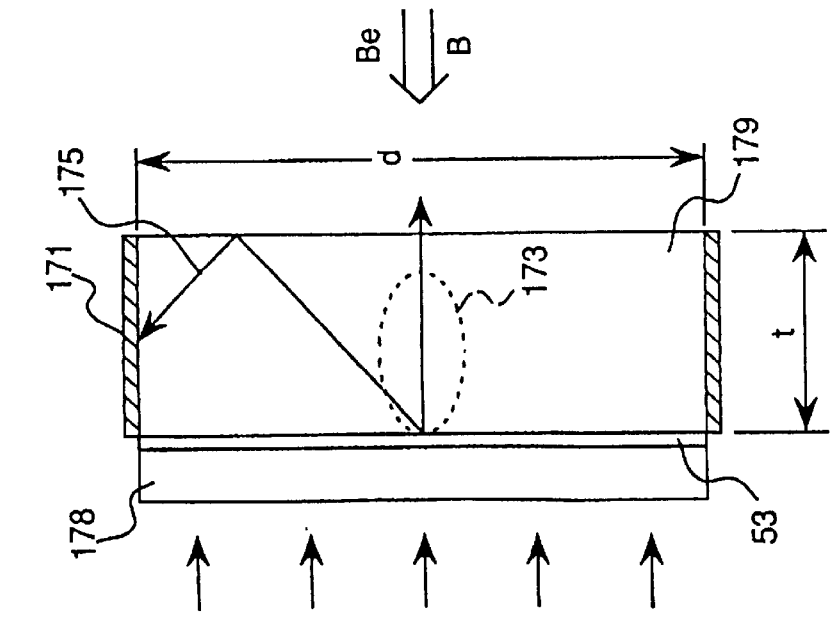
FIG. 44 is a schematical cross-sectional view of the display device according to the present invention.

The effect is actually confirmed as indicated in FIG. 45. The luminance of the light modulation layer is measured from the projecting side by casting parallel beams to the panel, as in FIG. 44. The luminance B is obtained when the thickness t of the projecting substrate 179 is considerably small as compared with the diagonal length d of the effective display area, concretely, t=1 mm and d=55 mm. The luminance Be is when the thickness t of the substrate is changed. In FIG. 45, the axis of ordinate indicates the ratio of the luminance, i.e., Be/B and the axis of abscissa shows the relative thickness of the substrate t/d. As is clear from FIG. 45, the ratio becomes constant when t/d=0.3. When t/d<0.3, the ratio of the luminance is largely decreased large.

The fact that the luminance ratio is small means the display contrast is high. According to FIG. 45, the improving effect of the contrast is sufficient when t/d=0.25–0.3 or higher. Moreover, even when t/d=0.15 which is half the value detected from the expression (2), it is practically effective. Therefore, t/d is preferably not smaller than 0.15 when the index of refraction n of the substrate is 1.52, more favorably 0.3 or larger. From this, even merely half the value of the condition defined in the expression (2) generates no problem in practical use. The relationship between the thickness t of the substrate 179 and the diagonal length d of the effective display area should satisfy an expression (2') below:

$$(t/d) \geq (1/8)\sqrt{(n^2-1)} \qquad (2')$$

When the scattering light from one pixel enters the other pixel which is naturally to be a black display, a secondary light source is formed at the other pixel because of the diffusion and reflection of the light, whereby the luminance of the other pixel is undesirably increased, resulting in the deterioration of the display contrast. As such, the display contrast is improved if the thus-caused secondary scattering light is absorbed by the black paint 171. The present invention realizes this technical concept by a transparent substrate 212 or the like.

The poor display contrast of images by a projection-type display apparatus using the foregoing display device as a light valve results from the above-discussed mechanism, as well as the insufficient scattering efficiency of the light modulation layer 53. In accordance with the increase of the thickness t of the projecting substrate 179, the rise of the luminance by the secondary scattering light is controlled. Therefore, if the thickness of the projecting substrate 179 is increased, the display contrast is improved.

The above description is related to the projecting substrate 179, but the same is also true also for the light entering the minute area 172 and reflected to the entering side. That is, the reflecting light returns to the plane of incidence of the entering substrate 178. In this case, the secondary scattering light is prevented by increasing the thickness of the entering substrate 178. Japanese Patent Application Tokuganhei No. 4-145297 (145297/1992) describes the idea in detail.

Figure 27:
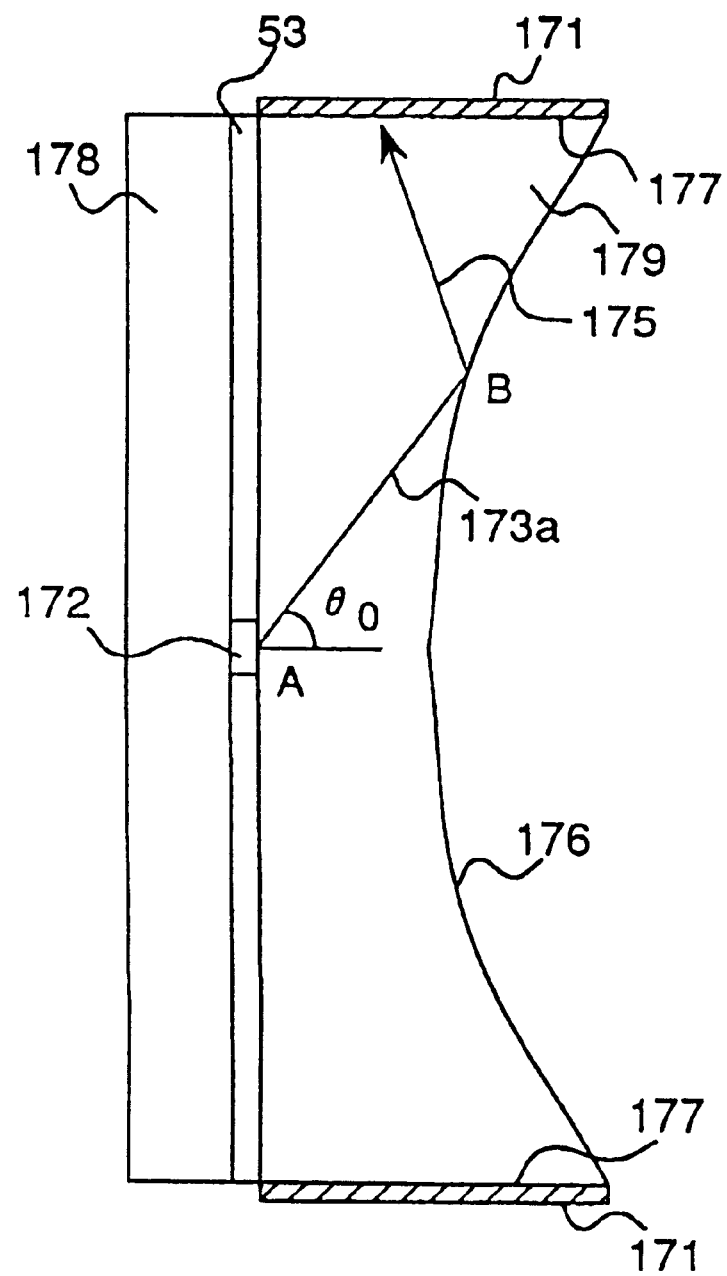
FIG. 27 is an explanatory cross-sectional view of a display device having a concave substrate.

The improving effect of the display contrast when the projecting face of the projecting substrate 179 is changed to a concave surface is investigated as will be described hereinbelow. Referring to FIG. 27, slim parallel lights are cast to the minute area 172 from the entering side centering at the point A of the effective display area without a voltage impressed to the light modulation layer 53. At this time, the plane of projection 176 of the projecting substrate 179 is a concave surface although the material of the projecting substrate 179 is not changed. Regarding the light coming out from the point A on the light modulation layer 53, reflected at a point B on the concave surface 176 and brought into a point C on the light modulation layer 53, as the plane of projection 176 is changed from a flat surface to a concave surface, the angle of incidence of the light entering the point B becomes large, thereby increasing the diameter 2r of the light ring 181. Accordingly, if the plane of projection 176 of the projecting substrate 176 is turned to a concave surface, the luminance of the re-projected light is decreased, so that the display contrast is improved. In comparison with the case where the plane of projection is flat, the display contrast is improved even more when the center thickness t of the substrate is small, and therefore not bound to the expression (2').

The transparent substrate 212 is obtained by optically coupling the counter substrate 12 with the array substrate 11. For the optical coupling, for example, an ultraviolet curing adhesive is used, because many of the adhesives show the index of refraction close to that of glass constituting the counter substrate 12. However, the coupling material is not limited to the ultraviolet curing adhesives, but transparent silicone resins, epoxy transparent adhesives, ethylene glycol or the like liquids may be employed. An important point is to avoid mixing of the air into the optically coupled layer when the transparent substrate 212 is bonded to the counter substrate 12, etc. The presence of an air layer brings about the abnormality of the image quality due to the difference of the index of refraction. It is called an "optical coupling" since the transparent substrate 212 is optically bonded with the counter substrate 12, etc.

It is desirable that the transparent substrate 212 is formed of the same material as the counter substrate 12, namely, glass. The other transparent resins such as acrylic resins, polycarbonate resins and the like which have the index of refraction close to that of glass and are relatively inexpensive and moreover, easily formed into an optional shape by pressing, etc. may be used.

The light absorbing film 171 is formed at the side face of the transparent substrate 212 with the use of a black paint or the like. The position of the light absorbing film 171 is not restricted to the side face of the transparent substrate 212, but is suitable to expand in a wide range of the ineffective area except the planes of incidence and projection of light.

The distance t from the surface of a transparent substrate 212a, in (which is contact with the air), to the light modulation layer 53 is set to satisfy the expression (2) when the index of refraction of the transparent substrate 212a is n and the maximum diameter of the effective display area of the panel is d.

Figure 39:
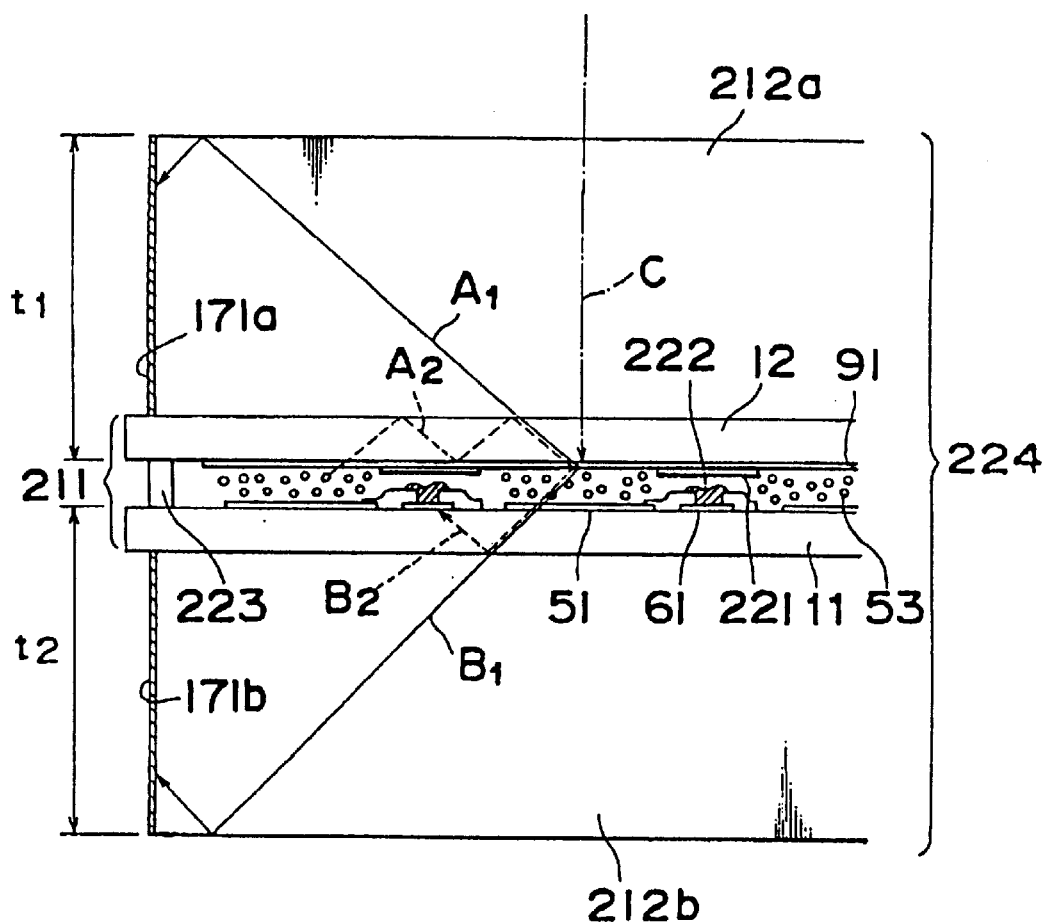
FIG. 39 is an explanatory cross-sectional view of another example of the display device according to the present invention.

FIG. 39 is a sectional view of the display device according to the invention. On the counter substrate 12 are provided a counter electrode 91 and a black matrix 221, which is located to face corresponding TFT 61, gate signal line (not shown) and source signal line (not shown). Meanwhile, the pixel electrode 51 and TFT 61 are formed on the array substrate 11. A light shutting film 222 is formed on TFT 61, for instance, by dispersing carbons in an acrylic resin, or an insulating film (not shown) is formed on the TFT 61 which is further covered with a metallic thin film. The light shutting film 222 prevents the light scattered within the liquid crystal layer 53 from entering the semiconductor layer of TFT 61. The light shutting film 222 is employed in the display devices of FIGS. 2 and 10 as well. The array substrate 11 and the counter substrate 12 are sealed in the periphery thereof by an encapsulation resin 223 via the polymer dispersion liquid crystal as the light modulation layer 53. The center thickness t of a transparent substrate 212b is set to satisfy the expression (2'). As depicted before, the expression (2') is not necessarily held when the transparent substrate 212 is a concave lens.

The effect of the transparent substrate 212 will be described. In the case where the transparent substrate 212 is not present, the incident light C is scattered at the light modulation layer 53 as indicated by A2 and B2. The scattering light A2 is repeatedly reflected inside the counter substrate 12 and is brought into the light modulation layer 53. The light is scattered again and hence becomes a secondary light source, decreasing the display contrast. The scattering light B2 is reflected at the surface of the array substrate 11 in touch with the air and introduced into the semiconductor layer of TFT 61. The semiconductor layer of TFT 61 is excited by this light, therefore working as a photoconductor. As a result, TFT 61 leaks, lowering the display contrast.

On the contrary, when the transparent substrates 212a, 212b are provided, the scattering lights A2 and B2 are not generated, but scattering lights A1, B1 are formed instead. Since the scattering lights A1, B1 are absorbed by the light absorbing film 171, neither the aforementioned phenomenon that the semiconductor layer functions as a photoconductor, nor the secondary scattering light is brought about. Accordingly, the display contrast is improved.

In the meanwhile, either one of transparent substrates 212a and 212b is enough for practical use. Especially, the transparent substrate 212a may be omitted.

The transparent substrate 212 illustrated in FIG. 39 is a cylinder or plate. However, the transparent substrate 212 may be a plano-concave lens as shown in FIG. 27. A combination of a plano-concave lens with a positive lens is conceivable.

Many modifications are derived from the display device of the present invention. Some of the modified examples are shown in FIGS. 28–38. In any of the drawings, the right side is the entering side where the transparent substrate 212 and the plano-concave lens 214 are optically coupled to the liquid crystal panel 211 by a transparent adhesive. The light absorbing film 171 is applied to the ineffective area of the transparent substrate 212 and the plano-concave lens 214. In using the plano-concave lens 214, a positive lens 213 may also be used. Although it is better to dispose a field lens at the entering side of the display device so as to brighten the periphery of the projected images, the positive lens 213 functions as the field lens when the plano-concave lens 214 is installed at the entering side of the liquid crystal panel 211 and the positive lens 213 is set adjacent to the plano-concave lens 214 at the entering side.

The display device in any constitution of FIGS. 28–38 shows good image displays, similar to the foregoing embodiments. The display device from the liquid crystal layer 53 to the face in touch with the air may be formed of one material or a combination of a plurality of materials.

A reflection preventing film is disposed at the plane of projection or plane of incidence of the plano-concave lens 214. The plano-concave lens 214 is formed of an acrylic resin by molding. Molding is fit for mass production. As indicated in FIG. 27, the thickness of the transparent substrate 212 is not bound to the expression (2') when the transparent substrate 212 is formed of a plano-concave lens, and the transparent substrate 212 of a small thickness can fully prevent the secondary scattering light.

In FIG. 38, the positive lens 213 is arranged adjacent to the plano-concave lens 214. The radius of curvature of one convex face of the positive lens 213 is equal to that of the concave face of the plano-concave lens 214. A thin space of air is provided between the concave and convex faces, and the above-referred reflection preventing film is vapor-deposited to the concave face of the plano-concave lens 214 and the convex faces of the double convex lenses 213. In order to constitute a projection-type display apparatus using the display device of the present invention, the projecting lens is so adapted as to form optical images on the light modulation layer 53 onto a screen in the assembled state of the apparatus with the plano-concave lens 214 and the positive lens 213, etc.

The light valve with the light modulation layer 53 of, e.g., polymer dispersion liquid crystal which forms optical images as the change of the scattering state of light enhances the display contrast more when the light modulation layer is close to the perfectly scattering state.

As described hereinabove, the thickness t of the substrate holds an important relationship to the length of the diagonal d of the effective display area. If the scattering efficiency of the light modulation layer 53 is kept at a predetermined value or higher, the secondary scattering light is prevented further more effectively.

In FIG. 22, the scattering light 173a is reflected at the plane of projection 176 and led into the light modulation layer 53 again, where the secondary scattering light is produced. If the scattering efficiency of the light modulation layer 53 is poor, secondary scattering is hardly given rise to, i.e., a secondary light source is never produced.

As the light modulation layer 53 approaches the perfectly scattering state, secondary scattering is generated at a higher rate, and therefore it is essential that the thickness t of the projecting substrate 179 satisfies the condition of the expression (2'). After repeated experiments by the inventors, it is confirmed that the preventing effect of the secondary scattering light is striking when G in an expression (3) below is not larger than 1.5, more appropriately, not larger than 1.0:

$$G = \pi B/L \quad (3)$$

wherein L is the illuminance of the incident light from the entering substrate 178 to the minute area 172, and B is the luminance measured at the minute area 172 through the projecting substrate 179, and $\pi$ is the ratio of circumference of a circle to its diameter.

Before the reason why G in the expression (3) is set to be not larger than 1.5 is explained below, an evaluating method of characteristics of the light modulation layer 53 will be first described.

Figure 40:
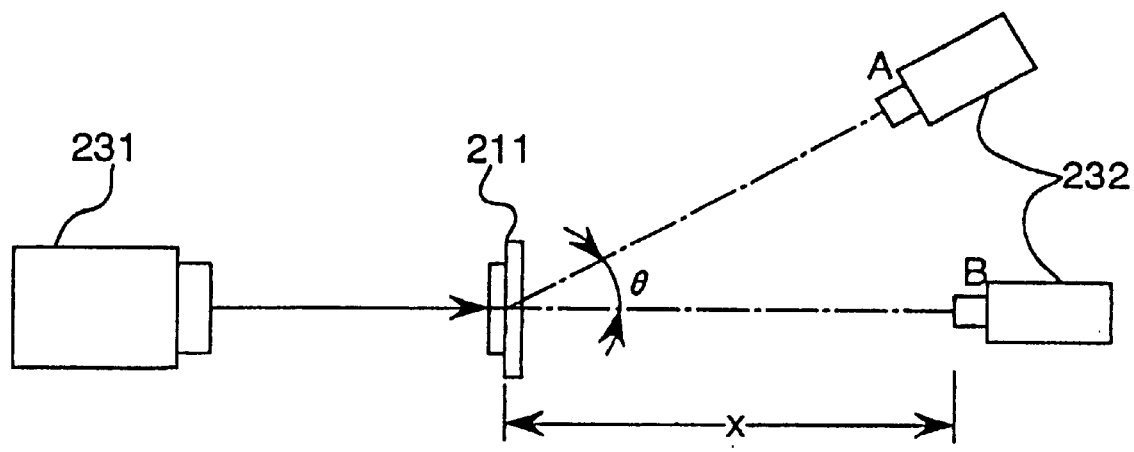
FIGS. 40 and 41 are explanatory views for showing a method of evaluation about properties of the light modulation layer according to the present invention, respectively.
Figure 41:
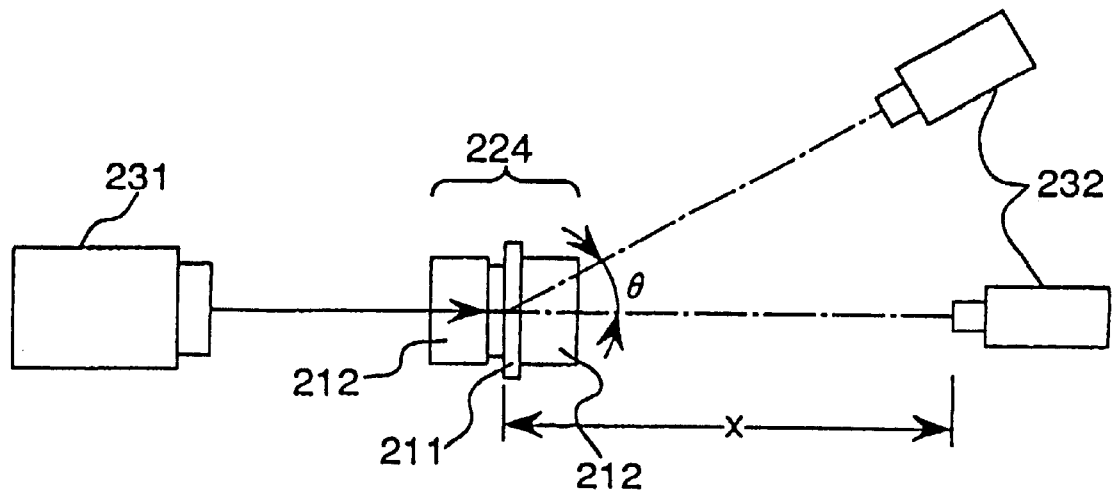

Referring to FIGS. 40, 41 indicative of the evaluating method referred to above, 211 is the display device without the transparent substrate 212, while 224 is the display device with the transparent substrate 211 mounted, to the display device 211. A light source 231 emits generally parallel lights to the display device. The luminance of the minute area of the light modulation layer 53 is measured by a luminance meter 232.

In a case wherein the display device 211 is of reflection type, the parallel light source 231 is to be arranged in a direction is which the luminance meter 232 is arranged.

Figure 42:
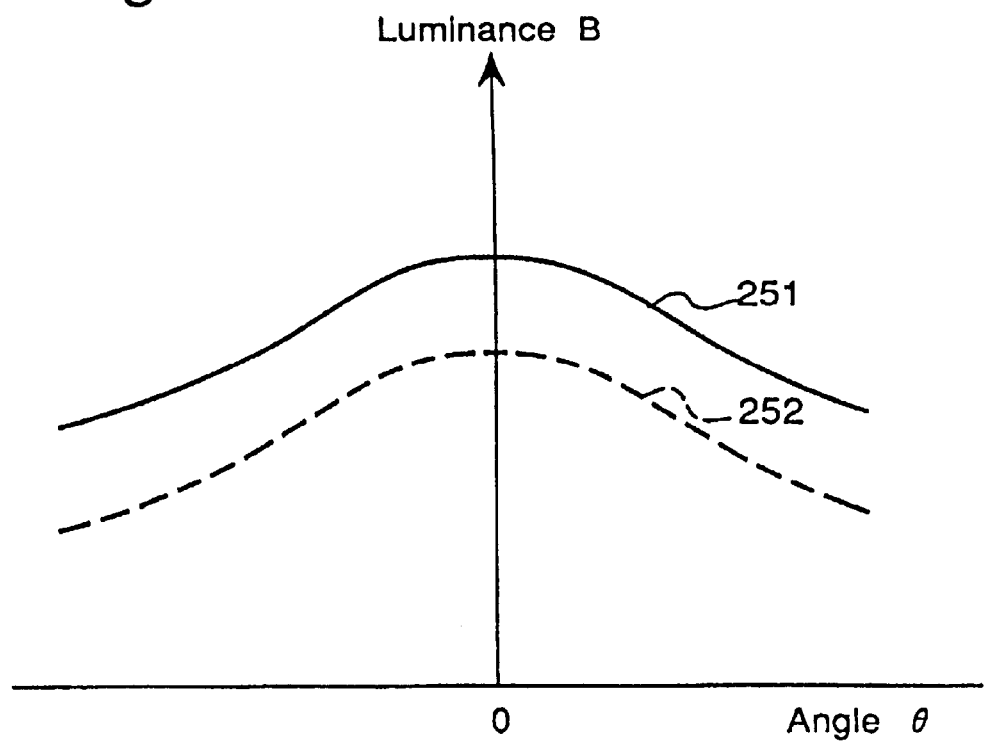
FIG. 42 is a graph for showing panel gain curves.

By projecting parallel lights to the display devices 211, 224 from the light source 231, the luminance of the minute area of the light modulation layer is measured while the angle $\theta$ of the luminance meter 232 is changed. The distance x should be sufficiently long in order to avoid the difference in the optical distance between FIGS. 40 and 41 due to the presence of the transparent substrate 212. The measuring result of the luminance is shown in FIG. 42, in which 251 is a curve of the luminance-angle (B–$\theta$) (referred to as a B–$\theta$ curve) of the display device of FIG. 40, and 252 is a B–$\theta$ curve of the display device shown in FIG. 41. The luminance B is reduced in the display device of FIG. 41, because the secondary scattering light is restricted by the transparent substrate 212. The difference of the curves 251 and 252 is enlarged as the scattering efficiency of the light modulation layer 53 is improved.

The panel gain G is calculated from the expression (3) using the luminance B and the illuminance L measured at the plane of incidence of the light valve when $\theta$=0 in the B–$\theta$ curve.

The ratio of the luminance of the display devices of FIGS. 40 and 41, i.e., B2/B1 when $\theta$=0 is detected and, the decreasing ratio of the luminance D (=B2/B1) is calculated. The relationship of the decreasing ratio D and the panel gain G has such an inclination as is represented in a curve in FIG. 43 (referred to as a D–G curve hereinafter).

Figure 4:
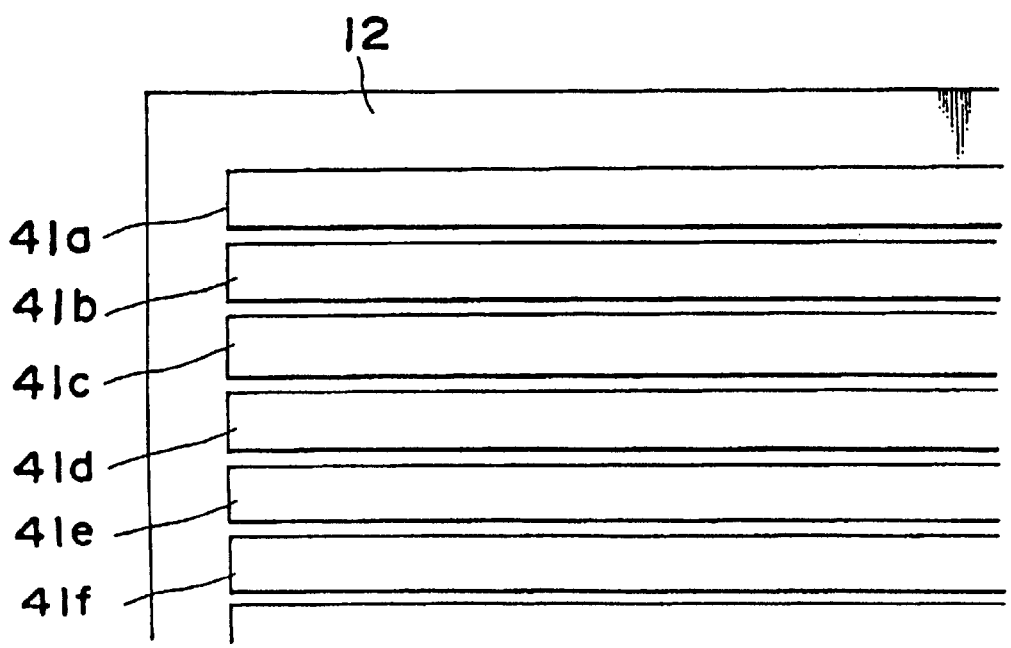
FIG. 4 is a partial plan view of a substrate with striped electrodes formed thereon in the display device of the present invention.
Figure 43:
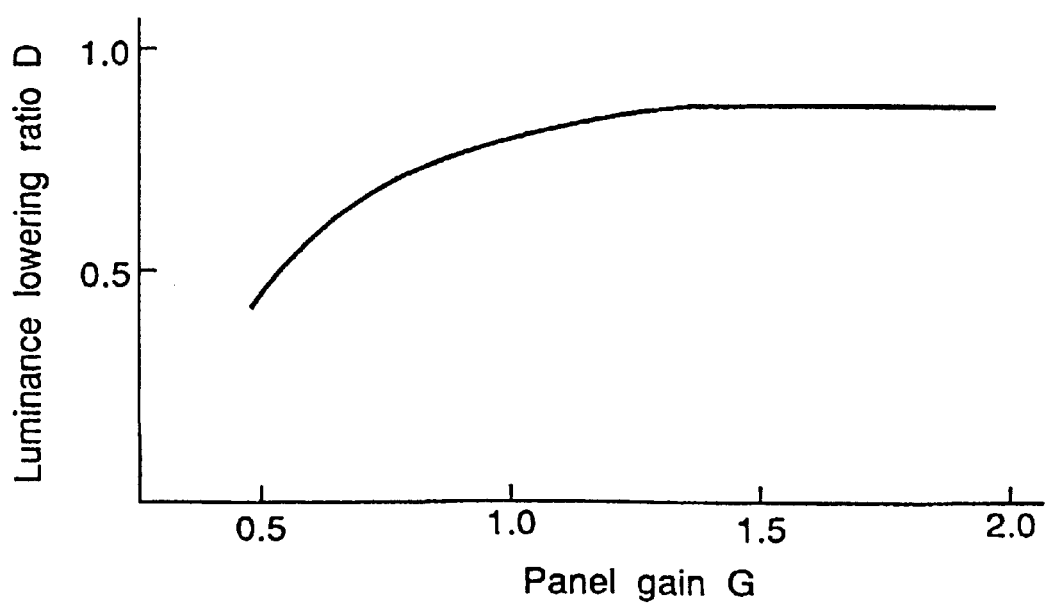
FIG. 43 is a graph showing a relation between panel gain G and decreasing rate of luminance D.

In FIG. 43, the decreasing ratio D is small when the panel gain G which was calculated using values measured in the experimental system shown in FIG. 4 according to the expression (3) is 1.5 or larger, and suddenly increases when the panel gain G is not larger than 1.0. In other words, the panel gain G is desirably not larger than 1.5, and more preferably, not larger than 1.0.

When the display device of the invention is used as a light valve for a projection-type display apparatus, the display contrast CR is expressed as follows:

$$CR = 4F^2 T/G \quad (4)$$

The panel gain G in the expression (4) is calculated in accordance with the expression (3). F is the effective F-number of the projecting lens (referred to as FNo) and T is the transmittance when the maximum voltage is impressed to the light modulation layer 53 as the light valve. The transmittance T is generally 0.7–0.9. The transmittance is reduced by the reflectivity of ITO constituting the counter electrode and the absorption coefficient of the light modulation layer 53, etc.

The above expressions (3), (4) will be explained more in detail.

At first, the expression (3) is explained.

Supposing that the illuminance of the light modulation layer 53 of the display device when the parallel beams are brought into the light modulation layer 53 is L, the luminance B is obtained by dividing the illuminance L by $\pi$. If the decreasing ratio of the luminance due to the scattering of light at the light modulation layer 53 is defined as the panel gain G, the panel gain G becomes smaller as the scattering efficiency of the light modulation layer is better. From the above, the luminance B of the light modulation layer 53 is expressed by:

$$B = GL/\pi \quad (a)$$

The expression (3) is a transformation of the expression (a).

Next, the expression (4) is explained.

Given that an image of a light emitting body with the luminance Bo is projected to a screen (image forming face) by a projecting lens having FNo=F, the illuminance of the screen L (illuminance of the image forming face) is obtained from a general optical theoretical formula (b) below:

$$L = (\pi Bo)/(4F^2) \quad (b)$$

Since the luminance of the panel is B=GL/π according to the expression (a), the luminance B of the light modulation layer 53 when scattering the light is obtained by substituting the formula (b) into the expression (a):

$$B = (GBo)/(4F^2) \quad (c)$$

The luminance Bt of the light modulation layer 53 when the light modulation layer 53 transmits light is:

$$Bt = BoT \quad (d)$$

in which T is the transmittance of the light modulation layer 53. Since the display contrast CR is the ratio of the luminance B (black indication) and Bt (white indication), an expression (e) is held:

$$CR = Bt/B = 4F^2 T/G \quad (e)$$

Thus, the expression (4) is obtained.

When the panel gain G is 0.5, the transmitting-type light modulation panel is in the perfectly scattering state. If the decreasing ratio of the luminance is supposed to be 0.5 when G=0.5, the practically effective panel gain is 0.5×0.5=0.25. The panel gain when the decreasing ratio of the luminance D because of the preventing effect of the secondary scattering light by the transparent substrate, etc. is taken into consideration will be referred to as an effective panel gain G'.

When the panel gain G is not larger than 1.5, suitably, not larger than 1.0, the decreasing ratio of the luminance D becomes high and the effective panel gain G' is reduced. Since the effective panel gain G' is replaceable as G=G' in the expression (4), accordingly, the display contrast is improved when the display device of the present invention is used as the light valve in the projection-type display apparatus.

Figure 46:
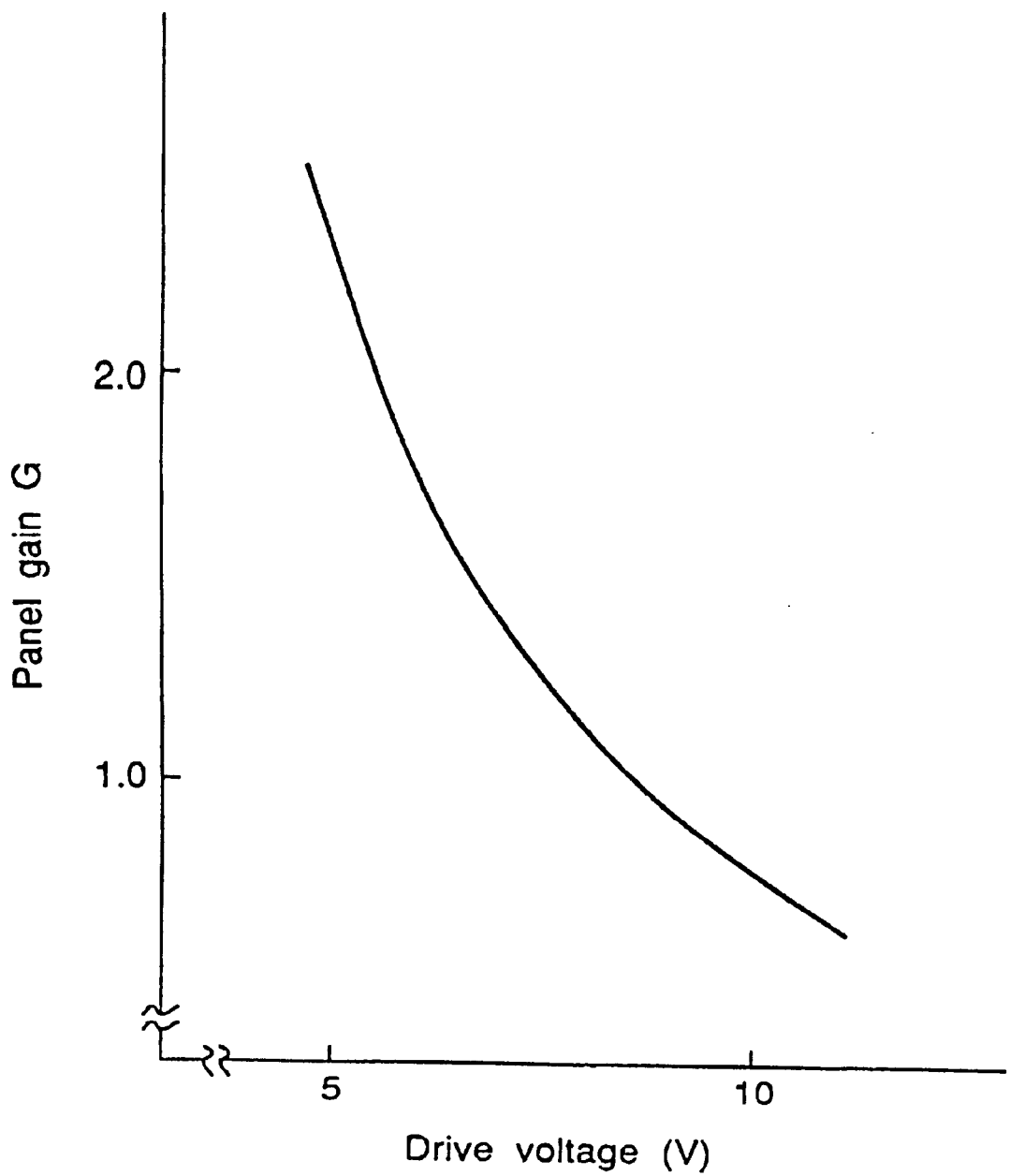
FIG. 46 is a graph showing a variation of panel gain G with respect to driving voltage V.

In order to keep the panel gain G not larger than 1.5, it is necessary to improve the scattering efficiency of the light modulation layer 53 so that the light modulation layer is close to the perfectly scattering state. The perfectly scattering state may be achieved by <1> the development of the material of the light modulation layer 53, and <2> making the light modulation layer 53 thick. Although the method <1> is proper to improve the scattering efficiency without changing the thickness and the driving voltage of the light modulation layer 53, the development of the material is not so easy. On the other hand, the method <2> is readily carried out, because it is enough to increase the thickness of the light modulation layer 53. However, a higher voltage becomes necessary for the light modulation layer 53 to transmit light if the thickness of the layer is increased. For example, when the ratio of the polymer and liquid crystal in the polymer dispersion liquid crystal is approximately 4:6, and the liquid crystal is a nematic liquid crystal, if the liquid crystal is 12 μm thick, the panel gain G is approximately 1.8 and the driving voltage is 6V. When the thickness of the liquid crystal is 20 μm, the panel gain G is slightly larger than 0.8, and the driving voltage is 10V. An example of the relationship of the driving voltage V with the panel gain G is indicated in FIG. 46.

As a standard, the impressing voltage is limited within ±6–7V, one reason for which is the driving power of the source drive IC 15 for outputting video signals to pixel electrodes.

The driving voltage should be not smaller than 7V or not smaller than 9V in order to obtain the panel gain G of not larger than 1.5 or not larger than 1.0, respectively. Since 10V or the like voltage is easily impressed to the liquid crystal layer 53 in the display device shown in FIGS. 2, 10 and according to the driving method of the display device of the invention, when the striped electrodes 41 are employed as in FIGS. 2, 10, etc., 10V or higher driving voltage is attained, thus making the panel gain not larger than 1.5. If the transparent substrate 212 shown in FIG. 39 is optically coupled to the panel, the effective panel gain G' is advantageously decreased. In other words, the display device of the invention realizes the good display contrast. Naturally, if the panel gain can be made not larger than 1.5 without using the striped electrodes, this enables the good display contrast. Likewise, the good display contrast is achieved in the constitution of FIG. 12 because a high voltage is impressed to the liquid crystal layer 53.

When the arrangement using striped electrodes 41 as in FIG. 1, etc. is employed, a high voltage can be impressed to the liquid crystal layer 53. Although it is more or less difficult, the pre-stage gate system shown in FIG. 9 alike allows the impression of a high voltage, i.e., approximately 10V to the light modulation layer 53. However, since the voltage impressed to the gate signal lines is increased, the display device may be deteriorated due to the voltage resistance of TFTs 61. The display device of FIG. 1 shows no deterioration resulting from the voltage resistance of TFTs.

Figure 11:
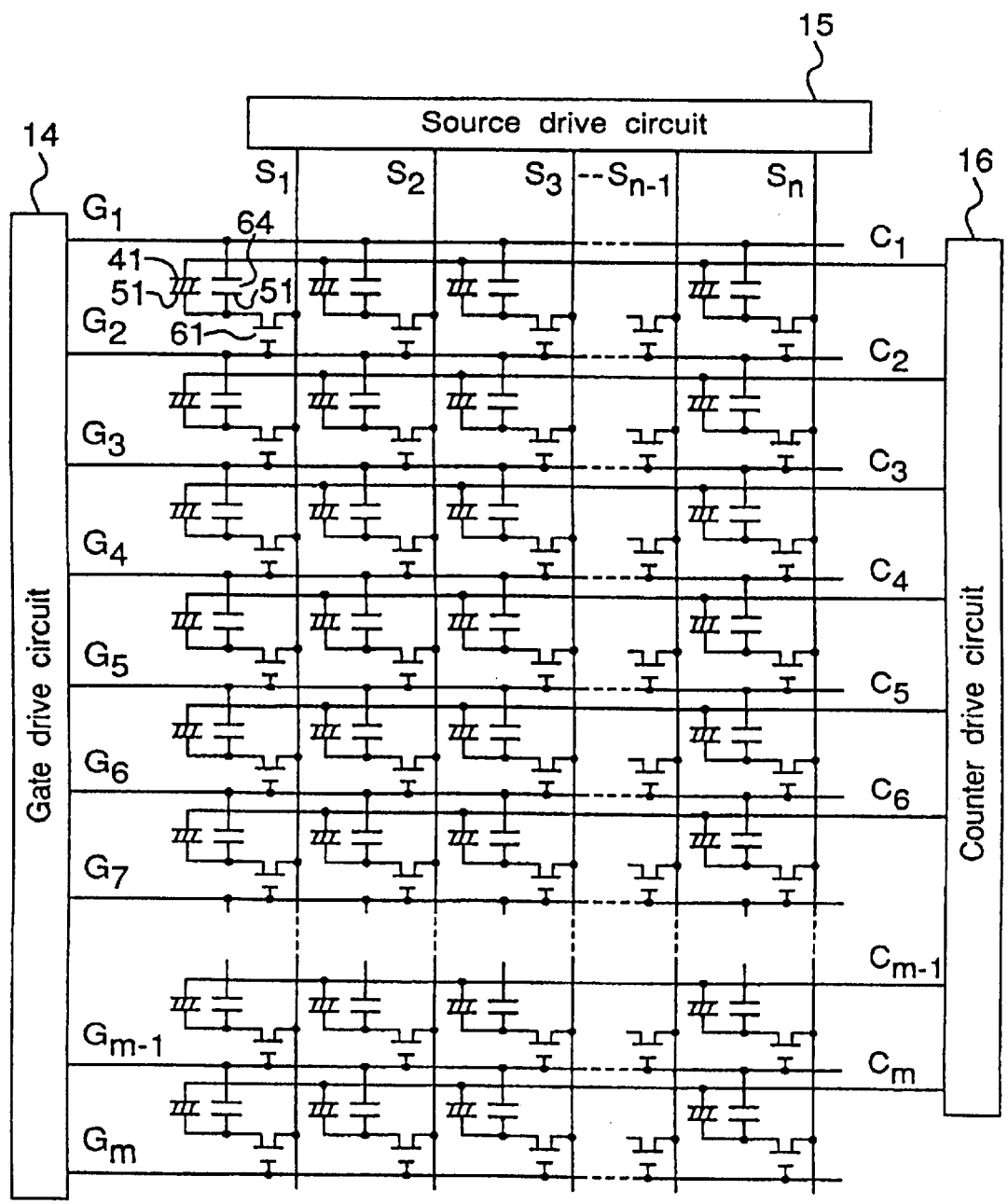
FIG. 11 is an equivalent circuit diagram of the display device according to the present invention.

An equivalent circuit diagram of the aforementioned pre-stage gate system is indicated in FIG. 11. It is to be noted, however, that the counter drive circuit 16 is not necessary and the striped electrodes 41 are the counter electrode 91 (not shown) common to all the pixels, in the pre-stage gate system.

Figure 15:
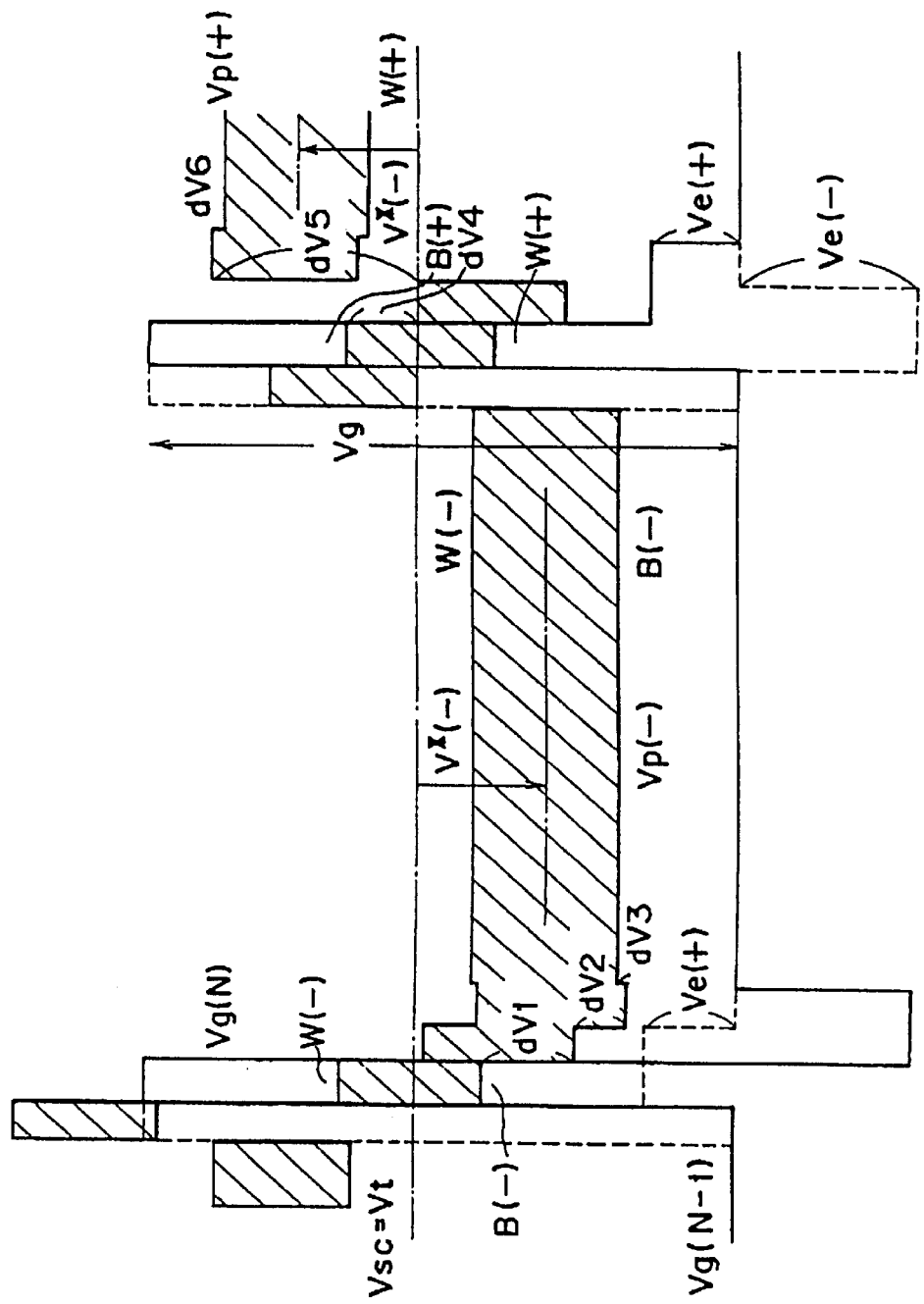
FIG. 15 is another diagram of the driving signal for one pixel.

FIG. 15 illustrates how to impress a high voltage to the liquid crystal layer 53 in the constitution of FIG. 11. A solid line is the voltage waveform at a gate of TFT 61 and a broken line shows the voltage waveform at a gate of the pre-stage constituting the capacitor 64. Immediately after TFT 61 is turned off, the voltage is decreased by dV1, dV4 because of the penetration. Then, the voltage is compensated by dV2, dV5 from compensation voltages Ve(+), Ve(−) indicated by broken lines. Accordingly, the voltage is biased by V*(+), V*(−) to the counter voltage Vt and the center Vsc of the signal voltage set at the same potential.

The gate drive IC 14 outputs signals of four levels, namely, Ve(+), Ve(−) for compensating the penetration voltage generated by the parasitic capacity of TFT 61, in addition to the ON, OFF levels of TFT 61 during the normal driving. By optimizing the intermediate level of the two compensation voltages, the source signal, the pixel electrode and the counter electrode (fixed) can be driven at the same center potential.

The amplitude of the two compensation voltages (V*=Ve(+)+Ve(−)) is effective to impress a bias voltage to the liquid crystal layer 53. Therefore, if the amplitude is set at the optimum value, the sufficient contrast is obtained by the maximum amplitude 6V of the source signal. For instance, in order to impress ±10V to the liquid crystal layer 53, the maximum amplitude of the source signal line may be 6V when ±4V bias is added, according to (Ve(+)+Ve(−)). The driving method as above is called as a "bias driving".

For impressing a relatively high voltage to the liquid crystal layer 53, "1H counter inversion driving" may be carried out. According to the 1H counter inversion driving, simultaneously when signals are written in a row of pixels every 1H, the polarity of the potential of the counter electrode 91 is inverted. Although this driving method is disadvantageous in the increasing consuming power of the counter electrode and shortening of the life of the panel, the method is employable as a driving method of the display device of the present invention.

As above, there are methods to impress a relatively high voltage to the liquid crystal layer 53 without using the arrangement employing the striped electrodes 41 (namely, "bias driving", "1H counter inversion driving" methods). The good display contrast is fulfilled by satisfying the aforementioned driving method, the constitution exemplified in FIGS. 28 to 38 and G<1.5 in the expression (4).

Since a polarizing plate is not used to modulate light in the display device of the present invention, images are obtained with high luminance. Moreover, since such an arrangement as permits easy impression of a high voltage to the liquid crystal layer 53 is employed, images can be displayed with high contrast. It is natural and needless to say that the display contrast is improved further owing to the preventing effect of the secondary scattering light by the transparent substrate 179, in addition to the employment of the striped electrodes allowing easy impression of a high voltage as above.

The transparent substrate 179 is useful to prevent the secondary scattering light. The panel gain G is desirably 1.5 or smaller, more suitably not larger than 1.0 in order to fully attain the preventing effect of the secondary scattering light. Although it will be described later, the panel gain G is necessary to be 1.5 or lower also for the purpose of obtaining the practically sufficient display contrast CR. Although 1.5 or lower panel gain requires at least 7V or higher voltage for the liquid crystal layer 53, the display device in FIG. 1, etc. has striped electrodes 41 and accordingly, makes it possible to impress a high voltage to the liquid crystal layer 53 without enlarging the signal amplitude of the source drive circuit 15.

In the present specification as above, roughly three types of invention are devised for the display device, that is, display device of a first type with striped electrodes, display device of a second type with the transparent substrate 179 or 212 and realizing the panel gain of G<1.5, and display device of a third type as a combination of the first and second types of display device.

Figure 50:
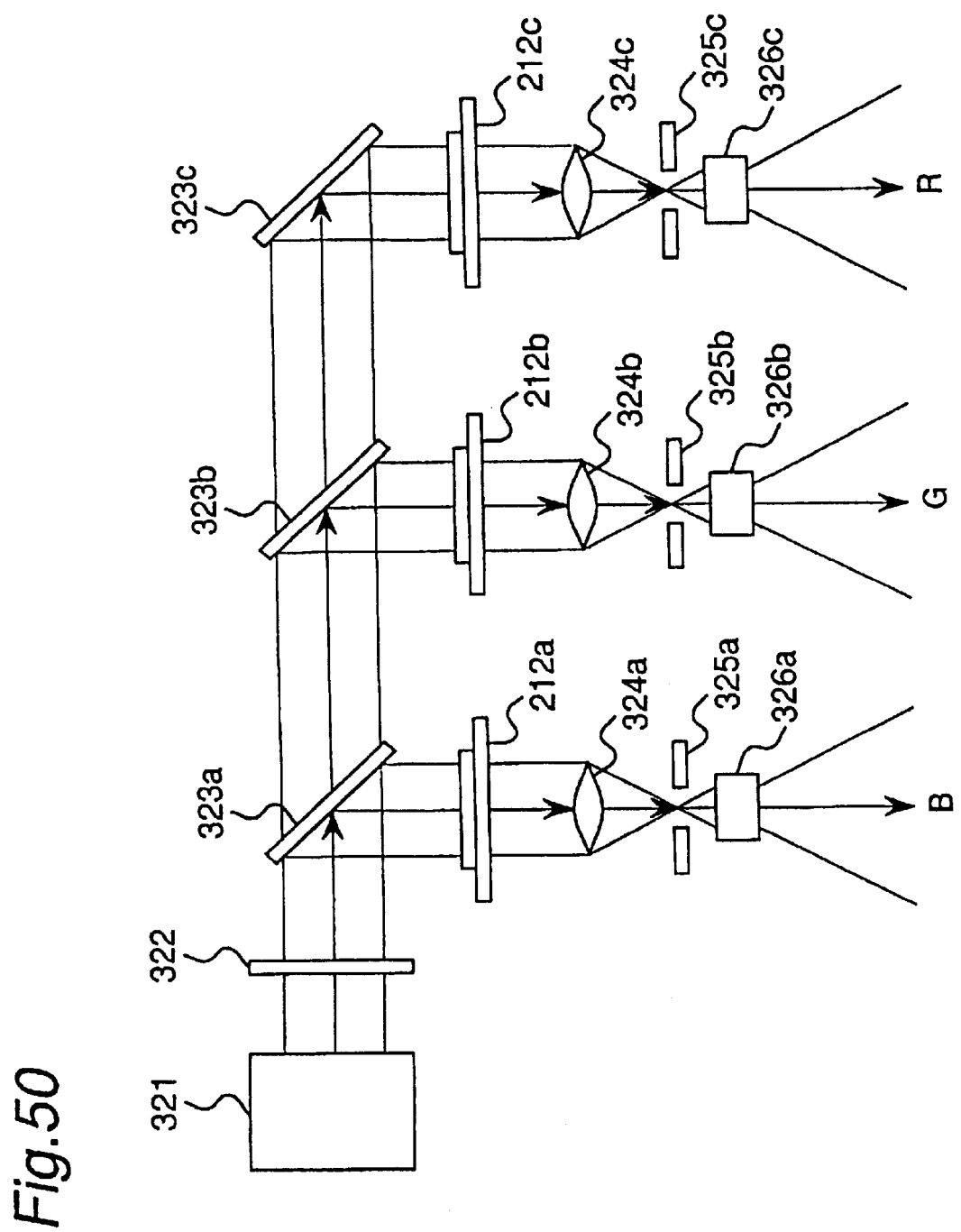
FIGS. 50, 51, 52, 53, 54 and 55 are structural diagrams for showing a variety of the projection-type display devices according to the present invention, respectively.

Now, a projection-type display apparatus of the invention will be discussed with reference to the corresponding drawings. FIG. 50 is a structural diagram of the projection-type display apparatus, with unnecessary parts omitted.

In FIG. 50, 321 is a condensing optical system having a concave mirror and a metal halide lamp or xenon lamp as a light generating means thereinside. The arc length of the lamp should be not smaller than 3 mm and not larger than 6 mm. The arc length of an about 250 W metal halide lamp is approximately 6.5 mm, and that of 150 W or so is approximately 5 mm. The concave mirror is designed at a suitable value in accordance with the arc length of the lamp, which is an elliptical or parabolic mirror. 322 is a UVIR (ultraviolet and infrared radiation) cut filter reflecting infrared and ultraviolet rays while transmitting only the visible light therethrough. 323*a* is a dichroic mirror for reflecting the blue light (referred to as BDM), likewise, 323*b* is a dichroic mirror for reflecting the green light (GDM), and 323*c* is a dichroic mirror for reflecting the red light (RDM). The arranging order from BDM 323*a* to RDM 323*c* is not limited to that shown in FIG. 50. Needless to say, the terminal RDM 323*c* may be exchanged with a total reflection mirror.

212 is the display device of the invention shown in FIG. 2 or 10. When the polymer dispersion crystal liquid is used for the light modulation layer 53, the particle size of the liquid crystal in the light modulation layer for modulating R light is set larger than that of the light modulation layers for modulating G and B lights, or the thickness of the R light modulation layer is made larger, from the reason that the scattering efficiency of the light modulation layer is lowered to decrease the display contrast when the light is of a longer wavelength. The particle size of the liquid crystal is controlled by controlling the ultraviolet light at the time of polymerization or changing the material. At the same time, the thickness of the liquid crystal layer is adjustable by changing the diameter of beads in the liquid crystal layer 53. 324 is a lens, 326 is a projection lens and 325 is an aperture. A projecting optical system is constituted of the lens 324, projection lens 325 and aperture 325. The aperture 325 is indicated to explain the operation of the projection-type display apparatus. Since the aperture 325 regulates the converging angle of the projection lens, it may be considered as included within the function of the projection lens. In other words, it can be said that the diameter of the aperture 325 is small when FNo of the projection lens is large. FNo of the projection lens is better to be large to obtain high contrast displays. However, the large FNo decreases the luminance of the white display.

Figure 56:
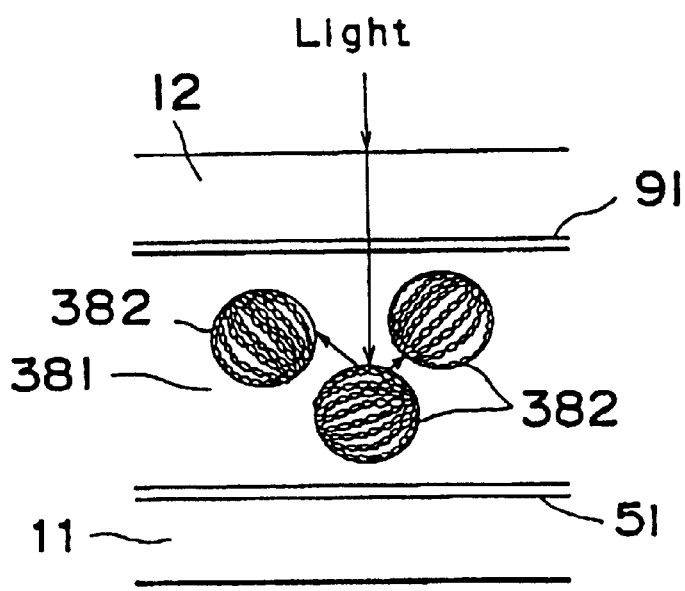
FIGS. 56 and 57 are expalantory views for showing an operational principle of a polymer dispersion liquid crystal.
Figure 57:
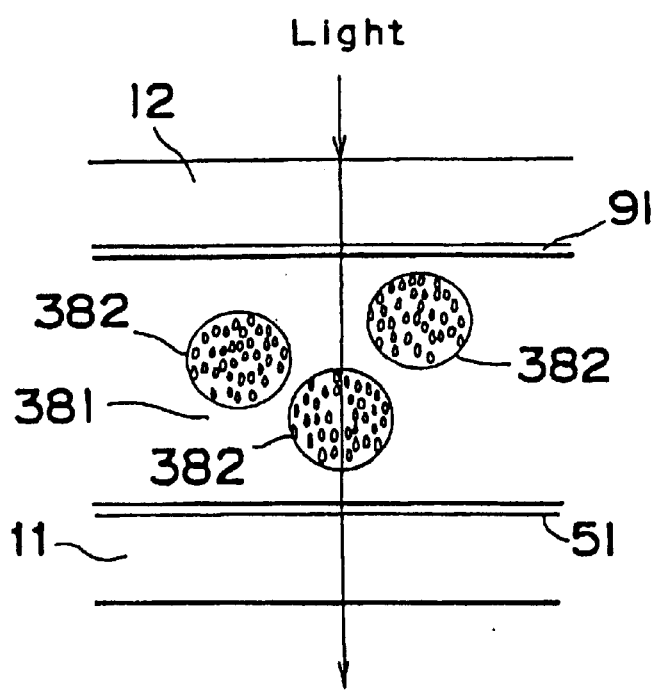

The operation of the projection-type display apparatus of the invention in the above-described constitution will be depicted below. Since each modulating system for R, G, B light operates in the same fashion, the modulating system for B light will be explained by way of example. In the first place, the white light is emitted from the condensing optical system 321. B light components of the white light are reflected by BDM 323*a*. The B light enters the display device 212*a* which in turn controls the incident light to be scattered or transmitted in accordance with the signals impressed to the pixel electrodes (referring to FIGS. 56, 57), thereby modulating the light.

Figure 53:
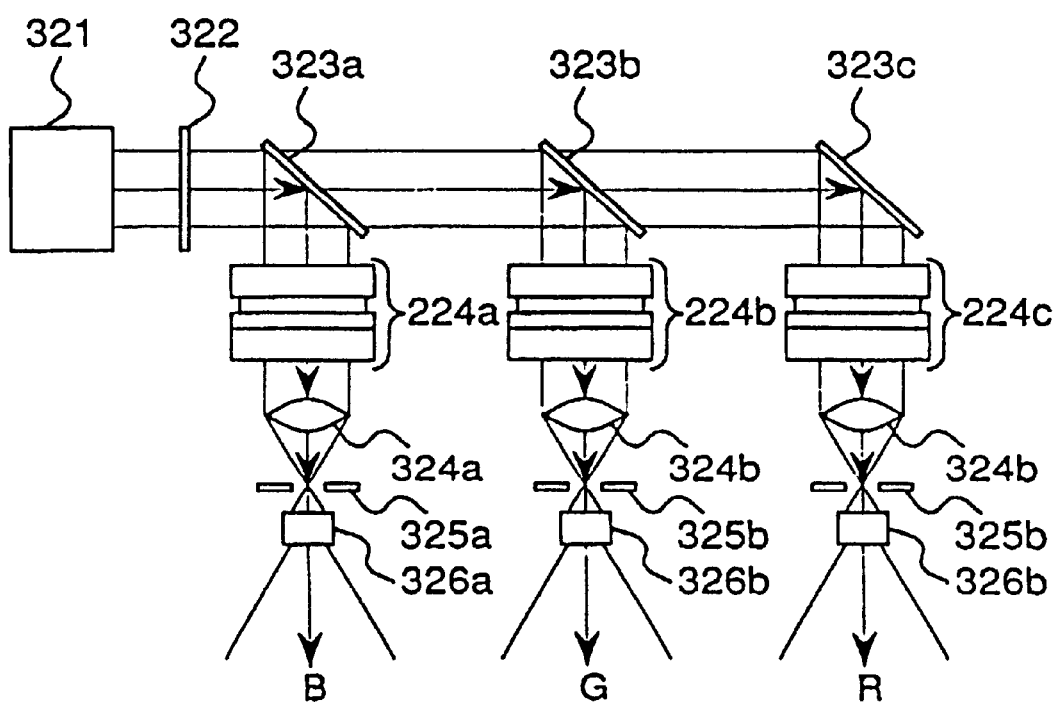

The scattering light is shut by the aperture 325*a*. The parallel light and light within a predetermined angle are allowed to pass through the aperture 325*a*. The modulated light is magnified and projected onto a screen (not shown) by the projection lens 326*a*. In the manner as above, B light components of the image are displayed on the screen. Similarly, the display device 212*b* modulates the light of G light components, the display device 212*c* modulating the light of R light components. The lights modulated by the three display devices form a color image on the screen. FIG. 53 shows a projection-type display apparatus in which the display device 212 in FIG. 50 is replaced with a display device 224 in FIGS. 28 to 38. Since the other points of the constitution are the same as in FIG. 50, the detailed description will be abbreviated. In the case where the transparent substrate 212 of the display device 224 is the plano-concave lens 214 or the like, the projecting optical system should be formed with the angle of refraction of the lens taken into consideration. The display device 224 may be such as shown in FIG. 22 or either one of FIGS. 28 to 38.

FIG. 50 indicates the case where the image is projected onto the screen on an enlarged scale by three projection lenses 326. It is also possible to magnify and project the image by one projection lens. The constitution in this case is shown in FIG. 51, wherein display devices 212R, 212G, 212B are the same as employed in FIG. 50.

Figure 51:
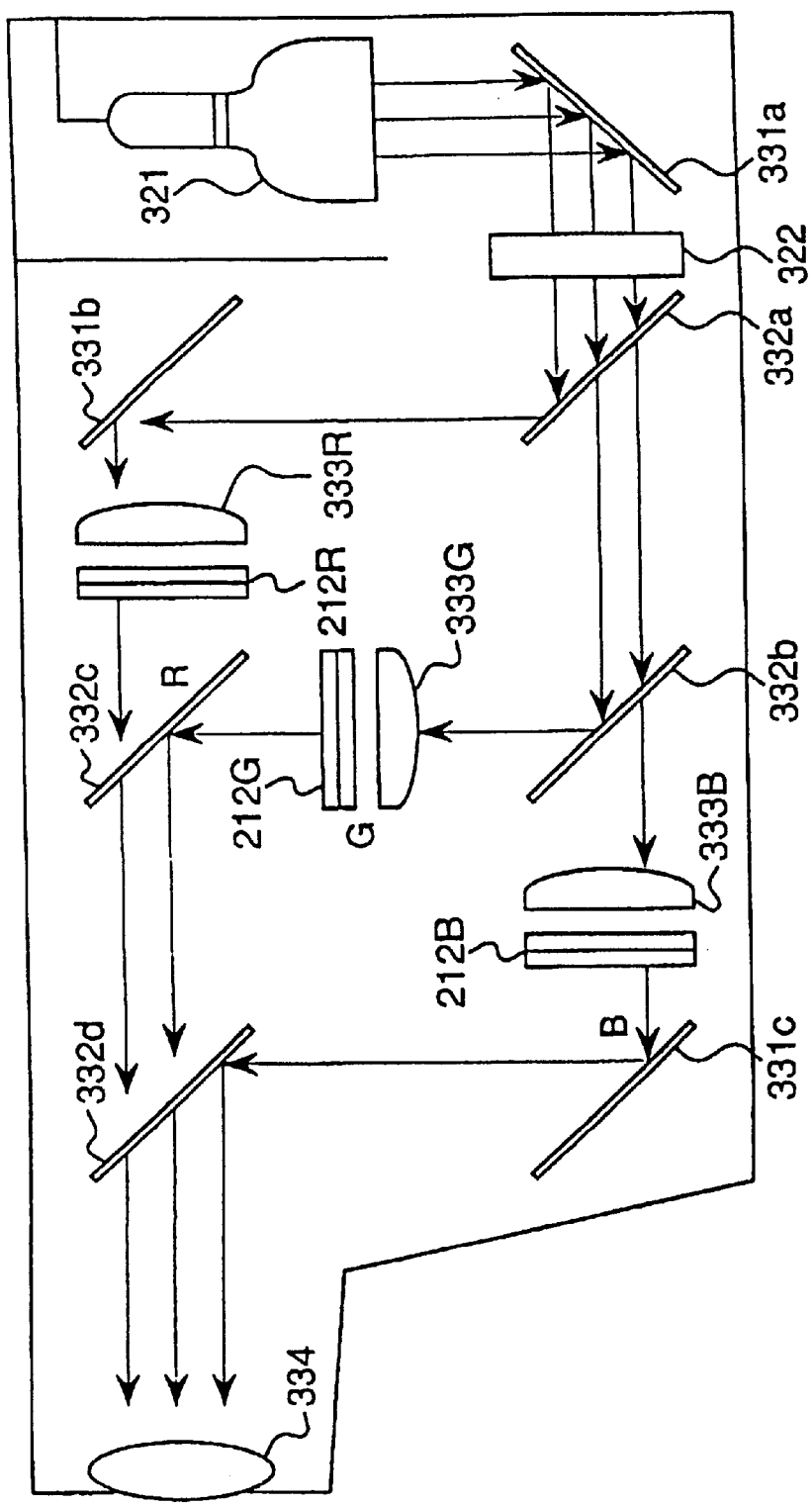

Referring to FIG. 51, 212G is a display device for displaying images of G light, 212R a display device for displaying images of R light and 212B a display device for displaying images of B light. The wavelength of the light transmitted and reflected by each dichroic mirror is as follows. The dichroic mirror 332a reflects R light, but transmits G and B lights. The dichroic mirror 332c reflects G light and transmits R light, while the dichroic mirror 332b transmits B light and reflects G light. The dichroic mirror 332d reflects B light, while passing G and R lights.

The light emitted from the metal halide lamp is reflected by the total reflection mirror 331a, so that the direction of the light is changed. The light of the wavelength in the ultraviolet and infrared region is then cut by the UVIR cut filter 322. The cut light is separated by the dichroic mirrors 332a, 332b into three optical paths of three primaries, i.e., R, G and B. As a result, R light enters the field lens 333R, G light and B light respectively entering the field lenses 333G and 333B. Each field lens condenses the light, and the display device 212 changes the orientation of the liquid crystal corresponding to the respective video signals thereby to modulate the light. The modulated R, G, B lights are synthesized by the dichroic mirrors 332c, 332d and projected to the screen (not shown) by the projection lens 334.

Figure 54:
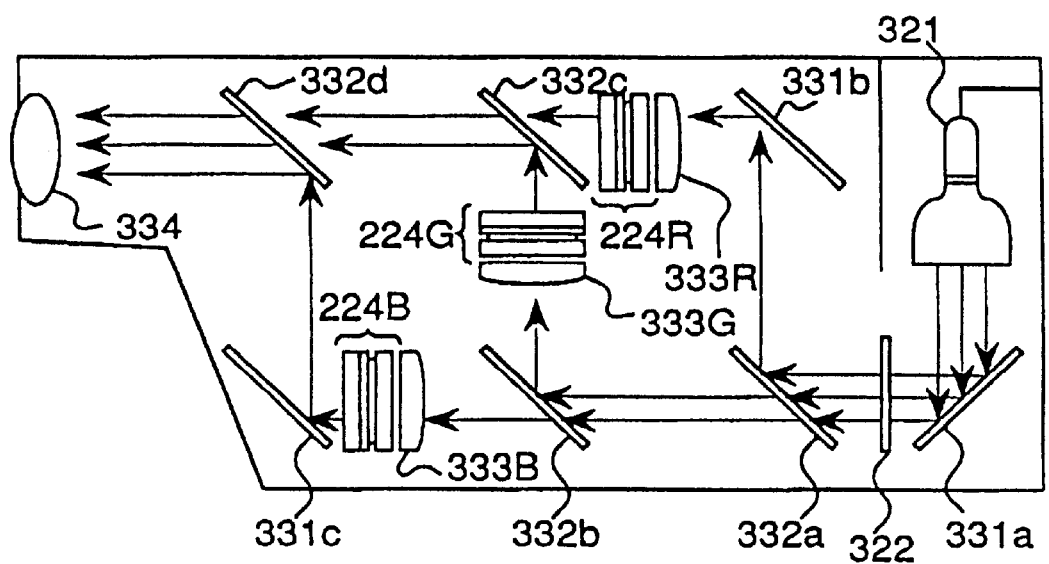

In a projection-type display apparatus in FIG. 54, the display device 212 of FIG. 51 is replaced with the display device 224 of one of FIGS. 28 to 38. The other points of the constitution are the same as in FIG. 51, the description of which will be abbreviated here. However, if the transparent substrate 212 of the display device 224 is the plano-concave lens 214 or the like, a projection lens 334 should be designed while the angle of refraction of the lens is taken into consideration. The display device 224 may be as shown in FIG. 22 or one of FIGS. 28 to 38.

Figure 52:
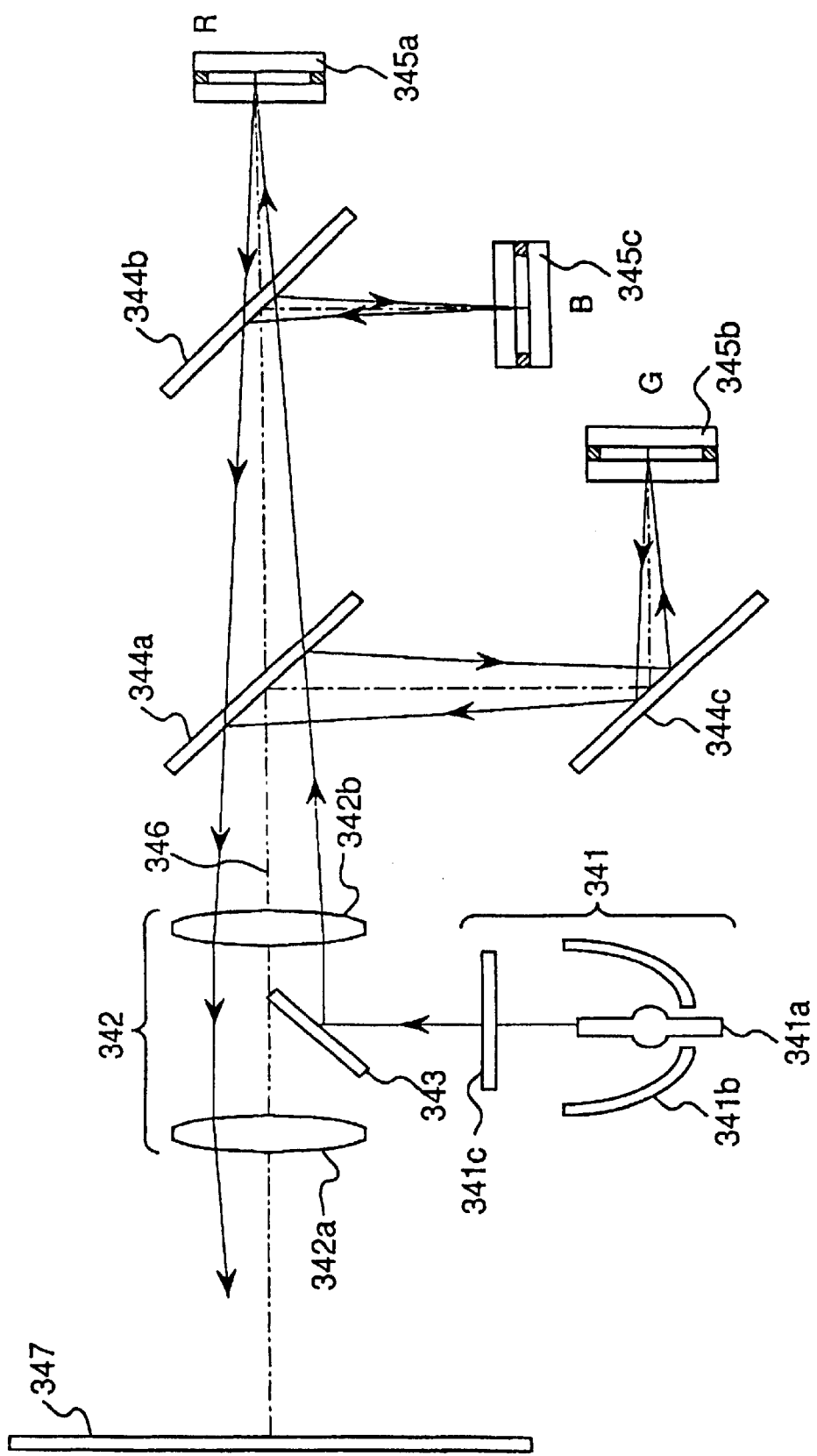

FIG. 52 is a diagram showing the structure of a reflecting projection-type display apparatus in one embodiment. 345 is a reflecting display device which is realized by forming the pixel electrodes 51 of the display device in FIG. 7 or the like as reflecting electrodes with using metallic thin films, etc. A light source 341 is composed of a lamp 341a, a concave mirror 341b and a UVIR cut filter 341c. The lamp 341a is a metal halide lamp. The concave mirror 341b is formed of glass, having a multi-layered film vapor-deposited on the reflecting surface to reflect the visible and infrared light. The visible light included in the light emitted from the lamp 341a is reflected at the reflecting surface of the concave mirror 341b. The reflecting light from the concave mirror 341b is projected after the infrared and ultraviolet rays are removed therefrom by the filter 341c.

The projection lens 342 consists of a first lens group 342b at the side of the display device 345 and a second lens group 342a at the side of the screen. A plan mirror 343 is interposed between the first and second lens groups 342b and 342a. Half of the scattering light projected from pixels at the center of the screen of the display device is, through the first lens group 342b, introduced into the plan mirror 343, and the remaining half enters the second lens group 342a without passing the plan mirror 343. The normal of the reflecting surface of the plan mirror 343 is inclined 45° to an optical axis 346 of the projection lens 342.

The light from the light source 341 passes the first lens group 342b after being reflected by the plan mirror 343 and enters the display device 345. The reflecting light from the display device 345 reaches a screen 347 passing from the first lens group 342b through the second lens group 342a. The light beams coming out from the center of the aperture of the projection lens 342 to the display device 345 are made telecentric so as to enter the liquid crystal layer 53 approximately at right angles.

In FIG. 52, 345b, 345c and 345a are the display devices for modulating G light, B light and R light, respectively.

Referring again to FIG. 52, a dichroic mirror 344 serves both as a color synthesis system and as a color separation system. The white light projected from the light source is bent by the plan mirror 343 and guided into the first lens group of the projection lens 342. At this time, unnecessary B light and R light are cut by the filter 341c. The filter 341c has 430–690 nm band width in the half-width. Hereinafter, the band width of light will be described in the half-width. The dichroic mirror 344a reflects G light, and transmits R and B lights. After the band width of G light is regulated by the dichroic mirror 344c, G light enters the display device 345b. The band width of G light is rendered 510–570 nm. On the other hand, the dichroic mirror 344b reflects B light, passing R light. B light is brought into the display device 345c and R light is sent to the display device 345a.

The band width of the incident B light is 430–490 nm, while that of the incident R light is 600–690 nm. The display devices form optical images corresponding to the respective video signals as the change of the scattering state. The optical images formed by the display devices are color-synthesized by the dichroic mirror 344, brought into the projection lens 342 and magnified and projected onto the screen 347. The band widths of R, G, B lights, etc. are almost common in the embodiments of the projection-type display apparatus of the present invention.

Figure 55:
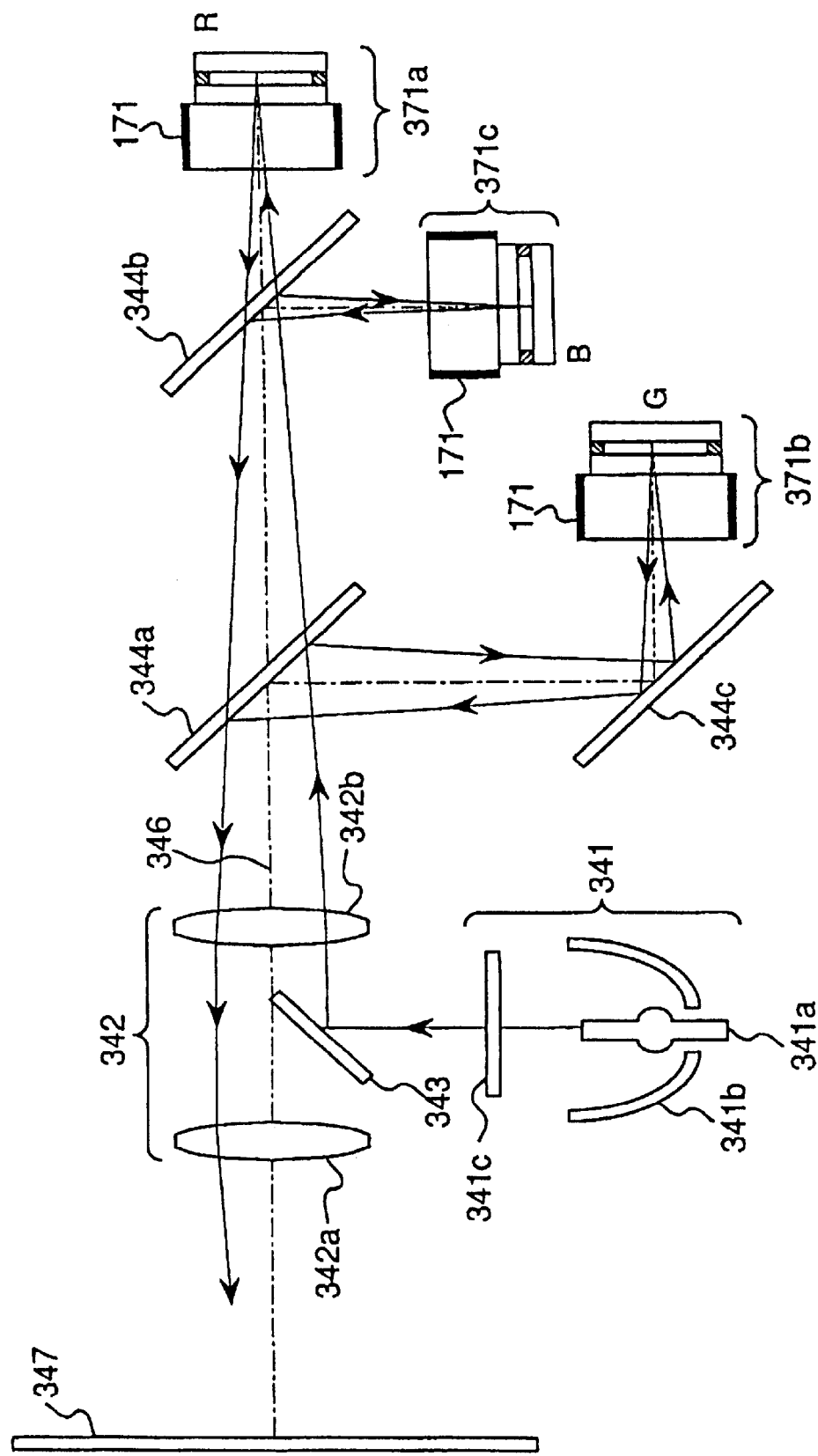

FIG. 55 is a projection-type display apparatus wherein the display device 345 in FIG. 52 is replaced with a display device 371. More specifically, the transparent substrate 179, 212 or 214 is optically coupled to the plane of incidence of the display device 345. Since the other points of the constitution are the same as in FIG. 52, the description thereof will be abbreviated.

As is described hereinabove, when the reflecting display device is used, in comparison with the projection-type display apparatus of FIG. 50 or 51, the display apparatus realizes the favorable display contrast, high numerical aperture and high luminance. Moreover, since there is no obstruction at the rear face of each display device, the panel is cooled easily, e.g., forcibly cooled by air. A heat sink or the like can be readily installed at the rear face of the display device.

Although the light is separated to three primaries, i.e., R, G and B lights by the dichroic mirror according to the projection-type display apparatus of the invention, the is invention is not limited to this, and a dichroic filter or a dichroic prism, etc. may be employed.

Hereinafter, features of the projection-type display apparatus common to the embodiments will be described. The arc length and consuming power of the lamp, the size of the panel, the display contrast and the like will be first depicted.

If the liquid crystal layer 53 of the display device is to be driven with ±10V, it becomes possible to manufacture the device having the panel gain G of 0.8 or lower. When the transparent substrate 179 or the like is mounted to the panel of 0.8 panel gain, with taking the decreasing ratio of the luminance D into consideration, the effective panel gain G becomes as close as 0.5. In the projection-type display apparatus using the effective panel gain G', the display contrast is as follows:

$$CR=4F^2T/G' \quad (5)$$

Figure 49:
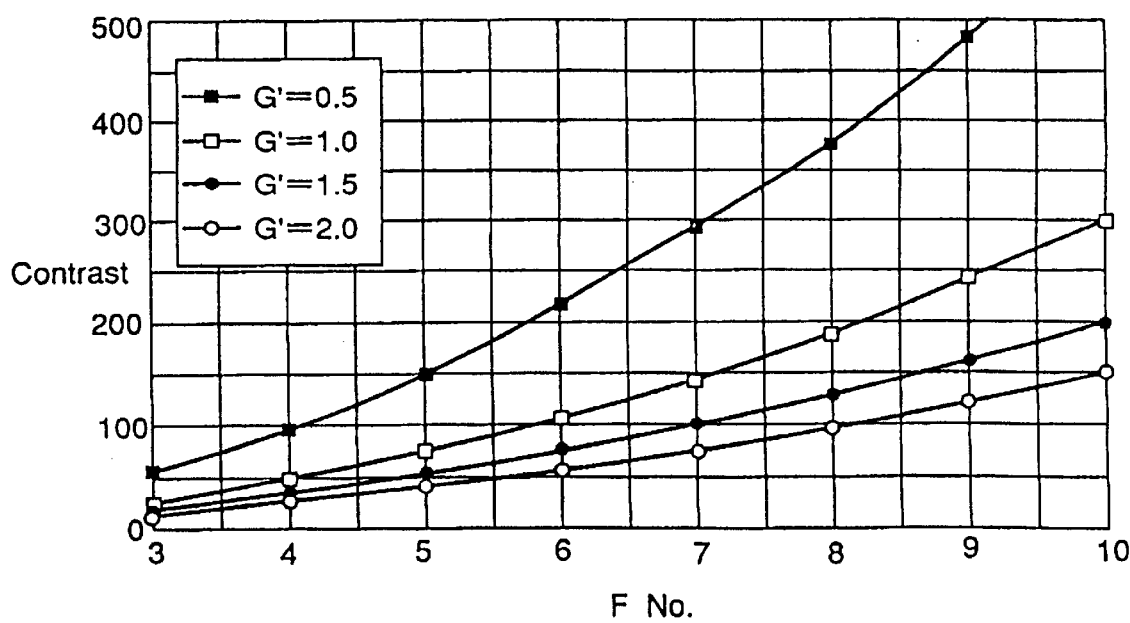
FIG. 49 is a graph showing a relation between the contrast and FNo.

From the expression (5), the relationship of FNo and the display contrast CR is represented in a graph of FIG. 49, in which T=0.75.

When the effective F-number (FNo) of the projecting optical system is not smaller than 5, CR becomes not smaller than 150. If the effective F-number is not smaller than 7, CR becomes 250 or higher, according to the expression (5).

The consuming power of the lamp is an important factor to introduce the projection-type display apparatus onto the market as a home TV. The currently available 30-inch TVs of a direct view type in the NTSC system consume not larger than 200 W. Although the projection-type display apparatus of the invention aims a larger display than the current TVs, the consuming power should be suppressed to 300 W or smaller. That is, the consuming power of the lamp should be 250 W or smaller, more preferably 150 W or so, except for the power required by a video signal processing circuit, etc.

Besides the consuming power, the lamp is subject to the arc length. The arc length of a 250 W metal halide lamp manufactured by Matsushita Electronics Inc. is 6.5 mm. Some of 150 W metal halide lamps developed by Iwasaki Electricity Co., Ltd. have larger than 5.0 mm arc length. The luminance of these kinds of lamps is approximately $1.2 \times 10^3$ nt. Although the luminance is increased by shortening the arc length while maintaining the consuming power constant, the life of the lamp becomes shortened.

If the projection-type display apparatus is to be used in a home TV, because of the difficulty in exchanging the metal halide lamp, the lamp should have a long life. The metal halide lamp with $1.2 \times 10^3$ nt luminance has gradually extended its service life, but there is no knowing when the long life is realized even if the arc length is small.

The spreading angle (FNo) of the illuminating light will now be considered. The above spreading angle is the FNo of light (FNo) incident upon the display device. It is now assumed that (1) both the surface of the light valve and the surface of the screen show the uniform illumination distribution, (2) an arc generating body of the lamp is a perfect diffusion cylindrical light source with dL length and dW width, and (3) $\phi s = t \cdot \eta \cdot \phi L$ is held wherein t is the transmitting efficiency determined by the interfacial loss, the transmittance of the liquid crystal panel and the color separating efficiency of the dichroic mirror and the like, and $\eta$ is the condensing efficiency of an optical system $\phi s$ reaching the screen when t=1.0, and $\phi L$ is the total bundle of rays of the lamp.

Noting the bundle of rays, the screen illuminance Es is represented by an expression (6):

$$Es=(t\eta\phi L)/(m^2KD) \quad (6)$$

in which $\phi L$(lm) indicates the total bundle of rays of the lamp, d(m) is the effective length of the diagonal of the panel, K is the area coefficient (K=0.48 when the screen size of the panel is 4:3, and K=0.43 when the screen size is 16:9), m is the magnification, $\theta$ is the condensing efficiency of light, and t is the transmitting efficiency.

Meanwhile, noting the luminance of the arc generating body, the screen illuminance Es' is expressed by the following expression (7):

$$Es'=(\pi B_L t)/(4m^2 Fo^2) \quad (7)$$

in which $B_L$(nt) is the luminance of the arc generating body and Fo is the effective FNo of the illuminating light.

Further, the luminance $B_L$ of the luminescent body is represented by an expression (8) in which dW is the effective width of the luminescent body and dL is the effective length of the luminescent body:

$$B_L=\phi_L/(\pi^2 dLdW) \quad (8)$$

The effective FNo (Fo) of the illuminating light is hence obtained from the above formulae (6), (7) and (8) according to an expression (9) below:

$$Fo^2(KD^2)/(4\pi\eta dWdL) \quad (9)$$

The using efficiency of light is decreased unless the conversing angle (FNo) of the illuminating light is approximately agreed with the converging or condensing angle (FNo) of the projection lens, because the light is bound to a larger FNo. As such, FNo of the illuminating light is made agreed with FNo of the projection lens in the projection-type display apparatus of the present invention.

Figure 48:
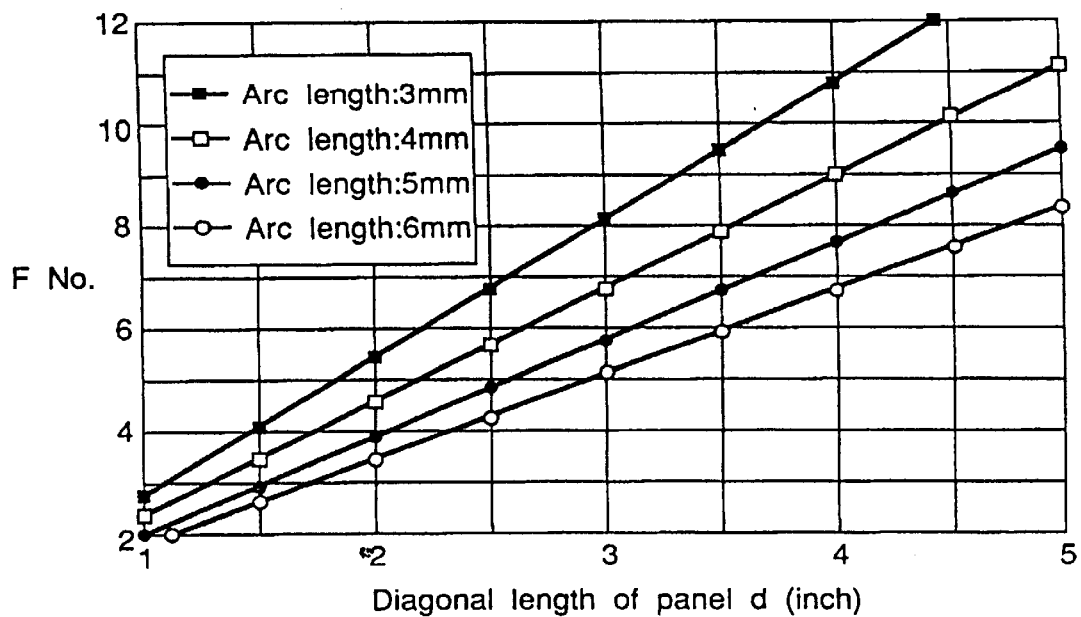
FIG. 48 is a graph showing a relation between FNo and the diagonal length d of a panel.

FIG. 48 indicates the relationship of the effective FNo of the illuminating light, the arc length of the lamp, namely, length of the luminescent body and the length of the diagonal of the panel. FIG. 48 is obtained with the use of the expression (9) supposing that K=0.43 and $\eta$=0.5. The arc length 5 mm is based on dW=2 mm, dL=5 mm of a 150 W lamp. The other arc length is calculated in proportion to the aspect ratio dW:dL.

In FIG. 48, as the panel size becomes smaller, the diagonal length of the panel d is decreased if the arc length is the same. Therefore, it is necessary to reduce FNo of the illuminating light when the diagonal length of the panel d is decreased. If the panel size becomes large, the system size of the projection-type display apparatus is disadvantageously increased. At the same time, if the length of the diagonal of the panel d becomes smaller, an increasing bundle of rays enters the display area of the panel per unit area, which unfavorably heats the panel. Therefore, the length of the diagonal of the panel is necessary to be not smaller than 2 inches and not larger than 4 inches from the practical viewpoint.

Figure 47:
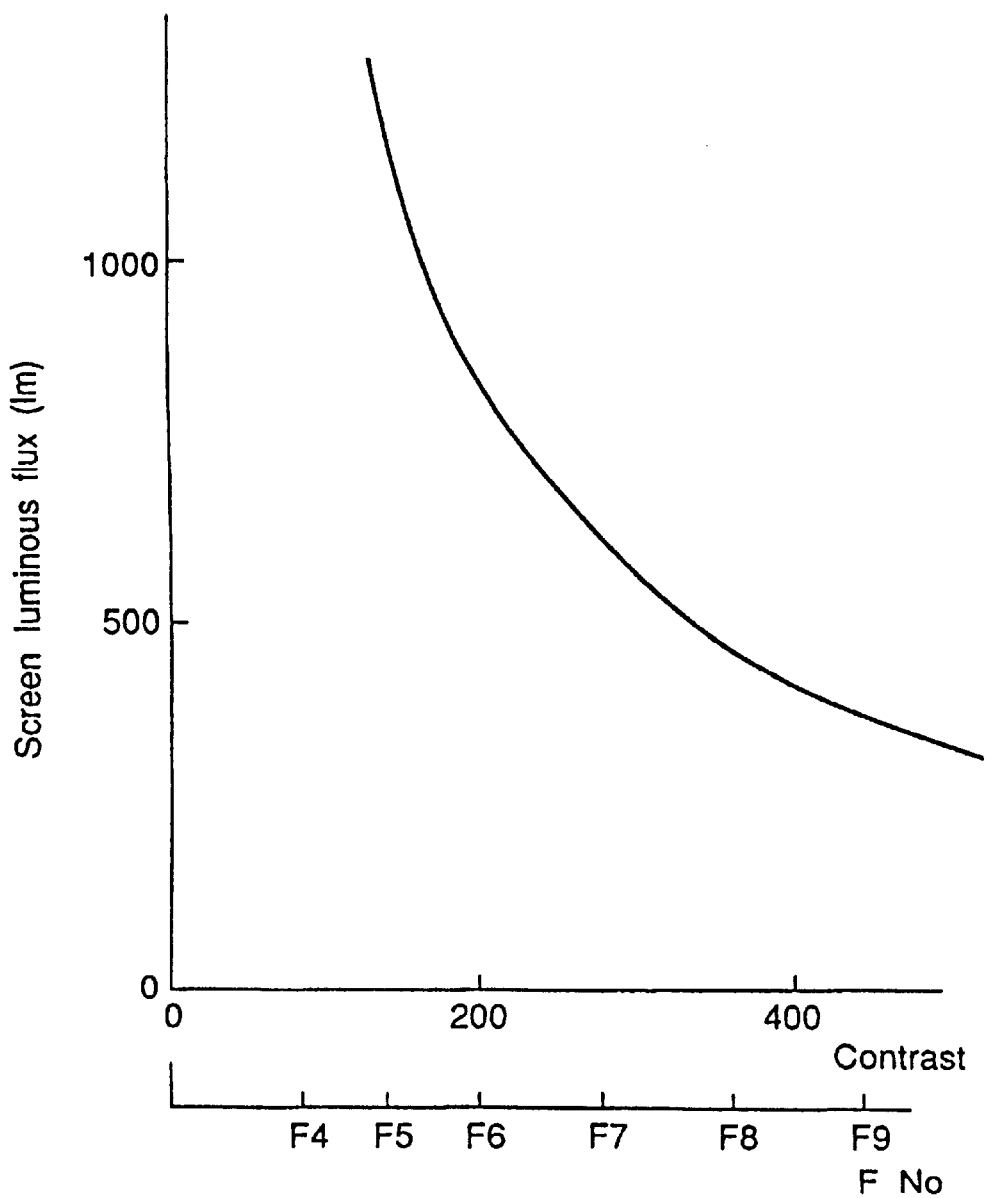
FIG. 47 is a graph showing a relation of screen luminous flux Lm versus the contrast and FNo.

When the luminance of the luminescent body is set at $1.2 \times 10^8$ nt with the life of the lamp taken into consideration, the arc length will be proportional to the consuming power. A lamp of 3 mm arc length consumes approximately 50 W, a lamp of 4 mm arc length about 100 W and a lamp of 5 mm arc length about 150 W. The efficiency of the metal halide lamp is 80 (lm/W). The total luminous flux of a 50 W lamp is 4000 lm, those of a 100 W lamp and a 150 W lamp are 8000 m, 12000 lm, respectively. The arc length of the lamp is correlative to the consuming power thereof, the arc length is correlative to FNo, and the consuming power of the lamp is correlative to the total luminous flux of the lamp as above, and therefore the relationship of these factors is represented as shown in FIG. 47 given that the luminous flux of the screen is 5% the total luminous flux.

From the above, the optimum specification of the projection-type display apparatus is determined, which will be depicted now. In the projection-type display apparatus, when the screen size of a projected image is not smaller than 40 inches, 300–400 lm or more luminous flux is needed to achieve practically useful properties of the field. If the utilizing efficiency of light of the lamp is about 4%, a 100 W or larger lamp is required. Therefore, although a lamp of 3 mm arc length is enough to satisfy only the display contrast CR, a 100 W or larger metal halide lamp is required to obtain the sufficient luminance of the projected image.

If the panel size is small, it is impossible to obtain the sufficient display luminance. The panel size should be approximately 3.5 inches when the arc length is 5 mm and the effective FNo of the illuminating light is 7.

If the arc length is more or less 5 mm and the panel size is slightly larger than 2 inches, the effective FNo of the illuminating light is a little smaller than 5. In this case, although the display luminance is in the practical range, the favorable display contrast CR cannot be obtained.

Although the practically useful display luminance is attained when the effective FNo of the illuminating light is 5 or larger, the effective FNo of the illuminating light (=effective F value of the projecting light) should be set nearly 7 and the arc length of the lamp should be 5 mm or so, and moreover about a 150 W lamp should be used so as to well realize the display luminance, display contrast and long life of the lamp with the suitable consuming power.

The luminous flux reaching the screen is increased when FNo of the projection lens is reduced. The consuming power of the lamp should be increased in accordance with the increase of the luminous flux. Seen from the viewpoint of the elongation of the life of the lamp, the arc length of the lamp becomes long as the consuming power of the lamp is increased when the luminance is the same. Since the display contrast CR follows the expression (5), it is worsened as FNo is decreased. On the contrary, the display contrast is enhanced if FNo is increased, but the luminous flux reaching the screen is reduced.

Accordingly, the arc length of the lamp should be not smaller than 3 mm and not larger than 6 mm to obtain the good display contrast and good display luminance. Moreover, the consuming power must be not larger than 250 W. A 100 W or larger metal halide lamp is necessitated to obtain the sufficient screen luminance.

The diagonal length of the effective display area of the panel is necessary to be not larger than 5 inches, favorably, not smaller than 2 inches from the viewpoint of the utilizing efficiency of light. Particularly, in order to obtain the sufficient converging efficiency of light and miniaturize the apparatus, the diagonal length of the effective display area of the panel is not smaller than 2 inches and not larger than 4 inches.

FNo of the projection lens, broadly, FNo of the projecting optical system is 5 or larger to obtain the good display contrast CR. For the sufficient screen luminance, FNo is not larger than 9, more specifically, not smaller than 6 and not larger than 8 when the arc length of the lamp is taken into consideration. If FNo of the projection lens is not generally agreed with that of the illuminating optical system, the light is lost, decreasing the utilizing efficiency of light.

The above-mentioned values or the range of values are particularly important features of the projection-type display apparatus using the polymer dispersion liquid crystal display device as the light valve, and not yet made public.

According to the projection-type display apparatus of the invention, the polymer dispersion liquid crystal is used as the light modulation layer 53 of the display device. However, it may be replaced with the other similar material utilizing the change of the scattering state, e.g., an optically addressed type liquid crystal panel using the polymer dispersion liquid crystal, a thermal addressed type liquid crystal panel using a phase change liquid crystal, a ferroelectric liquid crystal panel using the change of the scattering state, a DSM liquid crystal panel, a display panel using PLZT or the like. The employment of the striped electrodes is not restricted to that for modulation of light in the light modulation layer, and is applicable also to a twist nematic liquid crystal panel and a polarizing, optically addressed type liquid crystal panel such as a light valve ILA® offered by JVC-HUGHES.

An optical-write-type display device without transparent substrate 212 can be fabricated.

The photoconductive layer 394 operates as a potential modulator to the liquid crystal. Namely, since the impedance thereof is enoughly high in absence of a writing light, no potential is applied to the liquid crystal. But, when a writing light is applied thereto, the impedance is lowered in accordance with the intensity of the writing light and, thereby, a potential is applied to the liquid crystal. CRT is applicable as a source of writing light. An image is written into the display device of CRT and a reading light is applied from counter substrate side.

Herein below, an optical-write-type display device, as an application of the present invention, in which a PD liquid crystal is used for the light modulation layer will be explained briefly.

Figure 58:
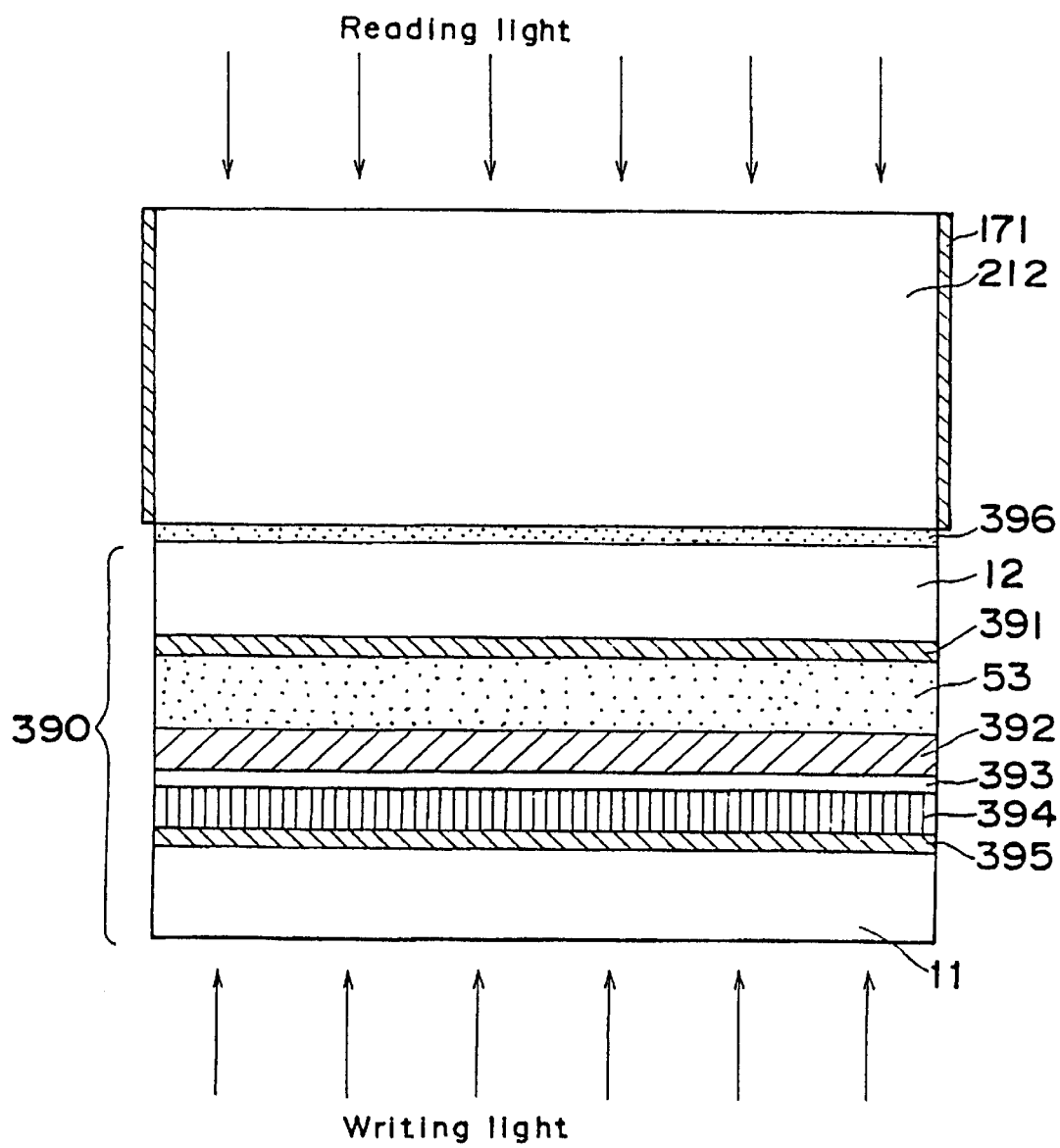
FIG. 58 is a cross-sectional view of a display device of optically addressed type using a polymer dispersion liquid crystal according to the present invention.

FIG. 58 is a schematical cross-sectional view of an optical-write-type display device. On a substrate 11, electrode 395, photoconductive layer 394 of amorphous silicon, light shutting layer 393, dielectric mirror 392 as light reflecting means are deposited in this order and a counter electrode 391 is formed on a counter substrate 12. A PD liquid crystal 53 is held between counter electrode 391 and dielectric mirror 392. Further, a thick transparent substrate 212 is bonded on the counter substrate 12 by bonding agent 396. The liquid crystal layer should satisfy the condition defined by equation 3. The counter electrode 391 may be a striped electrode as shown in FIG. 7.

Figure 59:
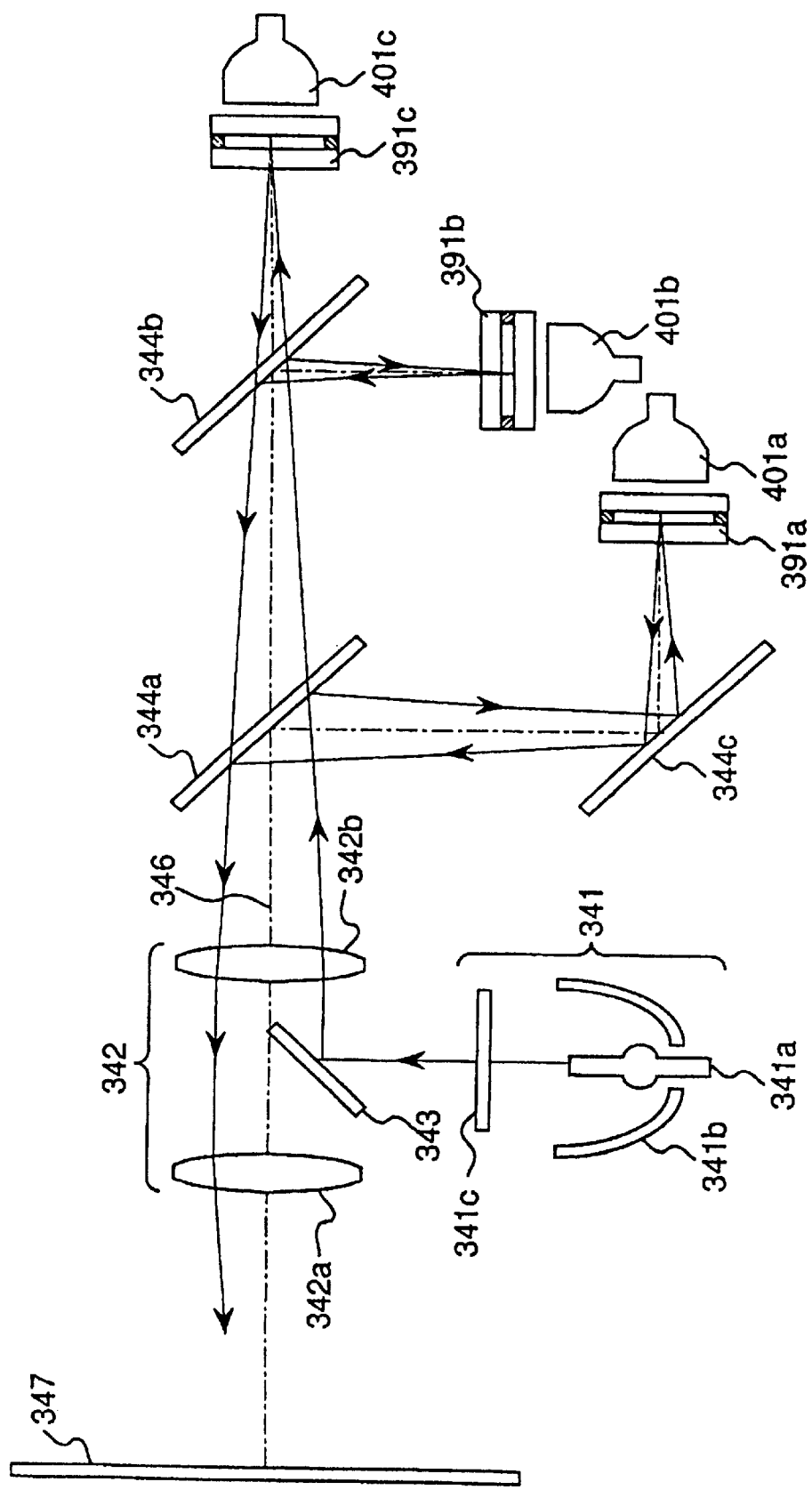
FIG. 59 is a structural diagram of a projection type display device using the optically addressed display device as a light valve.
Figure 60:
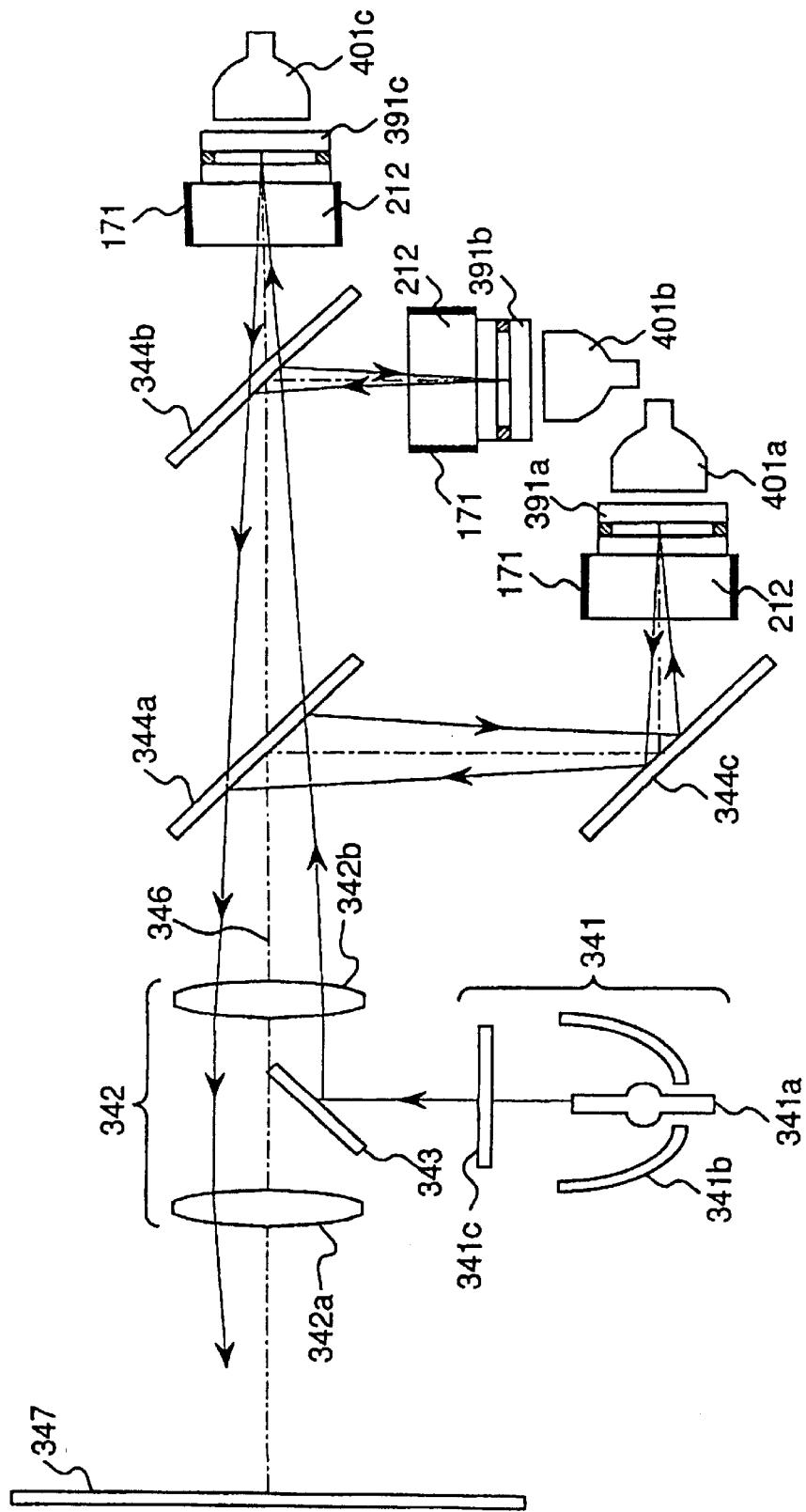
FIG. 60 is a structural diagram of another example of the projection type display device using the optically addressed display device as a light valve according to the present invention.

Further, examples of the projection type display device using the display device mentioned above for the light valve are illustrated in FIGS. 59 and 60. In these figures, reference numerals 401a to 401c denote a CRT for writing images into corresponding display device 391a to 391c. In FIG. 59, the display device 391a to 391c provides with striped electrodes 41 (not shown in this figure) and a transparent substrate 212 or concave lens 214. Other compositions and operation of this display device are substantially same as those of the projection type display device shown in FIG. 52 or 55.

In the preferred embodiment of the projection type display device, a PD liquid crystal is used for the light modulation layer 53.

However, display panels such as thermal addressed type liquid crystal panel using phase-transition type liquid crystal, ferroelectric liquid crystal panel utilizing change in the dispersion state, DSM liquid crystal panel, PLZT panel and the like are also applicable to the projection type display device according to the present invention.

It is also to be noted that a transparent member to be bonded to the substrate can be omitted in the case that the counter substrate 12 or 11 has a thickness enough for satisfying conditions defined by equation (2) or (2'). This is also applicable to the counter substrate formed as a concave lens.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A display device comprising:

a first electrode substrate;

a second electrode substrate; and a light modulation layer sandwiched between said first and second substrates for forming optical images as a change in the scattering state of light;

wherein said light modulation layer satisfies a condition defined by an expression $$0.5 \leq \pi B/L \leq 1.5$$

when a spot-like collimated light is projected onto said light modulation layer, wherein L is the illuminance (lux) of the plane of incidence of light to said light modulation layer, B is the luminance (nt) of said light modulation layer measured at the plane of projection of light from the direction normal to said light modulation layer and, π is the ratio of the circumference of a circle to its diameter;

wherein said first electrode substrate is provided with pixels arranged in a matrix and said second electrode substrate is provided with a plurality of generally striped electrodes, said striped electrodes being disposed to face rows of pixels and further comprising a patterned metallic thinfilm formed adjacent and around the striped electrodes, and a driving means capable of applying a different potential to arbitrarily chosen first ones of the striped electrodes and second striped electrodes adjoining the first striped electrodes.

2. A display device comprising:

a first electrode substrate;

a second electrode substrate; and a light modulation layer sandwiched between said first and second substrates for forming optical images as a change in the scattering state of light;

wherein said light modulation layer satisfies a condition defined by an expression $$0.5 \leq \pi B/L \leq 1.5$$

when a spot-like collimated light is projected onto said light modulation layer, wherein L is the illuminance (lux) of the plane of incidence of light to said light modulation layer, B is the luminance (nt) of said light modulation layer measured at the plane of projection of light from the direction normal to said light modulation layer and, π is the ratio of the circumference of a circle to its diameter;

wherein at least one of the first and second electrode substrates is optically coupled with a transparent member and wherein said transparent member is a concave lens, and further comprising a light absorbing means formed on an area of said concave lens through which no light effective for image display passes.

3. The display device according to claim 2, further comprising a positive lens disposed adjacent to said concave lens.

4. A display device comprising:

a first electrode substrate;

a second electrode substrate; and a light modulation layer sandwiched between said first and second substrates for forming optical images as a change in the scattering state of light;

wherein said light modulation layer satisfies a condition defined by an expression $$0.5 \leq \pi B/L \leq 1.5$$

when a spot-like collimated light is projected onto said light modulation layer, wherein L is the illuminance (lux) of the plane of incidence of light to said light modulation layer, B is the luminance (nt) of said light modulation layer measured at the plane of projection of light from the direction normal to said light modulation layer and, π is the ratio of the circumference of a circle to its diameter;

wherein at least one of the first and second electrode substrates is optically coupled with a transparent member and wherein the transparent member is a transparent substrate designed to satisfy an expression $$(t/d) \geq (1/8)\sqrt{(n^2-1)}$$

wherein t (mm) is the thickness of said transparent substrate, n is the index of refraction, and d (mm) is the maximum diameter of the effective display area of said light modulation layer.

5. A display device comprising:

a first substrate having a common electrode formed thereon;

a second substrate having an electrode, a photoconductive layer, a light shutting layer, and a light reflecting layer successively deposited thereon;

a light modulation layer made of a resin as material and a liquid crystal material and sandwiched between said first and second substrates for forming optical images as a change in the scattering state of light; wherein, said light modulation layer satisfies a condition defined by an expression $$0.5 \leq \pi B/L \leq 1.5$$

when a spot-like collimated light is projected to said light modulation layer, wherein L (lux) is the illuminance of the plane of incidence of light to said light modulation layer, B (nt) is the luminance of said light modulation layer measured at the plane of projection of light from the direction normal to said light modulation layer and, π is the ratio of the circumference of a circle to its diameter;

a concave lens optically coupled to at least one of said first and second substrates; and a light absorbing means formed on an area of the concave lens through which a light effective for image display does not pass.

6. A display device comprising:

a first substrate having a common electrode formed thereon;

a second substrate having an electrode, a photoconductive layer, a light shutting layer, and a light reflecting layer successively deposited thereon;

a light modulation layer made of a resin as material and a liquid crystal material and sandwiched between said first and second substrates for forming optical images as a change in the scattering state of light; wherein, said light modulation layer satisfies a condition defined by an expression $$0.5 \leq \pi B/L \leq 1.5$$

when a spot-like collimated light is projected to said light modulation layer, wherein L (lux) is the illuminance of the plane of incidence of light to said light modulation layer, B (nt) is the luminance of said light modulation layer measured at the plane of projection of light from the direction normal to said light modulation layer and, $\pi$ is the ratio of the circumference of a circle to its diameter; and a transparent substrate optically coupled to at least one of said first and second substrates, said transparent substrate being designed to satisfy an expression $$(t/d) \geq (1/8)\sqrt{(n^2-1)}$$

wherein t(mm) is the thickness of said transparent substrate, n is the index of refraction, and d(mm) is the maximum diameter of the effective display area of said light modulation layer.

7. A projection-type display apparatus comprising:

a liquid crystal display device;

a light generating means;

an optical means for guiding the light emitted from said light generating means to said liquid crystal display device; and a projecting means for magnifying and projecting the light modulated by said liquid crystal display device;

wherein said liquid crystal display device includes first and second substrates at least one of which has light permeability for forming optical images as changes in the scattering state of light; and a light modulation layer between said first and second substrates; and wherein, said light modulation layer satisfies a condition defined by an expression $$0.5 \leq \pi B/L \leq 1.5$$

when a spot-like collimated light is projected to said light modulation layer, wherein L (lux) is the illuminance of the plane of incidence of light to said light modulation layer, B (nt) is the luminance of said light modulation layer measured at the plane of projection of light from the direction normal to said light modulation layer and $\pi$ is the ratio of the circumference of a circle to its diameter;

wherein said first substrate has pixels arranged in a matrix, said second substrate has a plurality of generally striped electrodes disposed to face rows of said pixels and further comprising a patterned metallic thinfilm formed adjacent and around the striped electrodes, and a driving means capable of applying a different potential to arbitrarily chosen ones of the striped electrodes and second striped electrodes adjoining the fist striped electrodes.

8. A projection-type display apparatus comprising:

a liquid crystal display device;

a light generating means;

an optical means for guiding the light emitted from said light generating means to said liquid crystal display device; and a projecting means for magnifying and projecting the light modulated by said liquid crystal display device;

wherein said liquid crystal display device includes first and second substrates at least one of which has light permeability for forming optical images as changes in the scattering state of light; and a light modulation layer between said first and second substrates; and wherein, said light modulation layer satisfies a condition defined by an expression $$0.5 \leq B/L \leq 1.5$$

when a spot-like collimated light is projected to said light modulation layer, wherein L (lux) is the illuminance of the plane of incidence of light to said light modulation layer, B (nt) is the luminance of said light modulation layer measured at the plane of projection of light from the direction normal to said light modulation layer and $\pi$ is the ratio of the circumference of a circle to its diameter;

further comprising a concave lens optically coupled to at least one of said first and second substrates and a light absorbing means formed on an area of the concave lens through which light effective for image display does not pass.

9. A projection-type display apparatus comprising:

a liquid crystal display device;

a light generating means;

an optical means for guiding the light emitted from said light generating means to said liquid crystal display device; and a projecting means for magnifying and projecting the light modulated by said liquid crystal display device;

wherein said liquid crystal display device includes first and second substrates at least one of which has light permeability for forming optical images as changes in the scattering state of light; and a light modulation layer between said first and second substrates; and wherein, said light modulation layer satisfies a condition defined by an expression $$0.5 \leq \pi B/L \leq 1.5$$

when a spot-like collimated light is projected to said light modulation layer, wherein L (lux) is the illuminance of the plane of incidence of light to said light modulation layer, B (nt) is the luminance of said light modulation layer measured at the plane of projection of light from the direction normal to said light modulation layer and $\pi$ is the ratio of the circumference of a circle to its diameter;

further comprising a transparent substrate optically coupled to at least one of said first and second substrates, and wherein said transparent substrate satisfies an expression $$(t/d) \geq (1/8)\sqrt{(n^2=1)}$$

wherein t(mm) is the thickness of said transparent substrate, n is the index of refraction and d (mm) is the maximum diameter of the effective display area of said light modulation layer.

10. A projection type display device comprising:

a light emitting means including an arc discharge lamp for emitting white light along a first optical path;

a dichroic mirror for splitting the first optical path into three path segments along which red, green and blue light travel, respectively;

a liquid crystal display device disposed on each of the path segments;

a light combining means for combining respective light components, which have been modulated by the liquid crystal display devices, into a second optical path; and a projecting lens for projecting the light that has been combined by the light combining means;

wherein said liquid crystal display device is an active matrix type liquid crystal display device having a plurality of light-transmitting pixels arranged in a matrix pattern and wherein said liquid crystal display device includes a first transparent substrate optically coupled with an incident plane of the liquid crystal display device and a second transparent substrate optically coupled with a light exiting plane of the liquid crystal display device;

wherein with respect to the liquid crystal display device, the following equation is satisfied when the thickness of the transparent substrate, the index of refraction and the maximum diameter of an effective display area of a light modulating layer of the liquid crystal display device are expressed by t (mm), n and d (mm), respectively:

$$(t/d) \geq (1/8)\sqrt{(n^2-1)}.$$

11. A projection type display device comprising:

a light emitting means including an arc discharge lamp for emitting white light along a first optical path;

a dichroic mirror for splitting the first optical path into three path segments along which red, green and blue light travel, respectively;

a liquid crystal display device disposed on each of the path segments and having a light incident plane and a light exiting plane, said liquid crystal display device being comprised of an active matrix type liquid crystal display device having a plurality of light-transmitting pixels arranged in a matrix pattern;

a first transparent member optically coupled with the light incident plane of the liquid crystal display device;

a second transparent member optically coupled with the light exiting plane of the liquid crystal display device;

a light combining means for combining respective light components, which have been modulated by the liquid crystal display devices, into a second optical path; and a projecting lens for projecting the light that has been combined by the light combining means; and a reflection preventing film formed on a surface of at least one of the first and second transparent members which is in contact with air;

where at least one of the first and second transparent members is a transparent substrate which satisfies the following equation when the thickness of the transparent substrate, the index of refraction and the maximum diameter of an effective display area of a light modulating layer of the liquid crystal display device are expressed by t (mm), n and d (mm), respectively:

$$(t/d) \geq (1/8)\sqrt{(n^2-1)}.$$

* * * * *